United States Patent [19]

Ariga et al.

[11] Patent Number: 5,117,260
[45] Date of Patent: May 26, 1992

[54] IMAGE FORMING APPARATUS HAVING STREAMLINED INPUT FOR CONTROL SIGNALS

[75] Inventors: Masao Ariga, Kawasaki; Hiroyuki Hattori, Inagi; Katsuichi Shimizu, Hoya; Hirotoshi Kishi, Tokyo; Hiroshi Ogawa, Kawasaki; Takahiko Amanuma, Tokyo; Kazumi Umezawa; Seiji Sagara, both of Kawasaki; Kenji Kurita, Mitaka, all of Japan

[73] Assignee: Canon Kabushiki Kaisha, Tokyo, Japan

[21] Appl. No.: 405,587

[22] Filed: Sep. 11, 1989

Related U.S. Application Data

[60] Division of Ser. No. 8,119, Jan. 23, 1987, abandoned, which is a continuation of Ser. No. 675,650, Nov. 28, 1984, abandoned, which is a continuation of Ser. No. 288,211, Jul. 29, 1981, abandoned, which is a division of Ser. No. 882,614, Mar. 1, 1978, Pat. No. 4,312,587.

[30] Foreign Application Priority Data

Mar. 2, 1977 [JP] Japan .................................. 52-22981

[51] Int. Cl.$^5$ .............................................. G03G 21/00
[52] U.S. Cl. .................................................. 355/204
[58] Field of Search ............... 355/204, 205, 206, 208, 355/209

[56] References Cited

U.S. PATENT DOCUMENTS

| | | | |
|---|---|---|---|
| 3,689,143 | 9/1972 | Case et al. | 355/243 |
| 3,948,508 | 4/1976 | Kanazawa | 271/206 |
| 4,054,380 | 10/1977 | Donohue et al. | 355/206 X |
| 4,058,850 | 11/1977 | Sheikh | 355/208 X |
| 4,107,779 | 8/1978 | Fisk et al. | 355/208 X |
| 4,123,155 | 10/1978 | Hubert | 355/319 |
| 4,188,668 | 2/1980 | Finlay | 355/208 X |
| 4,305,654 | 12/1981 | Shimizu et al. | 355/204 |
| 4,375,917 | 3/1983 | Hiraike et al. | 355/208 |

FOREIGN PATENT DOCUMENTS

| | | |
|---|---|---|
| 2507527 | 9/1975 | Fed. Rep. of Germany . |
| 2535352 | 3/1976 | Fed. Rep. of Germany . |
| 2612539 | 10/1976 | Fed. Rep. of Germany . |
| 1522161 | 8/1978 | United Kingdom . |
| 1542434 | 3/1979 | United Kingdom . |

*Primary Examiner*—Fred L. Braun
*Attorney, Agent, or Firm*—Fitzpatrick Cella Harper & Scinto

[57] ABSTRACT

An image processing apparatus provided with a plurality of operation devices for recording or reproducing an image. Using operation control signals, a controller controls the operation devices in accordance with selected information signals. Appropriate ones of the information signals are selected in accordance with the control signals.

10 Claims, 55 Drawing Sheets

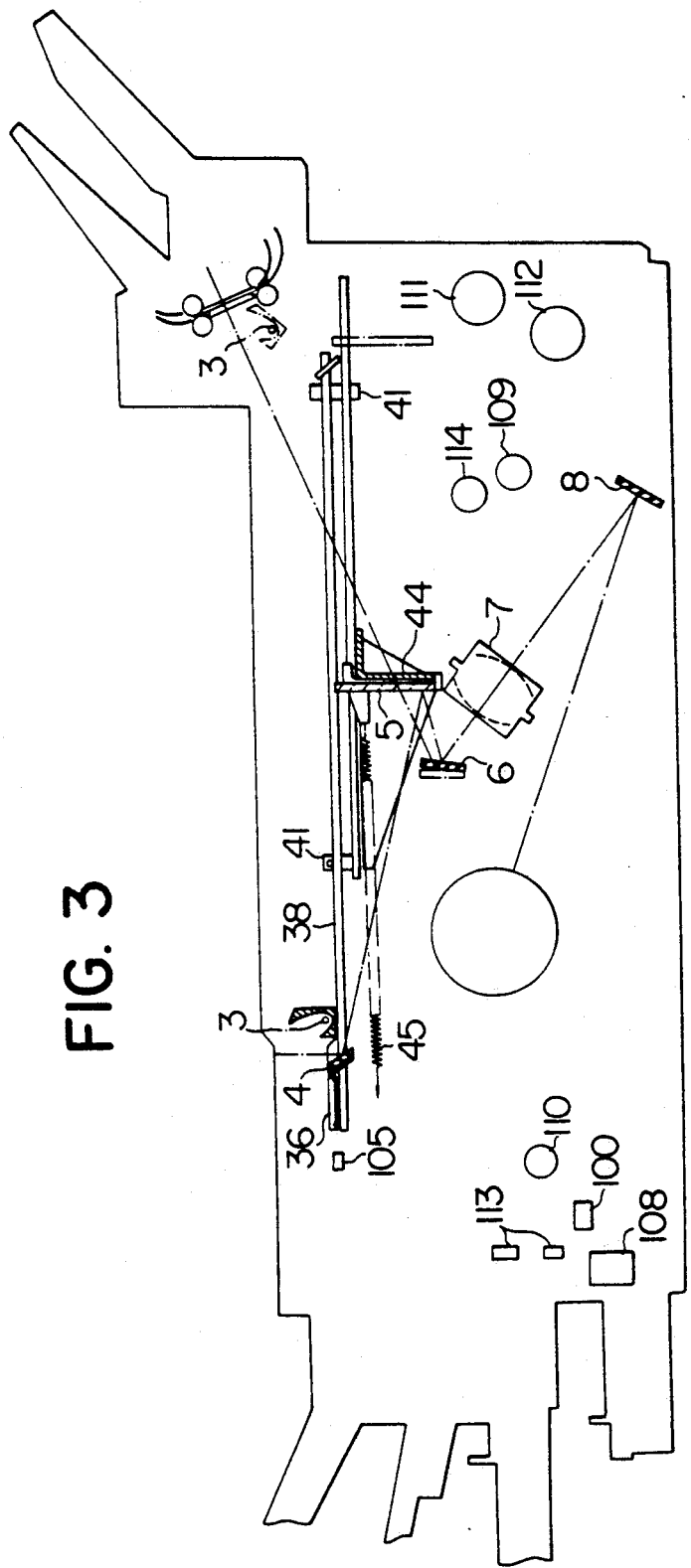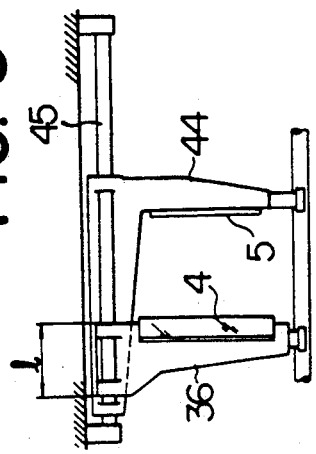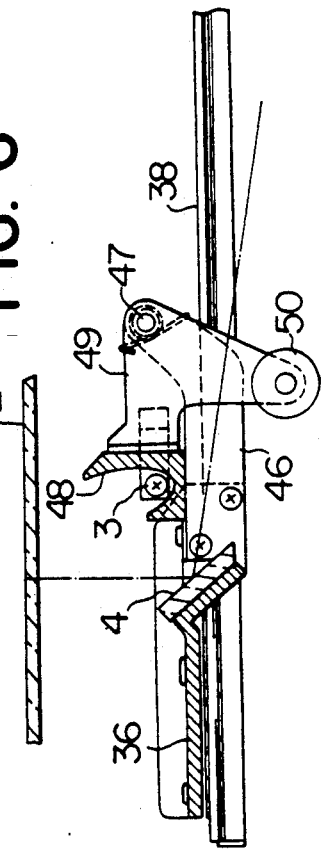

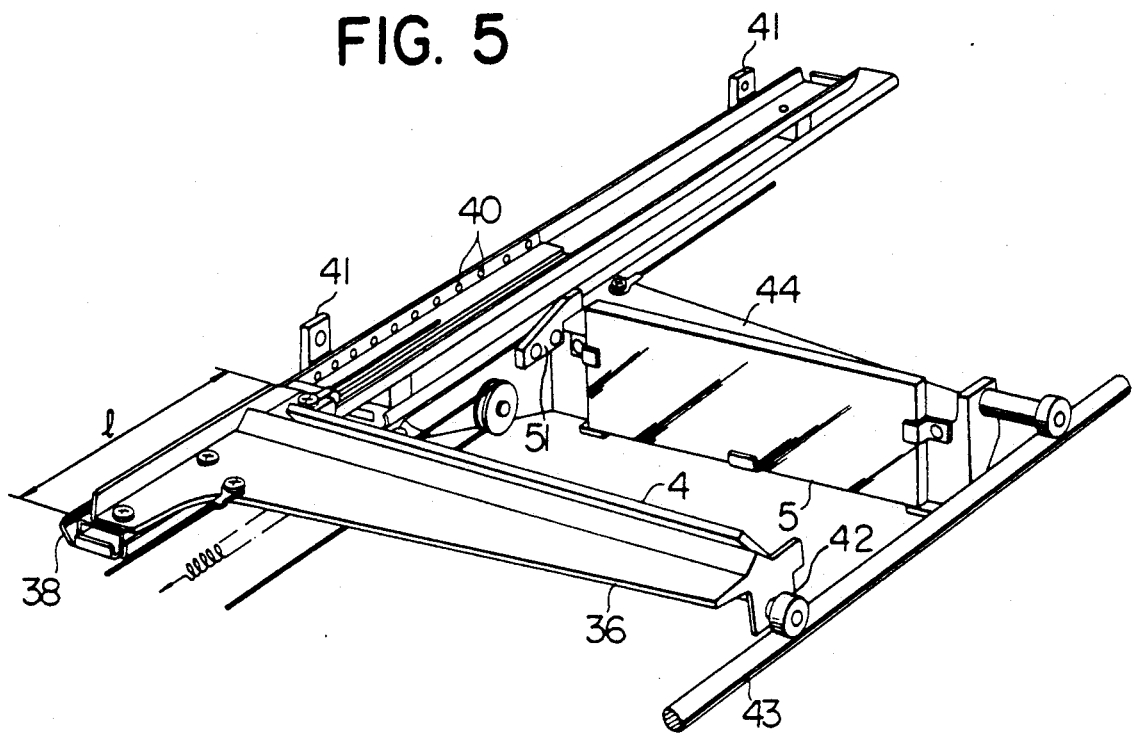
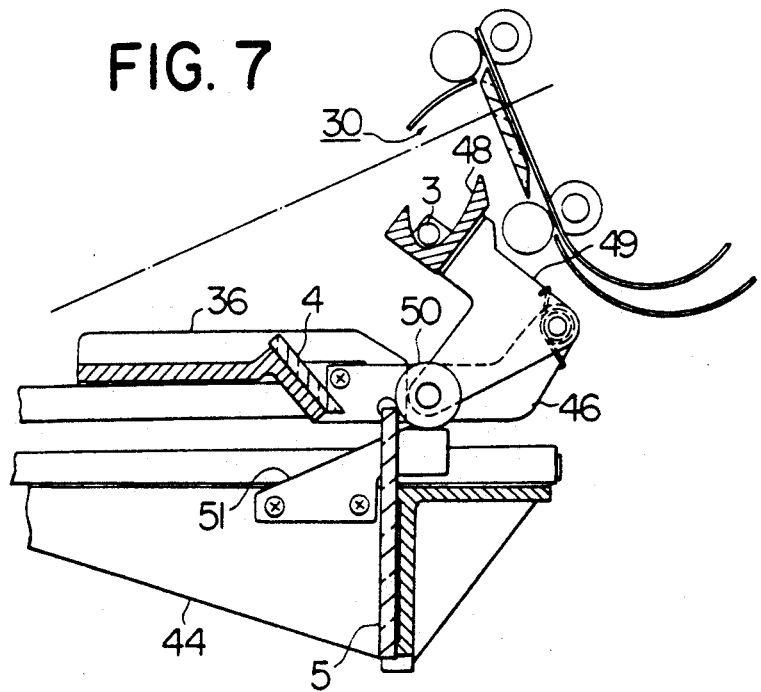

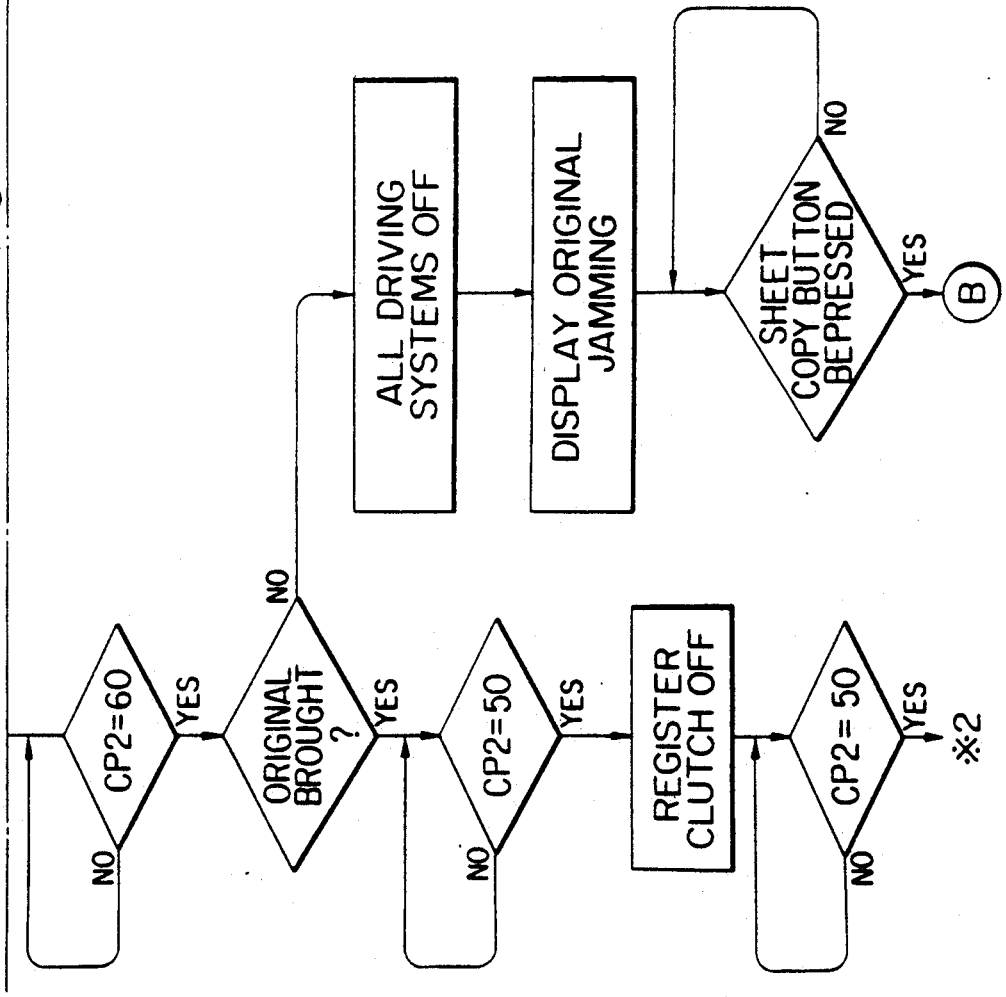

FIG. 18B

```
TRANSFER DATA OF
RAM LOCATION 3 & 4
(SET NUMBER)
TO RAM LOCATIONS 1
& 2 (COPY NUMBER)
        │
        ▼
   ( TO KEY ENTRY )
        │
   ( FEED MISSING FLOW )
        │
       (F)
        │
   DRIVING SYSTEM OFF
        │
   DISPLAY FEED MISSING
        │
   < AUXILIARY CASSETTE ? >──NO──┐
        │YES                      │
   CASSETTE MOTOR ON              │
        │                         │
   < AUXILIARY CASSETTE OUT ? >──NO──(loop back)
        │YES                      │
   CASSETTE MOTOR OFF             │
        │                         │
        ▼◄────────────────────────┘
       (G)
```

FIG. 18

| FIG. 18A |
|----------|
| FIG. 18B |

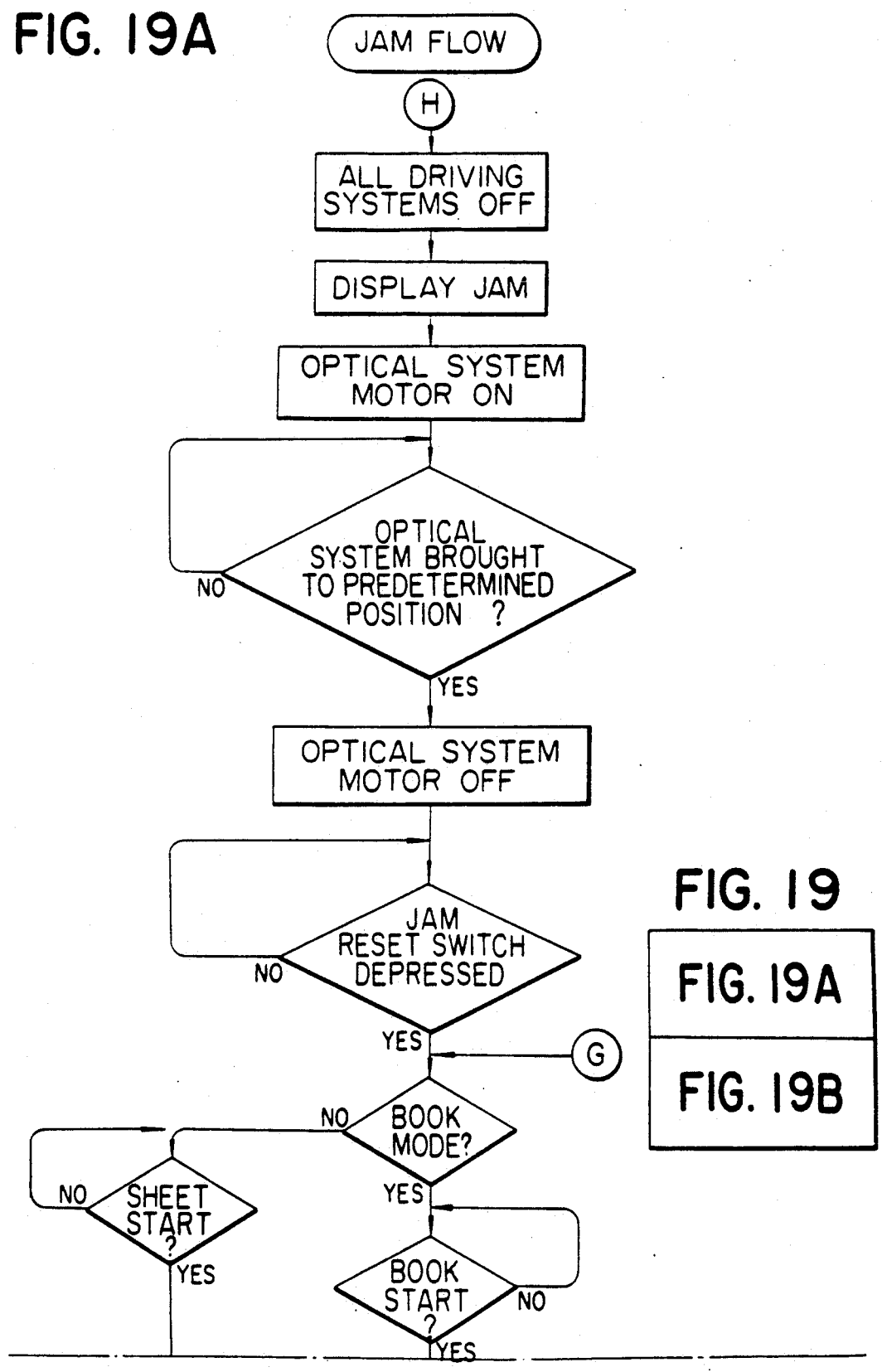

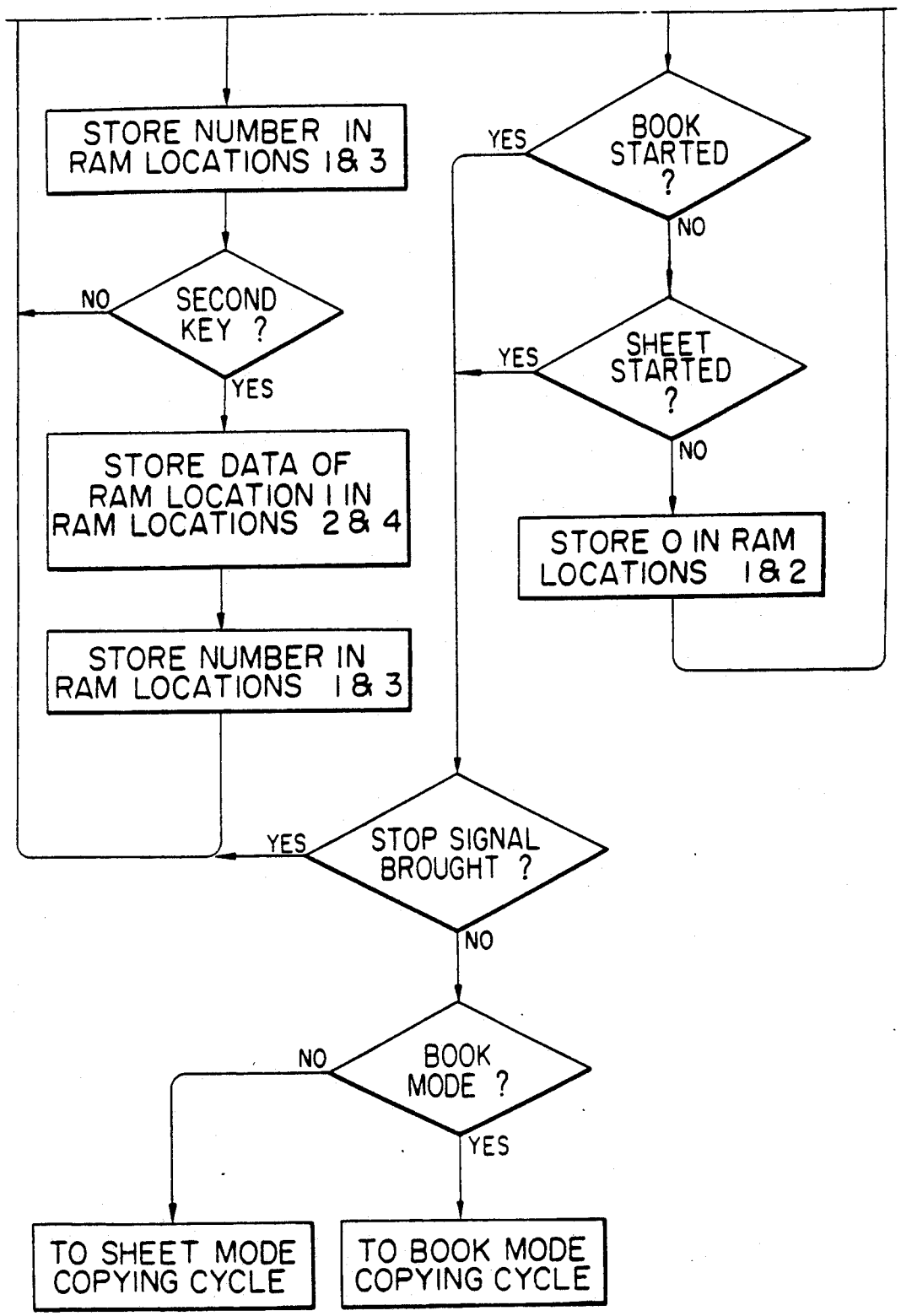

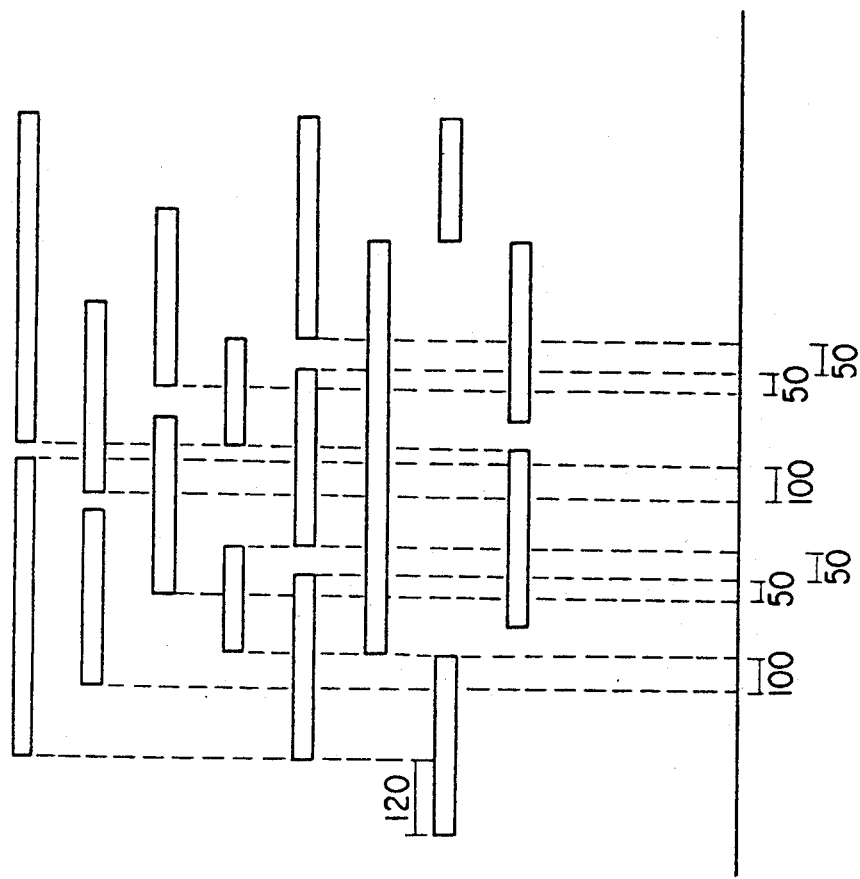

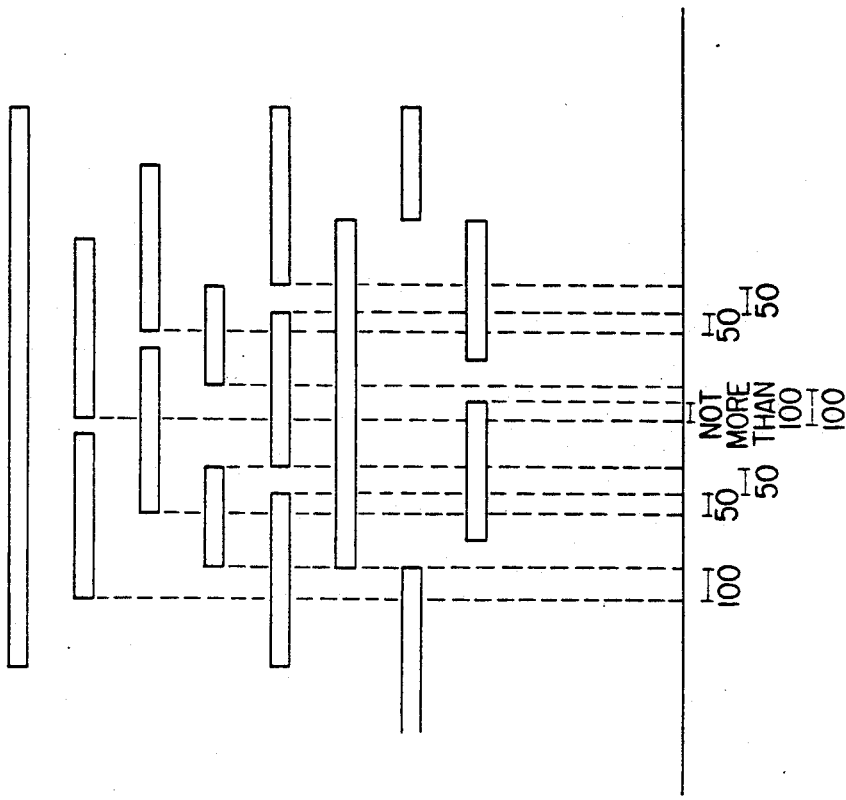
FIG. 23 SHEET MODE(2)

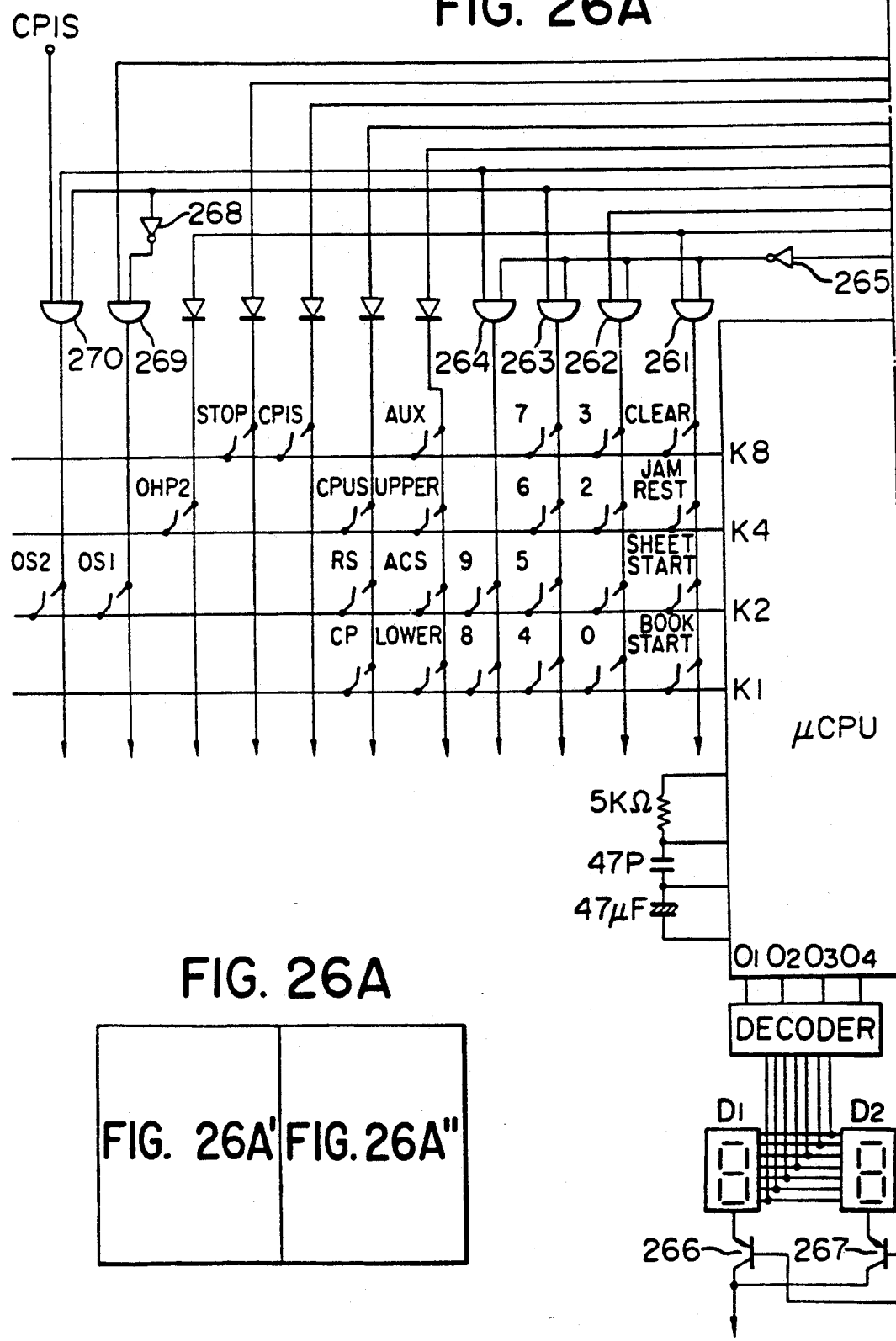

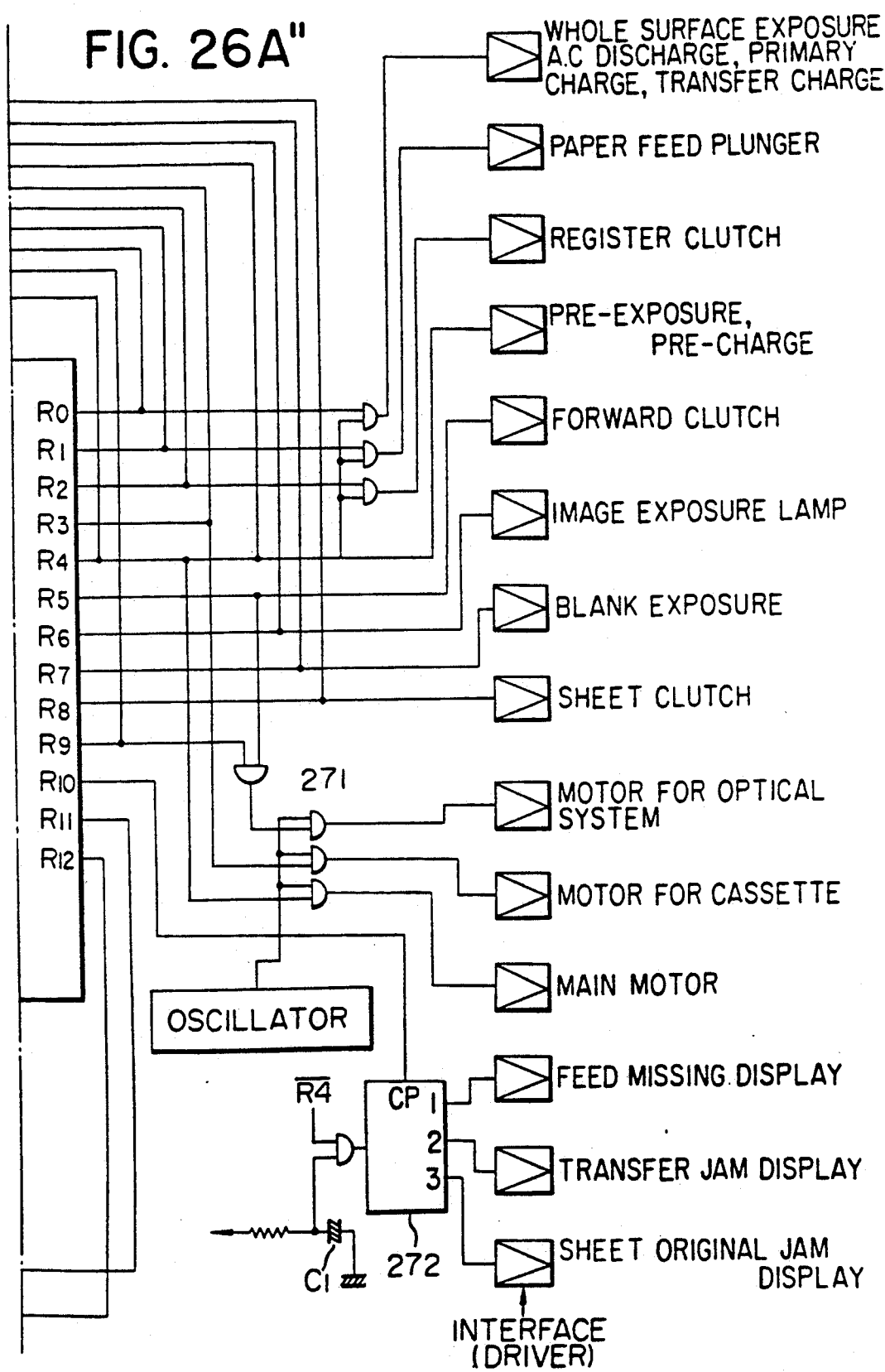

FIG. 26B SWITCHES

| | | |
|---|---|---|
| OS1 | 106 | FIRST DETECTING POSITION FOR SHEET ORIGINAL |
| OS2 | 107 | SECOND DETECTING POSITION FOR SHEET ORIGINAL |
| OHP2 | 104 | OPTICAL SYSTEM, HOME POSITION (SHEET MODE) |
| CPIS | 103 | INPUT SIGNAL OF TRANSFER PAPER |
| RS | 116 | REGISTER SWITCH |
| ACS | 100 | DETECTING SWITCH FOR AUXILARY CASSETTE POSITION |
| AUX | 122 | AUXILIARY CASSETTE |
| UPPER | 123 | UPPER CASSETTE } CASSETTE SELECTOR BUTTON |
| LOWER | 124 | LOWER CASSETTE |
| CPOS | 117 | TRANSFER DISCHARGING SIGNAL |
| JAM RESET | 105 | MACHINE COVER SWITCH |
| CLEAR | 127 | |
| SHEET START | 131 | } ACTUATOR |
| BOOK START | 130 | |
| 0~9 | 126 | |
| STOP | | SIGNALS FOR ACTUATOR (129), NO PAPER, LOW FIXING TEMPERATURE, NO LIQUID |

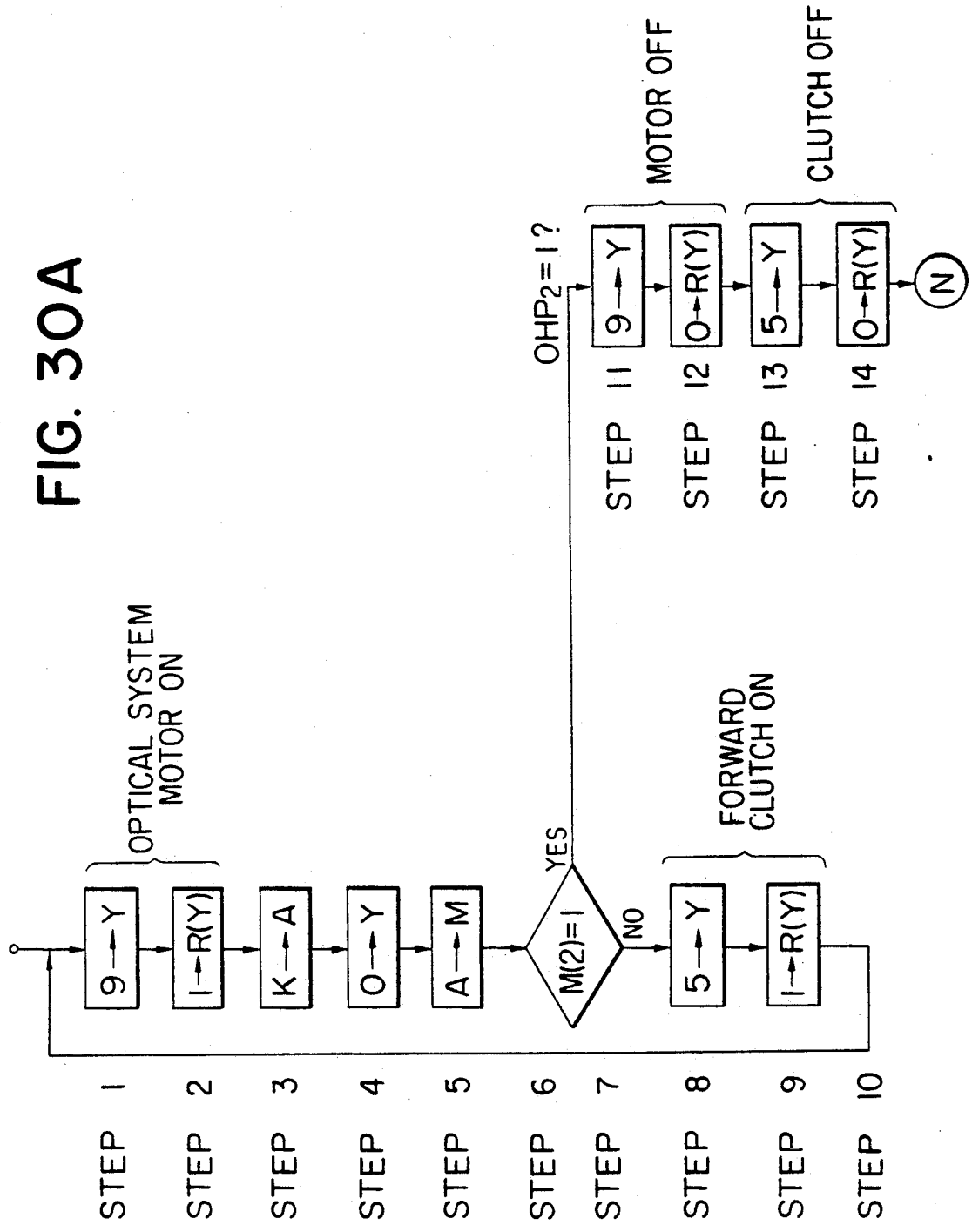

FIG. 30B

| STEPS | | INSTRUCTIONS |
|---|---|---|
| 1 | LB1 | TCY 9 |
| 2 | | SETR |
| 3 | | TKA |
| 4 | | TCY 0 |
| 5 | | TAM |
| 6 | | TBITI 2 |
| 7 | | BR LB2 |
| 8 | | TCY 5 |
| 9 | | SETR |
| 10 | | BR LB1 |
| 11 | LB2 | TCY 9 |
| 12 | | RSTR |
| 13 | | TCY 5. |
| 14 | | RSTR |

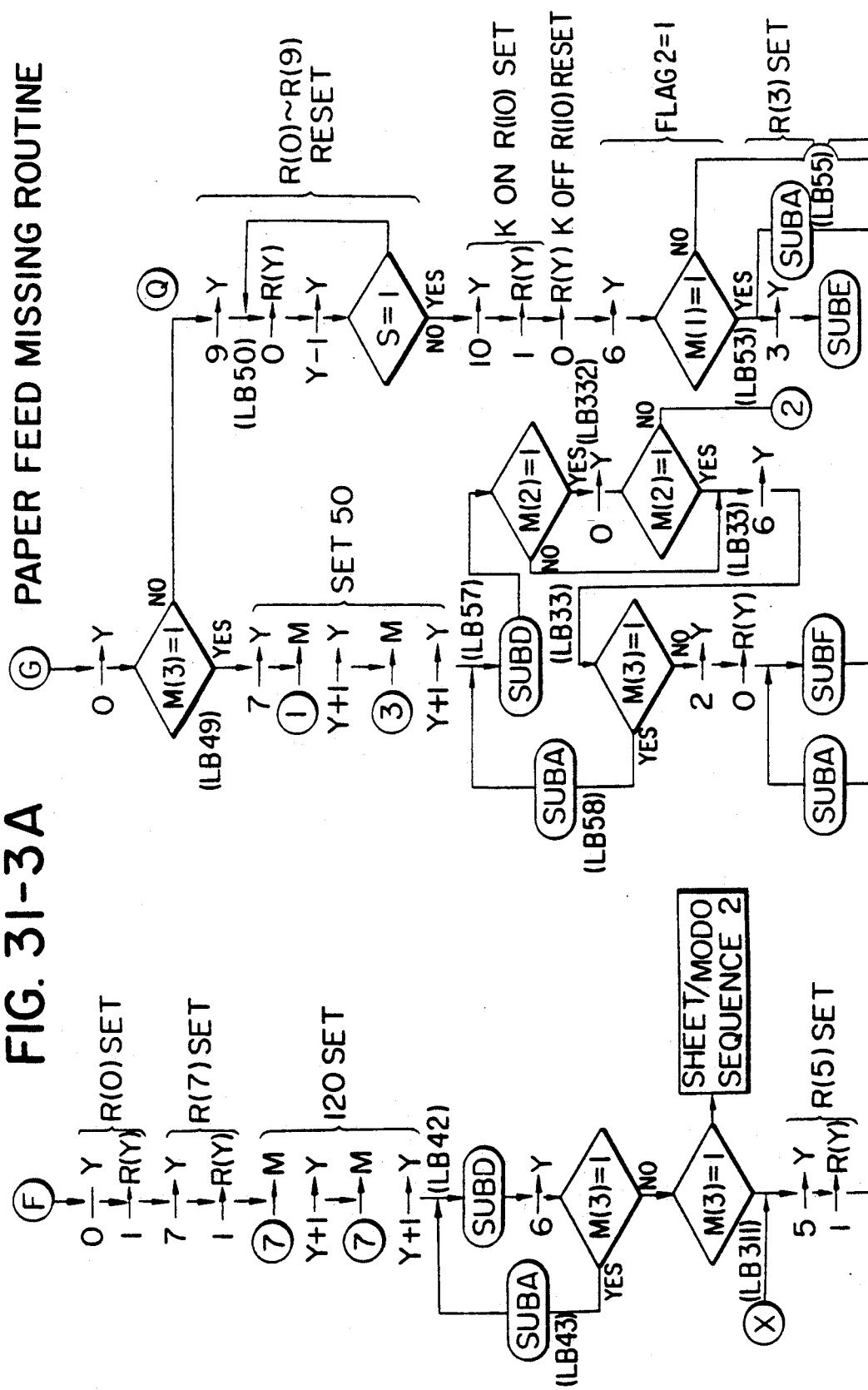
FIG. 31-3A PAPER FEED MISSING ROUTINE

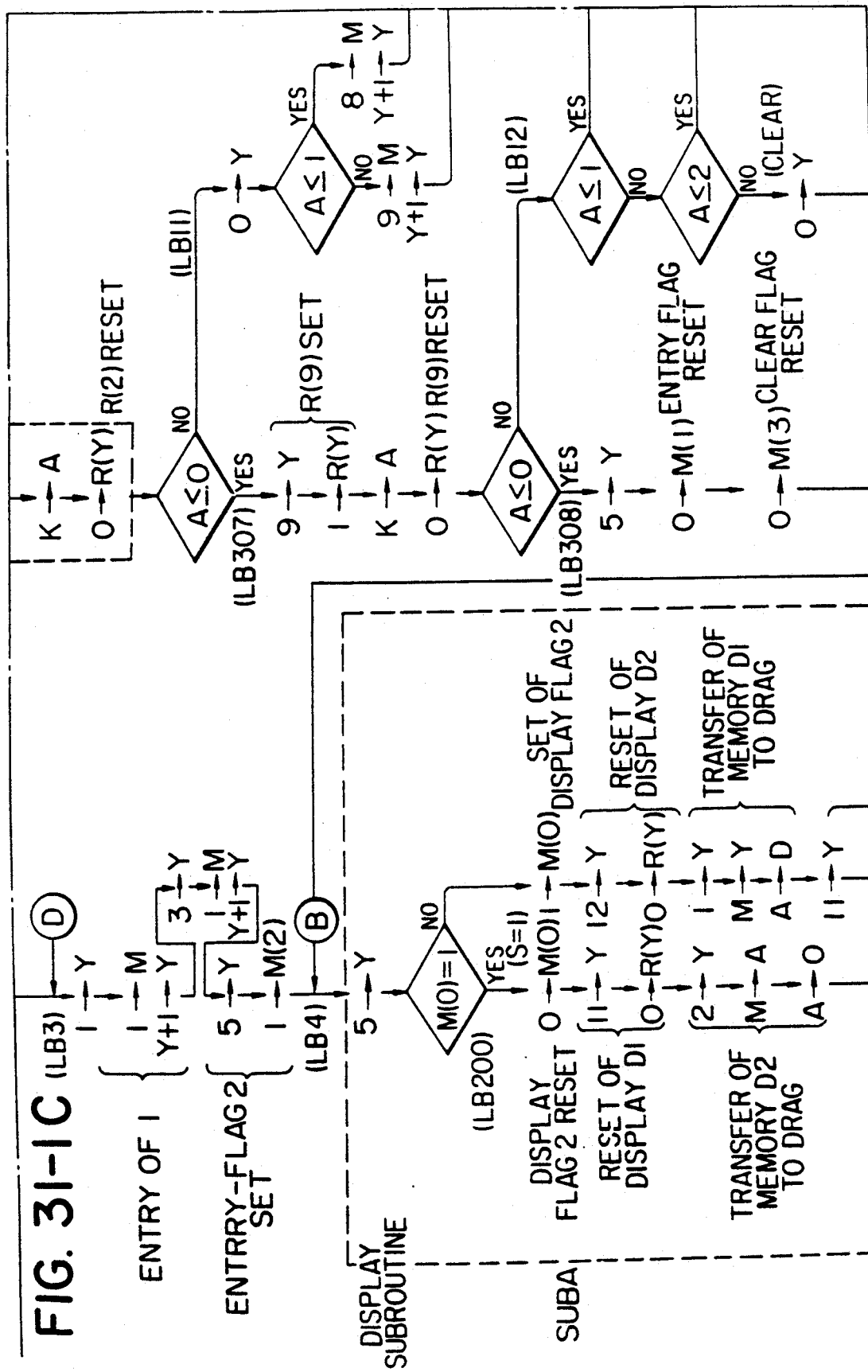

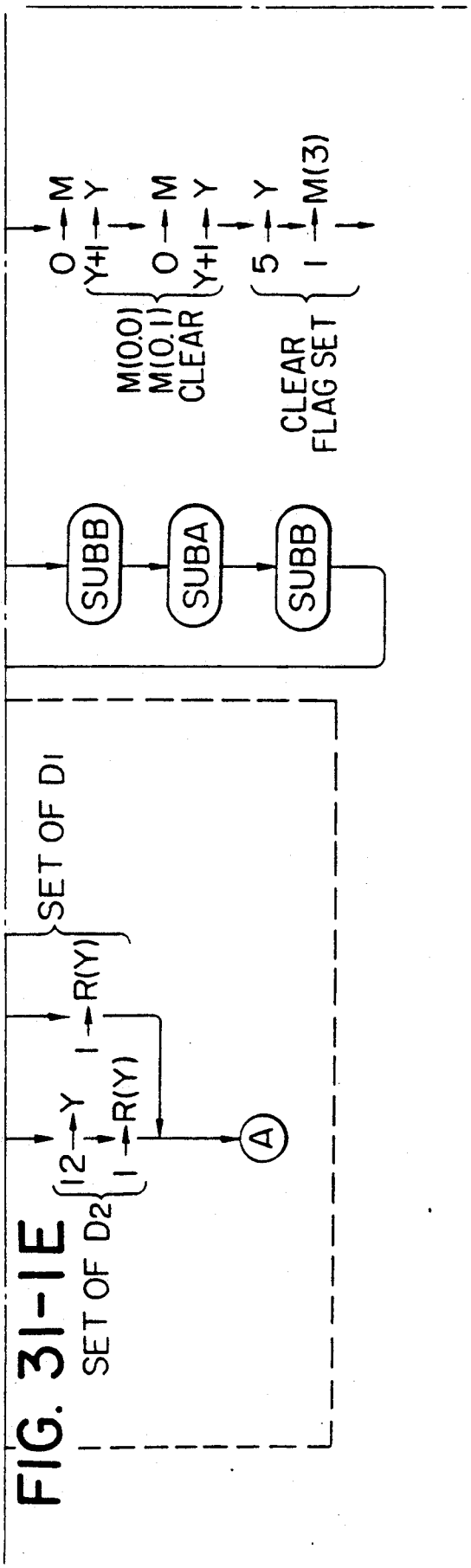
FIG. 31-IE

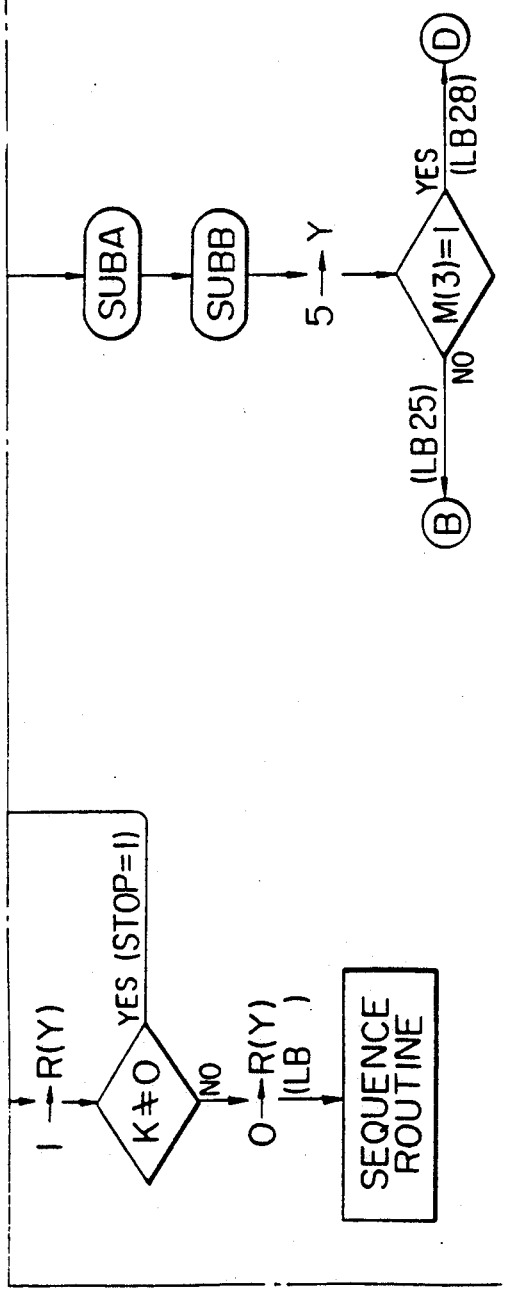

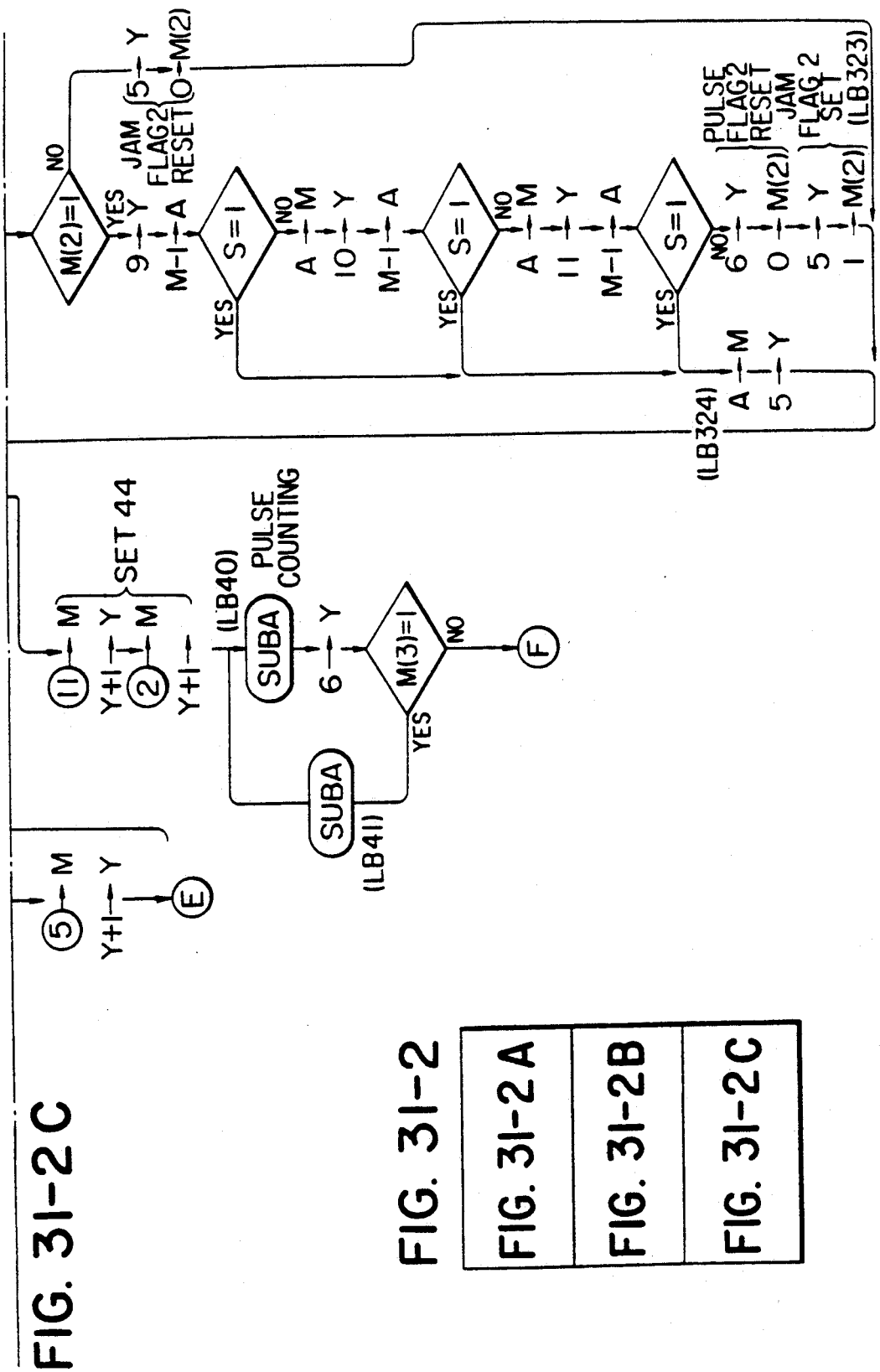

FIG. 31-2A

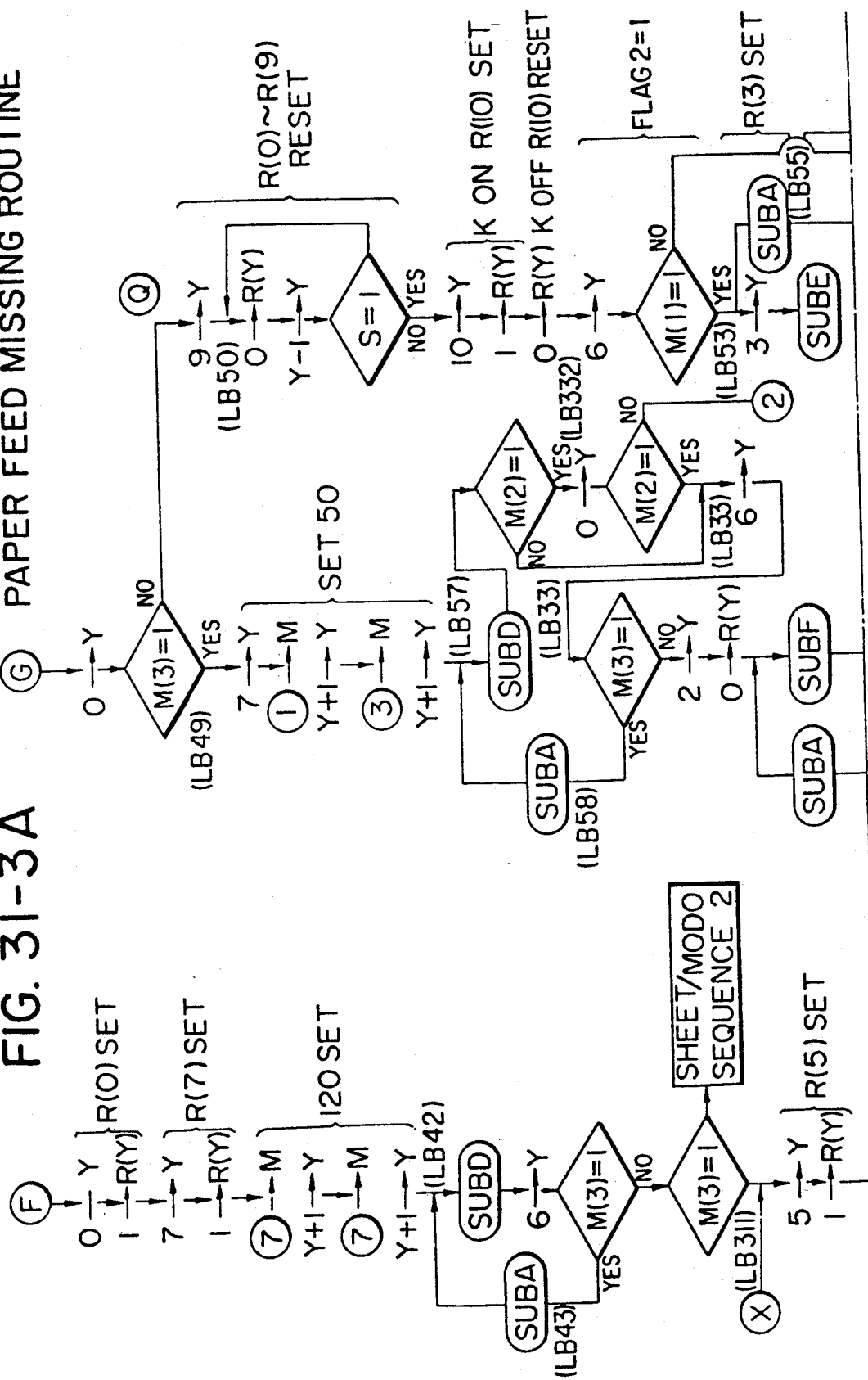
FIG. 31-3A PAPER FEED MISSING ROUTINE

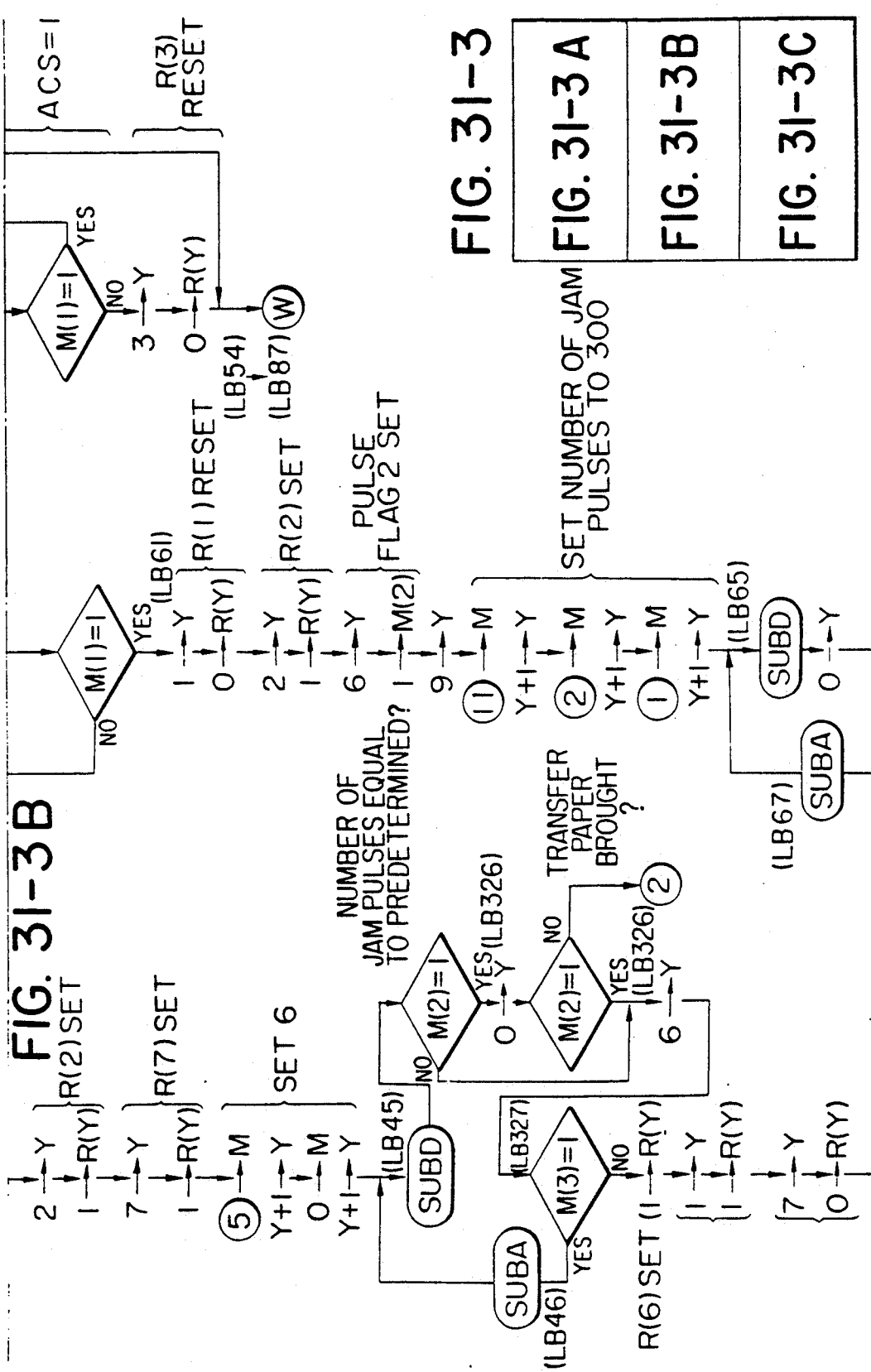

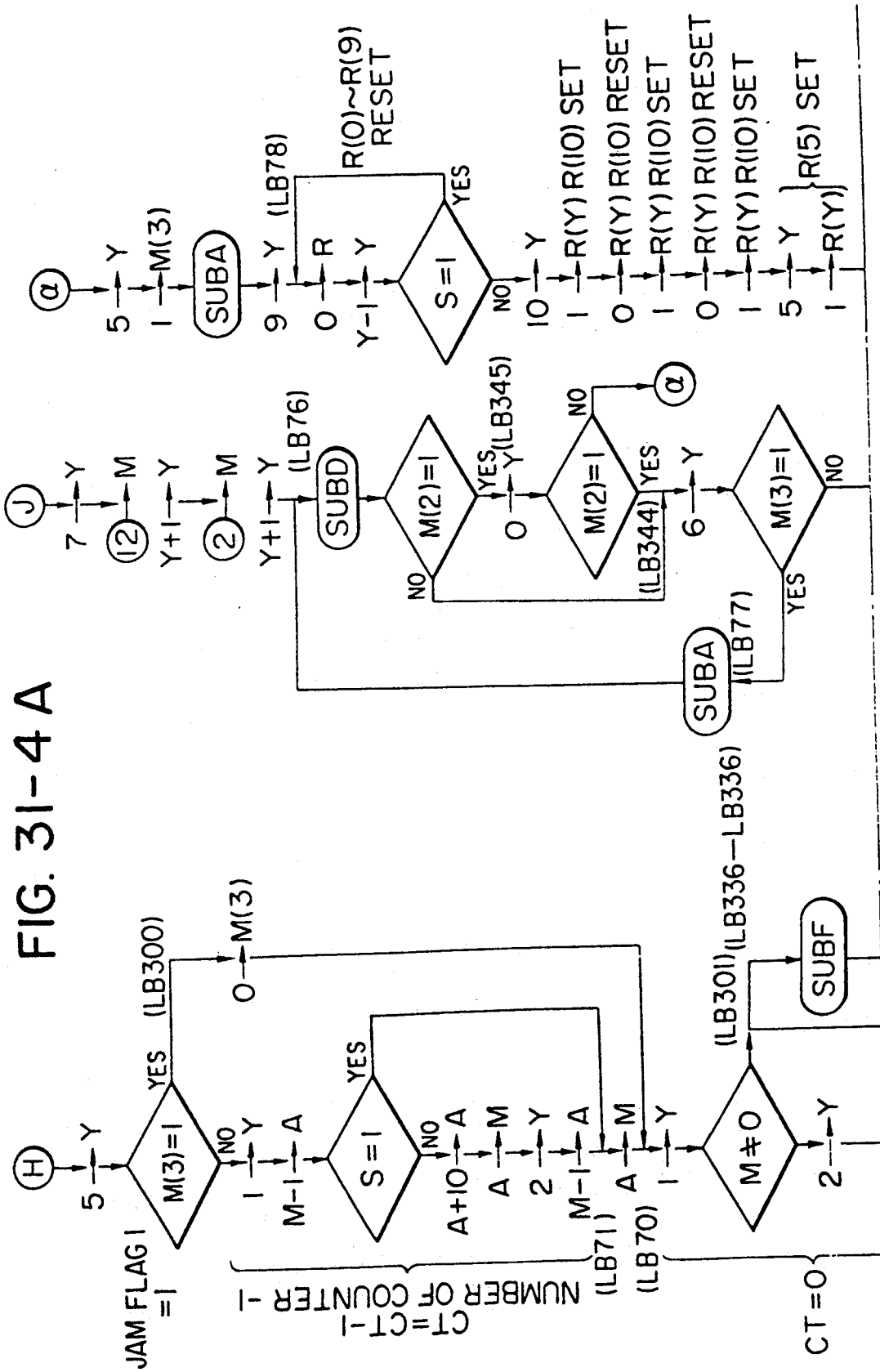

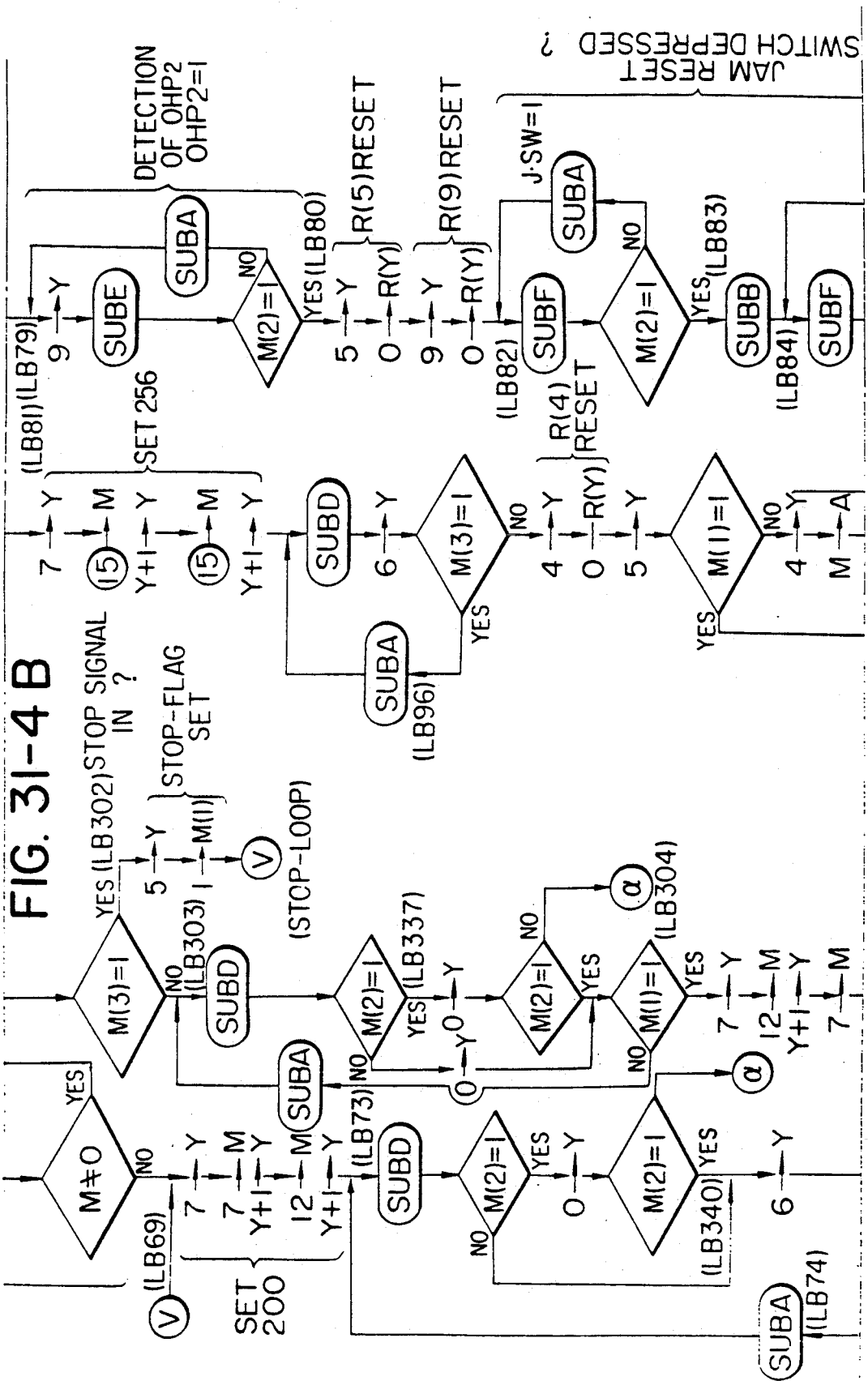

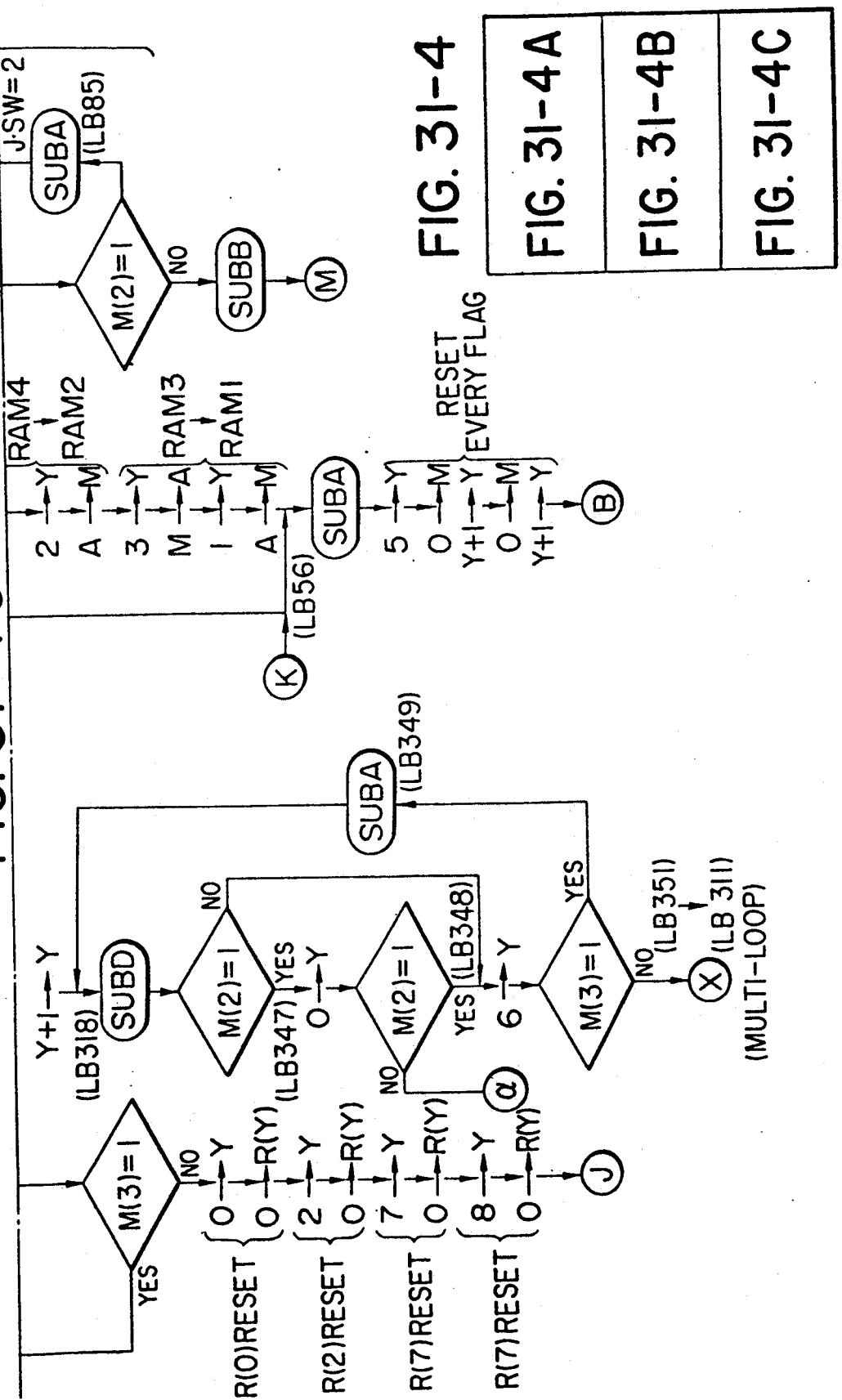

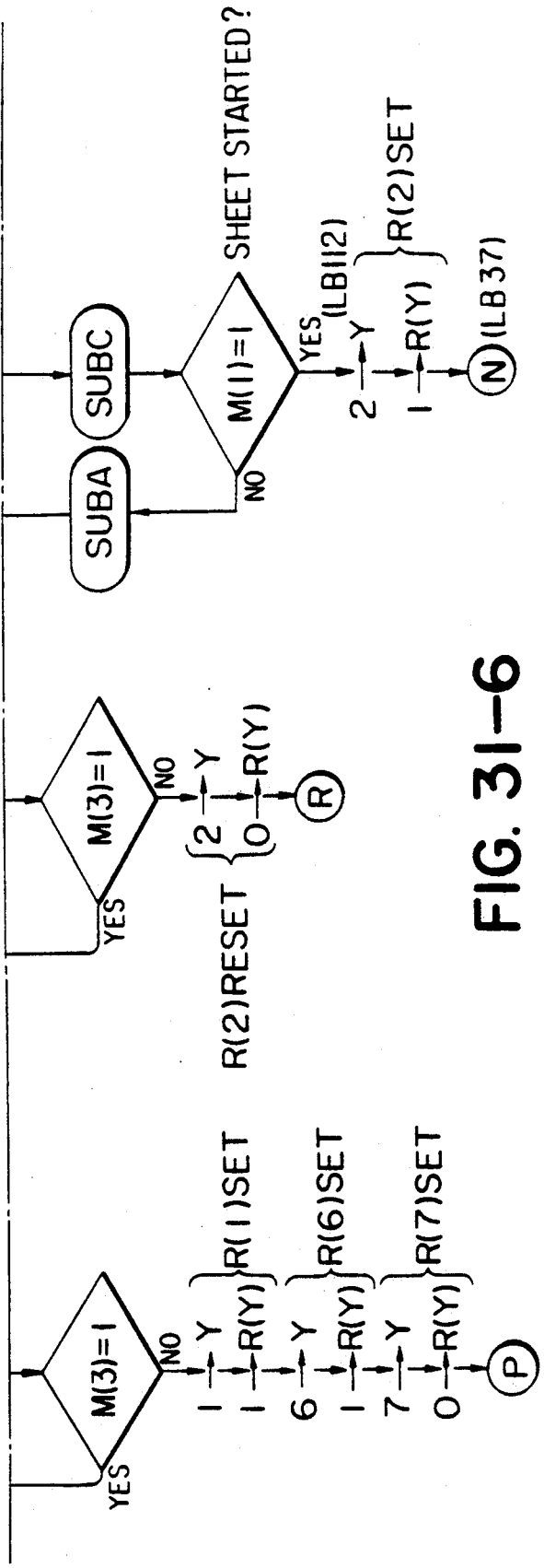

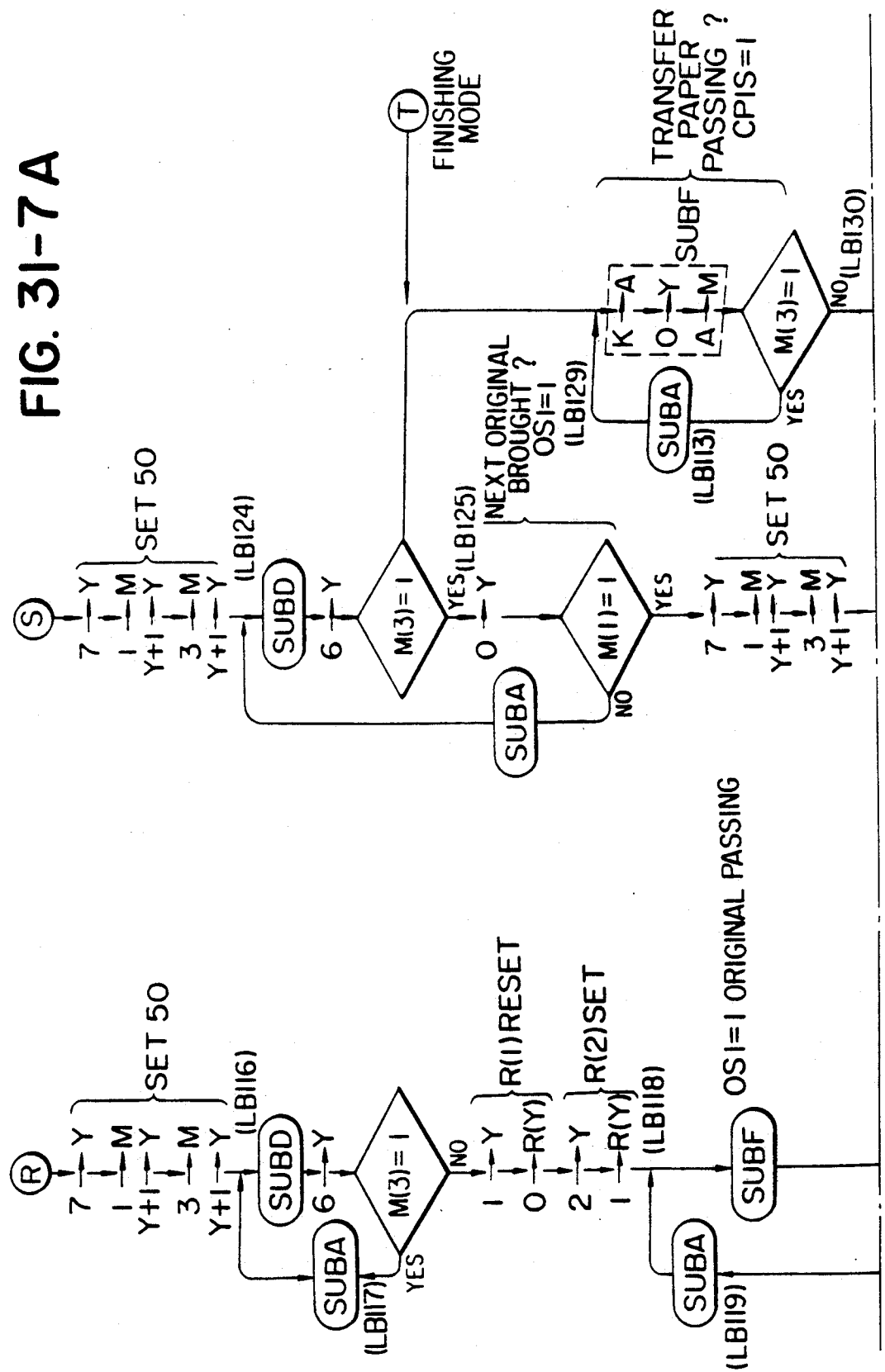

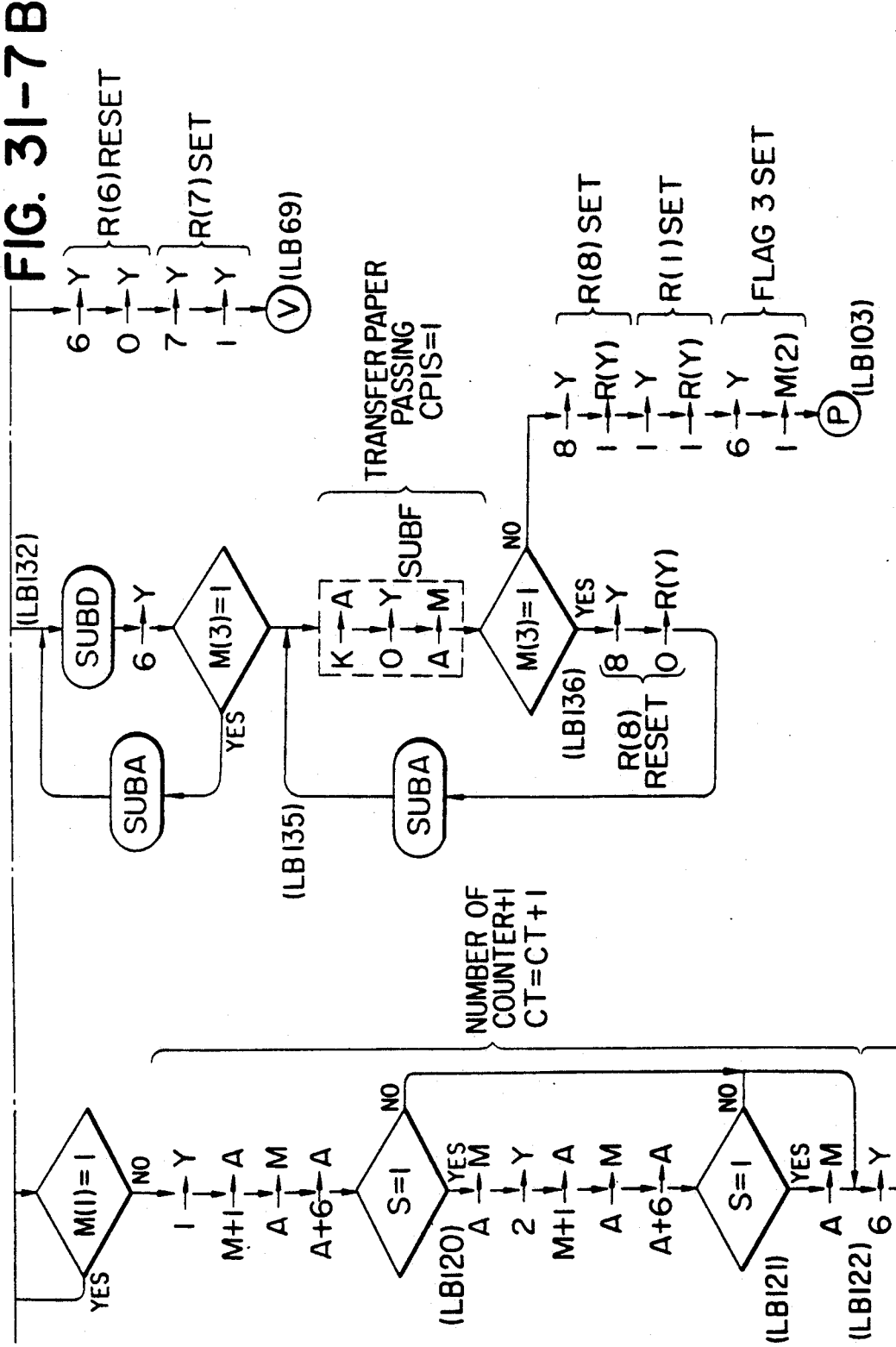

IMAGE FORMING APPARATUS HAVING STREAMLINED INPUT FOR CONTROL SIGNALS

This application is a continuation of application Ser. No. 07/008,119 filed Jan. 23, 1987, now abandoned, which was a continuation of application Ser. No. 675,650 filed Nov. 28, 1984, now abandoned, which was a continuation of application Ser. No. 288,211 filed Jul. 29, 1981, now abandoned, which is a divisional of application Ser. No. 882,614, filed Mar. 1, 1978, now U.S. Pat. No. 4,312,587.

BACKGROUND OF THE INVENTION

1. Field of the Invention

The present invention relates to an image forming apparatus adapted for use for example in a copier or a printer.

2. Description of the Prior Art

The process sequence control or timing control conventionally employed for example in copiers for controlling the process effecting means (equipment required for performing the steps of charging, imagewise exposure, development, transfer, fixing etc.) has been achieved by combinations of relay circuits or so-called hard wire logic circuits.

Such relay circuits or logic circuits, being designed and structured for a particular performance, require cumbersome redesigning and rewiring if there is any change in required performance. Also such circuits, if required to control several devices or to perform a complex control, result in extremely complicated structure and wirings, thus deteriorating the reliability and rendering the maintenance and inspection difficult.

Though there is also known a process sequence control system in which the sequence functions are pre-programmed, the drawback in complexity of circuit composition has not been solved.

SUMMARY OF THE INVENTION

An object of the present invention is to provide an image forming apparatus of a reduced dimension which is capable of performing plural functions thereby avoiding the above-mentioned drawbacks.

Another object of the present invention is to provide an improved image forming apparatus capable of performing process sequence control according to a stored program for controlling the functions of equipment in response to the instructions and detections.

Another object of the present invention is to provide an improved image forming apparatus provided with various instructing and displaying devices for operator.

Another object of the present invention is to provide an image forming apparatus of a transfer process with an improved timing control for exposure and transfer sheet feeding.

Another object of the present invention is to provide an improvement in a copying apparatus for copying thin and thick originals with an elevated efficiency.

Another object of the present invention is to provide an improvement in a copying apparatus provided with a plurality of cassettes accommodating recording web.

Another object of the present invention is to provide an image forming apparatus with a control system utilizing enlarged computer performance.

Another object of the present invention is to provide a copying apparatus provided with a moving optical system for exposure achieving a highly stable function with an elevated precision.

Another object of the present invention is to provide a copying apparatus provided with a transfer sheet feeding means achieving a precise and stable function.

Another object of the present invention is to provide a small table-top copier of multiple functions.

The above-mentioned and other objects will be achieved by the embodiments to be described in the following.

BRIEF DESCRIPTION OF THE DRAWINGS

FIG. 3 is a cross sectional view an optical system and an illuminating section of the present invention;

FIG. 5 is a perspective view of a drive-guide section of the optical system;

FIGS. 6 and 7 are cross sectional views of the illuminating section;

FIG. 8 is a schematic drawing of a conventional linear guide device;

FIGS. 22 and 23 are time charts in sheet mode;

FIG. 30 (including FIGS. 30A and 30B) is a partial flow chart of the control by CPU; and FIGS. 31-1 to 31-7 which includes FIGS. 31-1A through 31-1F, 31-2A through 31-2C, 31-3A through 31-3C, 31-4A through 31-4C, 31-5, 31-6A through 31-6C, and 31-7A through 31-7C are flow charts of the control by CPU.

DESCRIPTION OF THE PREFERRED EMBODIMENTS

Machine

Figure 1:
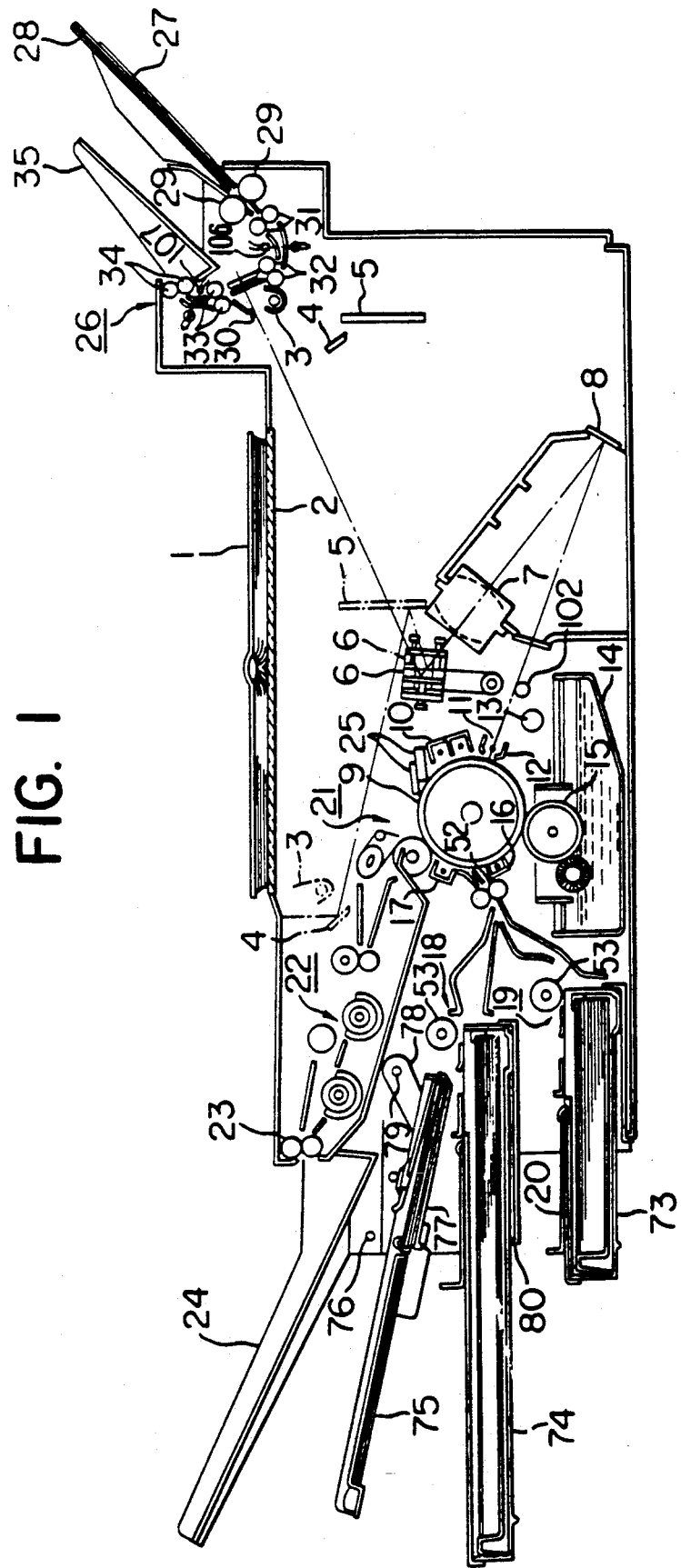
FIG. 1 is a cross sectional view of an example of a copier wherein the present invention is applicable.
Figure 12:
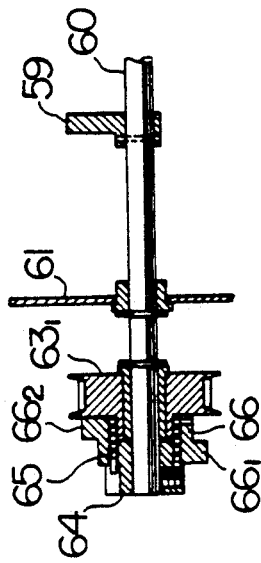
FIG. 12 is a perspective view thereof.

Referring to FIG. 1, an original 1 is placed on a glass plate of an original table 2 constituting an original supporting face on the upper surface of the machine casing, and is subjected to a slit exposure by means of an optical system consisting of an illuminating lamp 3, a first mirror 4 displacing integrally therewith, a second mirror 5 displacing in a same direction as that of said first mirror 4 with a velocity half of that of said first mirror 4, a switching mirror 6, a lens 7 and a fixed mirror 8, thereby to form an image of said original onto a drum 9.

The surface of said drum 9, which is an endless photosensitive member comprising an insulating surface layer, a photoconductive layer and a conductive base, is electrostatically charged with a charger 10, and, upon reaching the exposure section 11, is exposed to the image of the original, combined with simultaneous charge elimination by means of a charge eliminator 12.

The photosensitive drum surface is successively subjected to a flush exposure by a flush exposure lamp 13 to form an electrostatic latent image on said surface, and is introduced into a developing station 14.

The development is conducted by wet process utilizing a developing roller 15. Successively the excessive developing liquid is squeezed by a post-charger 16.

Then the image formed on said drum 9 is transferred, by means of a transfer charger 17, onto a copy sheet 20 supplied from a feed section 18 or 19.

The copy sheet, after the transfer, is separated from the drum 9 in the separating section 21, then is fixed in a fixing section 22 and ejected by means of an ejecting roller 23 onto a tray 24. On the other hand the photosensitive drum surface is cleaned by a blade 25 maintained in pressure contact with said surface to remove remaining toner on said drum, and is thus prepared for the succeeding cycle. In case of copying a bound original, the switching mirror 6 is placed in a position represented by double-dot chain lines.

An automatic feed device 26 for sheet originals can be utilized when the switching mirror 6 is placed in the full-line position and the moving mirrors 4, 5 are placed at the right end (full-line positions). In this case the original passing through the exposure section 30 is illuminated by the lamp 3, and the image of said original is formed, by means of said switching mirror 6, lens 7 and fixed mirror 8, onto the drum 9. Said lamp 3 is same as that used for the bound original. The sheet originals 28 are stacked on an original table 27 of the automatic feed device 26, and an uppermost sheet is separated by means of a separating roller 29 and conveyed, by means of a series of feed rollers 31, 32, 33 and 34, through the exposure section 30 to the original tray 35.

Automatic continuous feeding of sheet originals can be achieved by said automatic feed device 26. Also by making the transfer speed of said feed rollers 31-34 somewhat faster than that of said separating system 29, it becomes possible to provide a gap between the succeeding sheet originals whereby the detection of the leading or trailing end of each sheet original is facilitated.

FIG. 1 shows a state wherein either a main cassette 73 or a sub-cassette 74 is usable, in connection therewith an upper or a lower feed roller 53 being actuated by means of a switching button.

Figure 2:
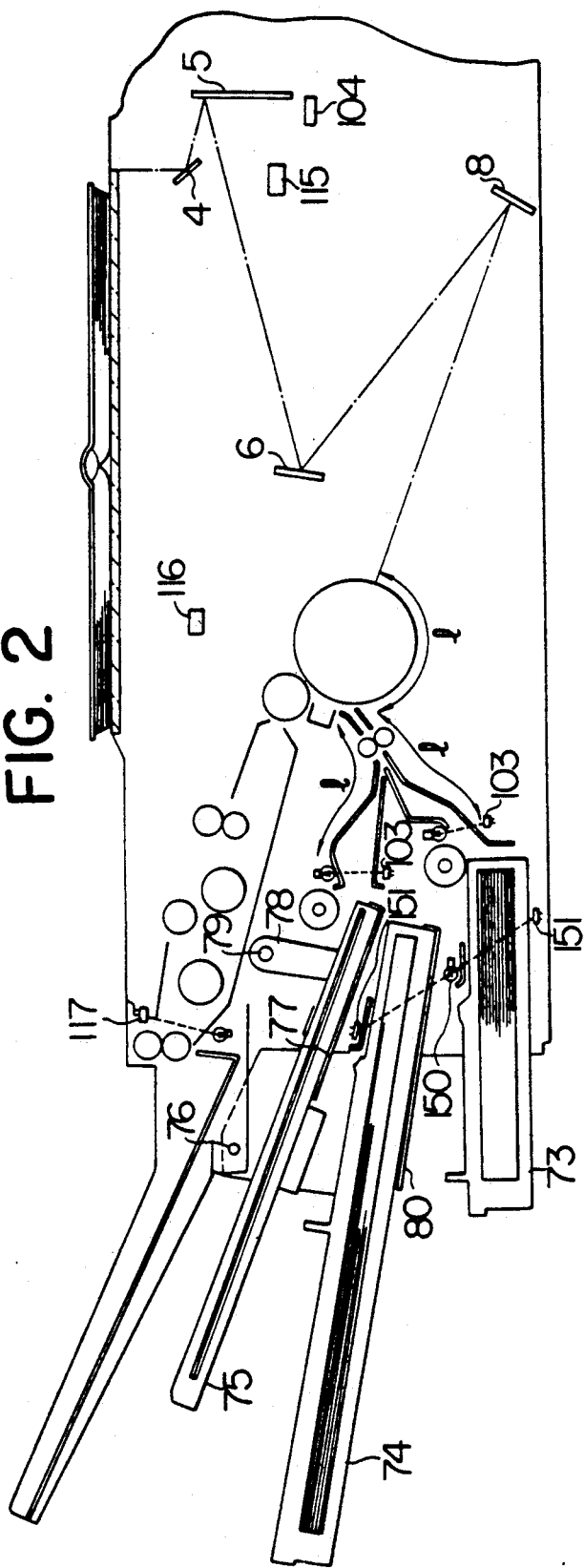
FIG. 2 is a cross sectional view of a paper feed section thereof wherein a manually inserted cassette is utilized.

FIG. 2 shows a state wherein a manually inserted cassette 75 is used. A cassette receiver 80 is articulated to an axis 76 fixed on the main body.

The manually inserted cassette 75 is slidably mounted on a cassette receiver 77, of which an extremity is fixed to a shaft 79 articulated on the main body. The shaft 79 is rendered swingable by means of a motor and the position thereof is selectable by means of a button.

Also as shown in FIG. 2, there are provided paper detecting elements (a lamp and a light-receiving element 103) in a position in the copy sheet path corresponding to the distance 1 between the exposure section and the transfer section. Upon detection of the trailing end of a copy sheet the optical system is reversed by a control to be explained later.

Now referring to FIGS. 3 to 7 there will be given an explanation on the guiding of optical system and on the illuminating section.

Figure 4:
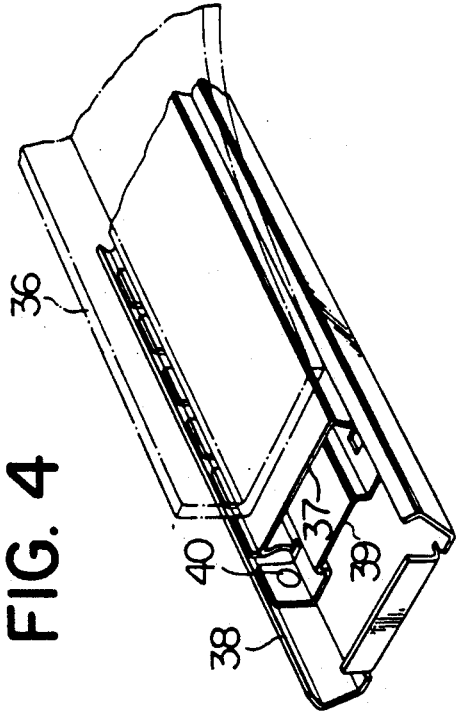
FIG. 4 is a perspective view showing an accuride utilized as a linear guide device.
Figures 1B, 31:
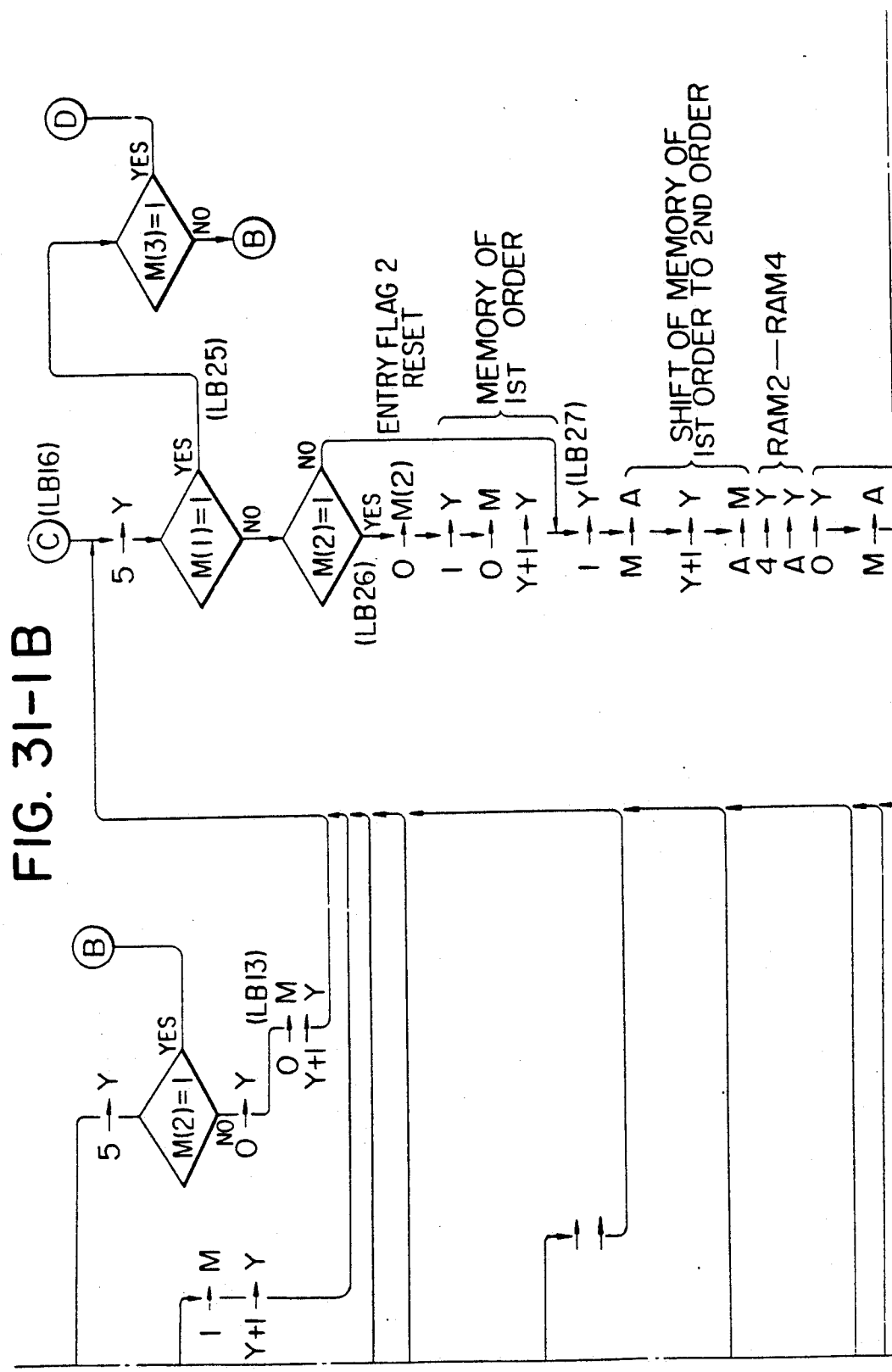
Figures 1A, 31:
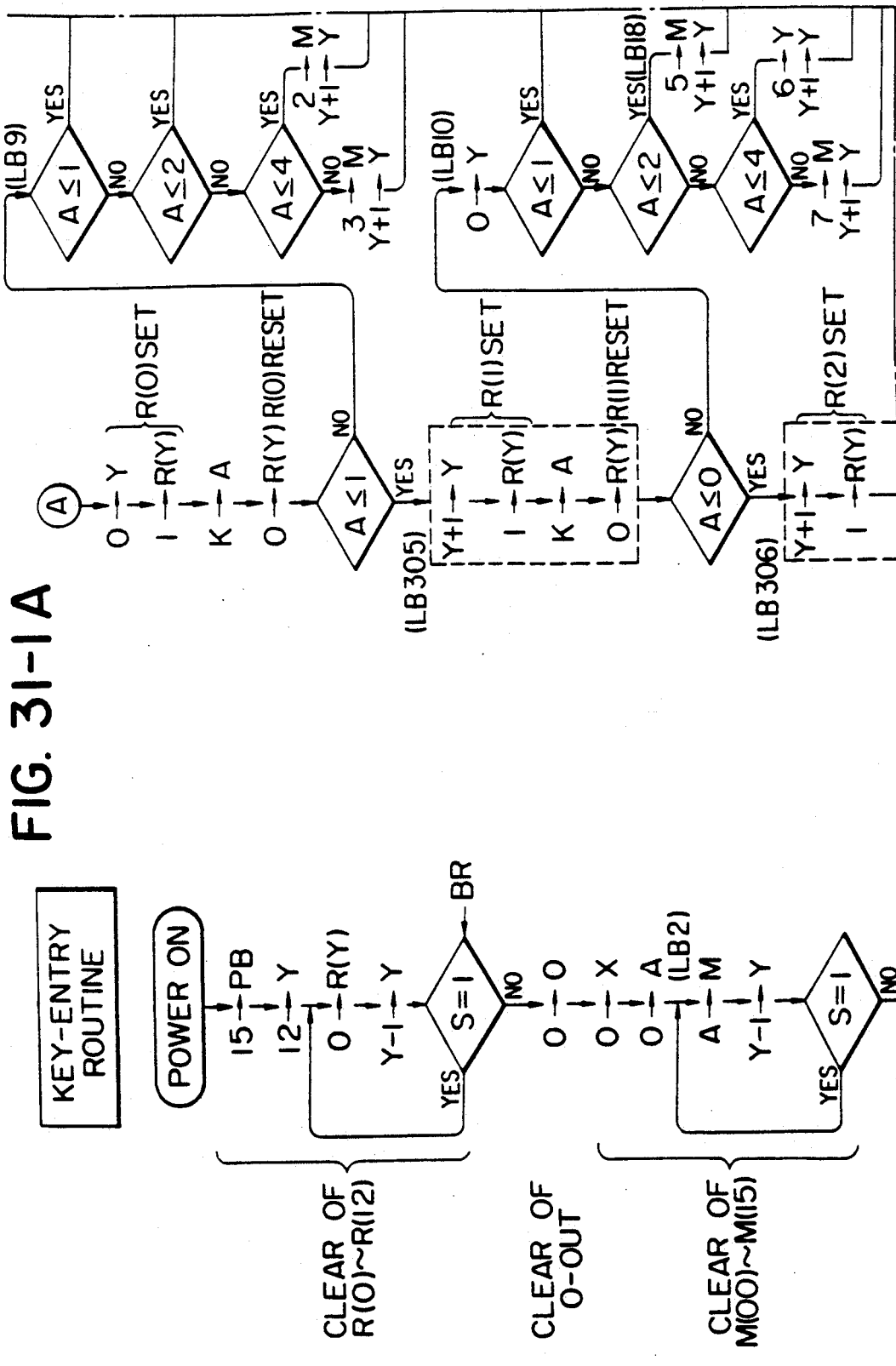
Figures 1D, 31:
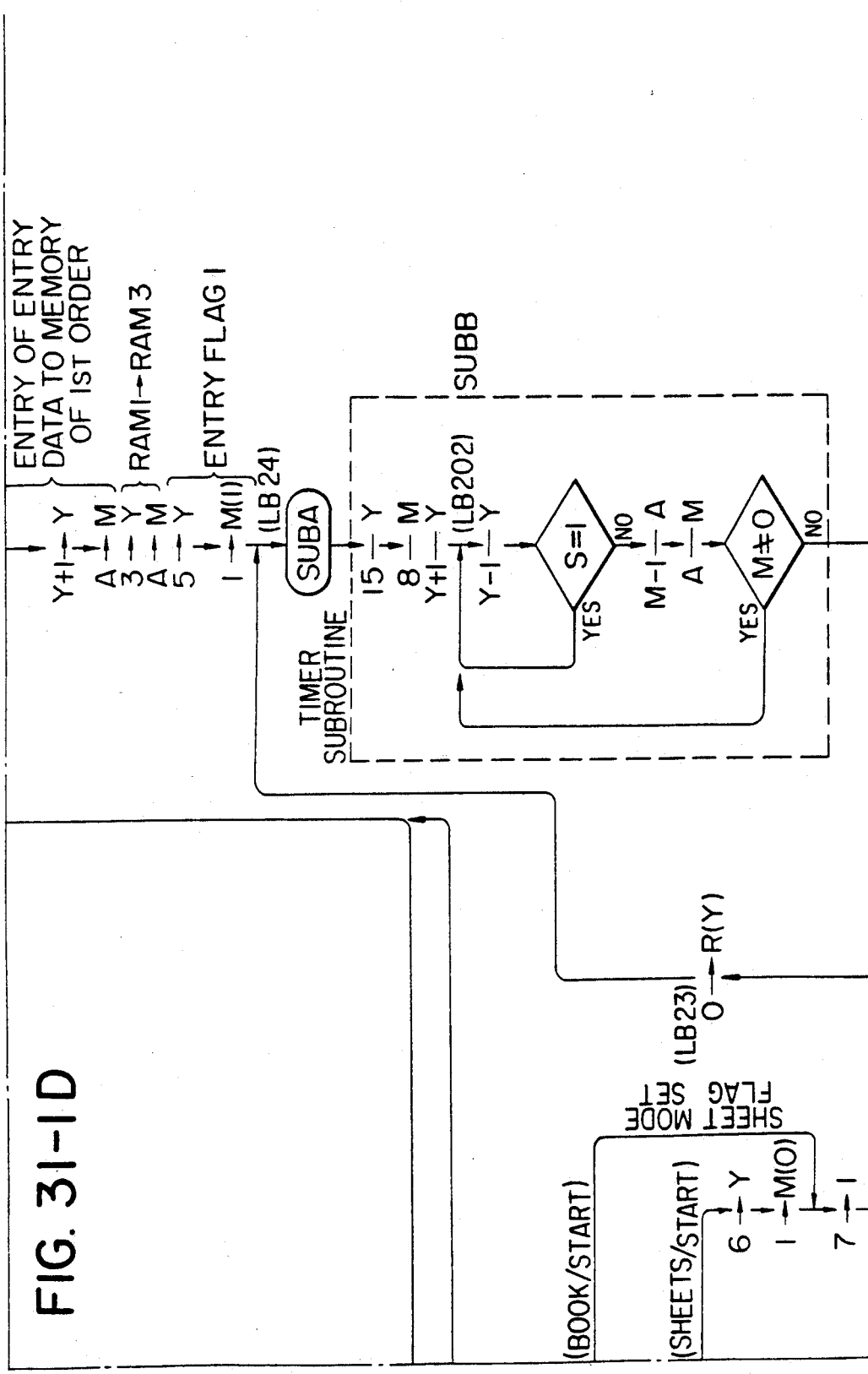
Figures 2B, 31:
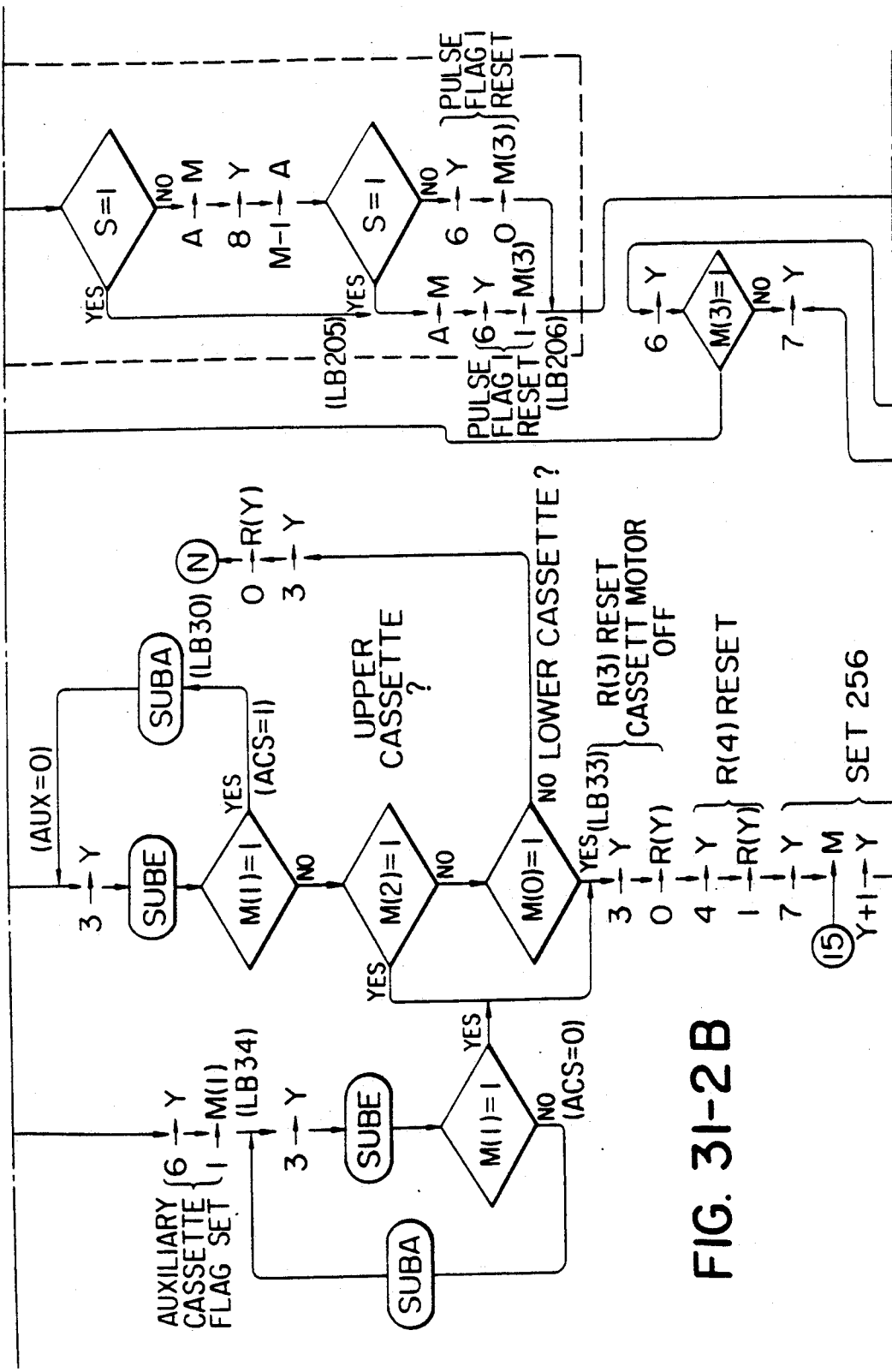

The first mirror 4 is fixed on a supporting member 36 which is coupled with an inner member 37 of a linear guide known under a trade name "Accuride". The Accuride is provided, as shown in FIG. 4, with a structure of a plurality of rollers 40 retained by a retainer 39 within two linear spaces each composed of grooves respectively formed on an inner member 37 and an outer member 38, whereby said inner member 37 is guided linearly with respect to said outer member 38. Said spaces confining said rollers 40 are dimensioned slightly smaller than the outer diameter thereof to give a predetermined pressure thereto whereby a relative movement without play being realized between said inner and outer members. As shown in FIG. 5, the outer member 38 covers the stroke of said first mirror 4 and mounted to the machine frame (not shown) by means of mounting members 41. The inner member 37, being of a length substantially equal to that of mounting portion of the supporting member 31 for said first mirror, is guided over the full length of said outer member, riding switchingly on many rollers 40. On the other end of said supporting member 36 there is provided a roller 42 supported by a rail 43 fixed to the main body.

The second mirror 5 is fixed to a supporting member 44 which is in turn fixed to an inner member 37 of a downwardly fixed Accuride. A conventional linear guide system is schematically shown in FIG. 8, wherein mirror supporting members 36, 44 are linearly guided along a rod-shaped rail 45 supported on both ends thereof. Such system is unable to guide the mirrors stably and with high precision because (1) the rail 45, being only supported by the both ends thereof, is of a limited rigidity, (2) the span (l) of supporting portion particularly of the supporting member for the first mirror has to be limited in order to avoid mutual interference of supporting portions of said supporting members, and (3) a certain play is inevitable between the rod and the thrust bearing fitted thereon. In contrast thereto, the mechanism according to the present invention enables a stable reciprocating movement with an extremely high precision because (1) the Accuride can be fixed, at any portion thereof, to the main body, (2) the Accuride itself has a large dimension with an accordingly enlarged cross section, (3) the supporting span (l) can be made satisfactorily large as there is no mutual interference between the supporting portion of the Accuride and the supporting portions of supporting members for the first and second mirrors, and (4) there exists no play between the inner and outer members as explained before.

Figures 3C, 31:
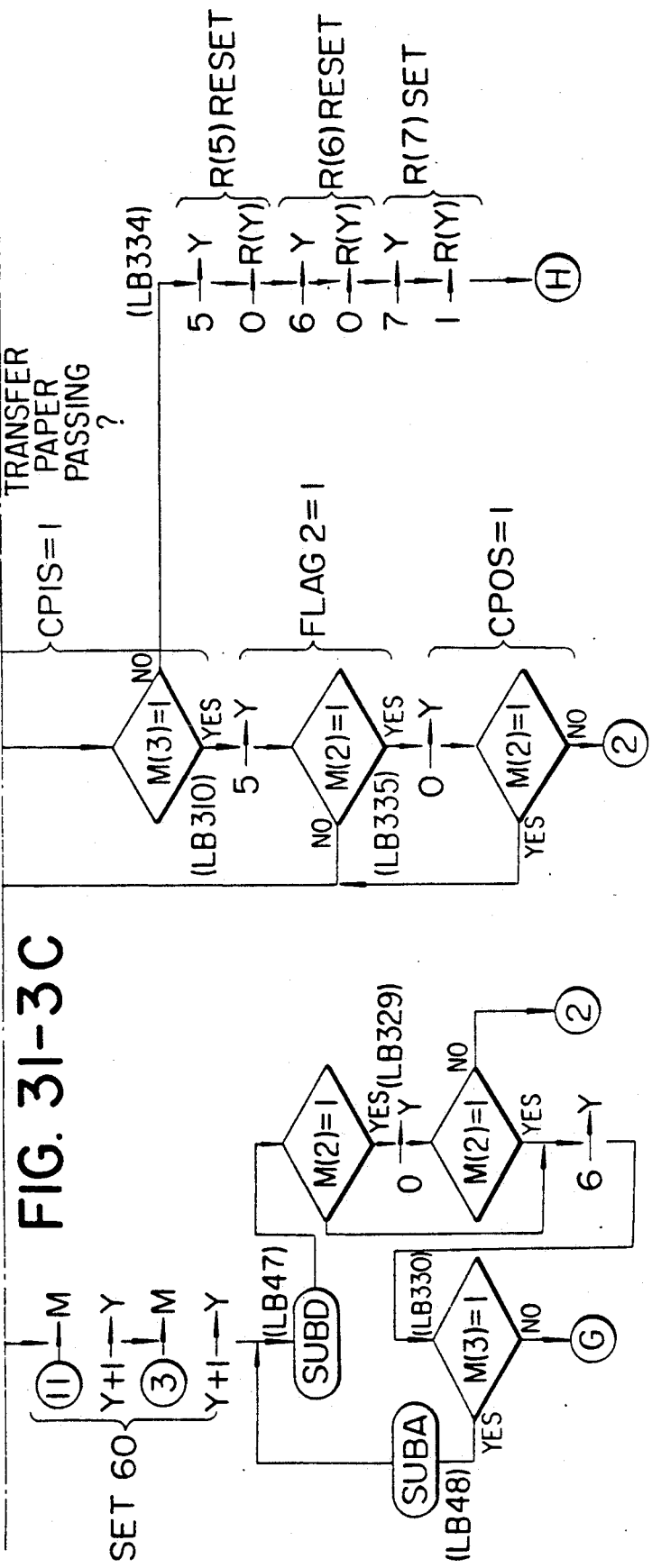
Figures 5, 31:
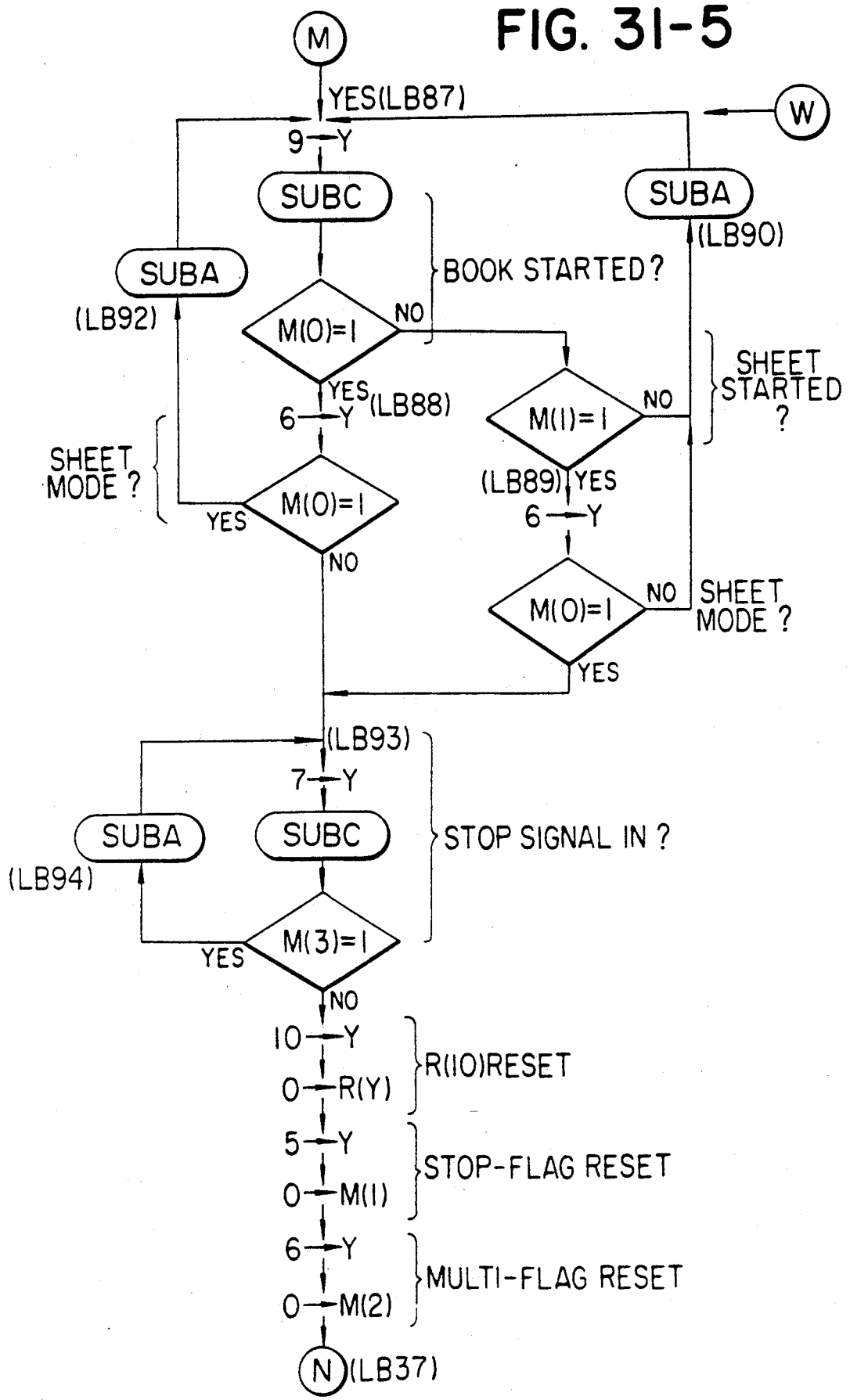
Figure 7C:
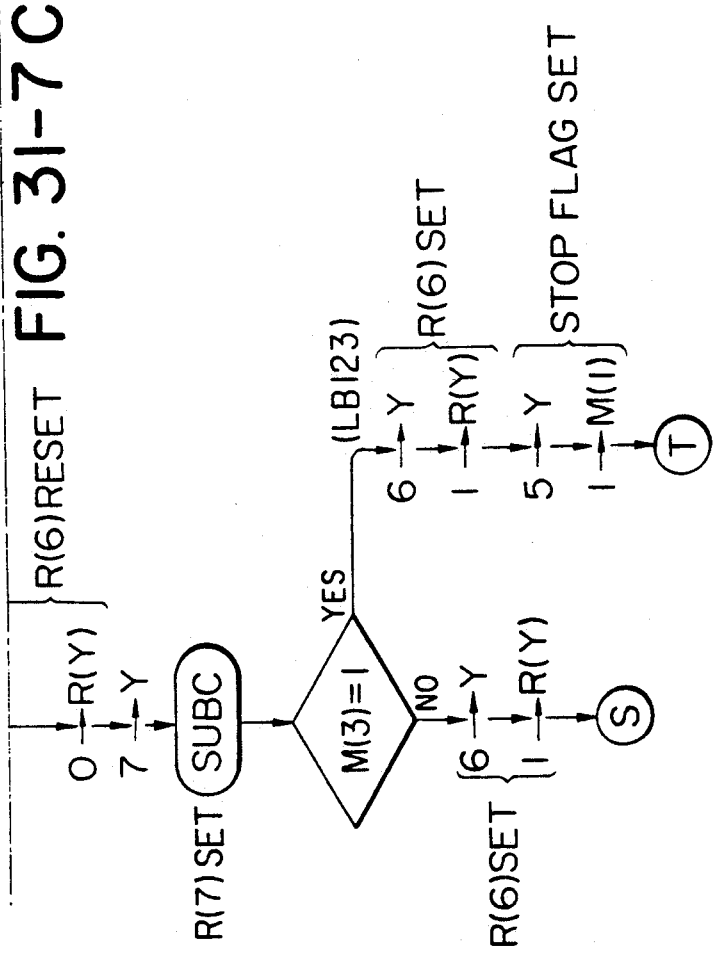

In FIG. 3 the full-lined positions are home positions from which the first and second mirrors 4, 5 are displaced to the right to perform scanning of the original, and, upon completion thereof, are returned to said home positions by means of a spring 45. In case a button for automatic feed device for sheet originals is actuated, the mirror 5 is displaced by means of a clutch motor to the chain-lined position at right and locked there as to be explained later. In this case the lamp 3 is displaced to a position allowing illumination of sheet originals. The details of related portion are shown in FIGS. 6 and 7.

FIG. 6 shows a state of scanning an original placed on the glass plate of original table 2. A supporting arm 46 fixed to the mirror supporting member 36 is provided with an axis 47, on which rotatably supported is an integral structure of an illuminating lamp 3, a reflector 48 and a supporting follower 49, wherein said follower 49 being provided at an end thereof with a roller 50 to enable the function thereof as a follower. FIG. 6 shows the details in the vicinity of the first mirror 4 during the copying of a bound original, while FIG. 7 shows the details in the vicinity of the illuminating section while the automatic feed device for sheet originals is in function. Upon displacement to the right-hand end, the first and second mirrors mutually approach due to the speed difference therebetween. The supporting member 44 for the second mirror is provided with a cam plate 51, which is traced by said roller 50 to direct the lamp 3 and the reflector 48 toward the exposure section 30 of a sheet original as shown in FIG. 7.

Now there will be given a detailed description on the paper feed section while referring to FIGS. 9, 10, 11 and 12. A paper feed roller 53 is fixed on an axis 54 thereof which is rotatably supported on an arm 55. Said arm 55 is provided with a fixed shaft 56 which is rotatably supported by the main frame, whereby said paper feed roller 53 is rendered rotatable around the shaft 56. The arm 55 is further provided with a spring 57 biasing said arm upwards. The axis 54 is provided with a follower roller following a cam 59 which is controlled by a single-rotation clutch adapted to making an intermediate stop during rotation, as explained in the following with reference to FIGS. 11 and 12. A cam shaft 60, passing through and supported by a frame 61, is provided with a pulley 63 which is driven by a motor through a belt 62. A spring clutch consisting of a drum portion $63_1$ of said pulley 63, a clutch drum 64 fixed on said shaft 60, a clutch spring 65 and stop ring 66 is controlled by a solenoid 67. When the solenoid 67 is not energized, a lever 68 is located in a full-lined position in FIG. 11 to engage a projection $66_1$ of said stop ring with said lever 68 thereby maintaining the clutch in disconnected position. Upon energizing of the solenoid 67 the lever 68 is displaced to a chain-lined position 68' to release the engagement with said projection $66_1$ whereby the clutch is connected to cause rotation of the cam 59. However, upon rotation of ca. 180°, another projection $66_2$ becomes engaged with the lever 68' to again disconnect the clutch, whereby the paper feed roller 53 is lowered by said cam 59 to a chain-lined position 53' shown in FIG. 9.

In said lowered position a friction pulley 69 (FIG. 10) provided on one end of the paper feed roller shaft 54 comes into friction contact with a constantly driven capstan 70 (FIGS. 9, 10) to drive said paper feed roller 53.

Figure 11:
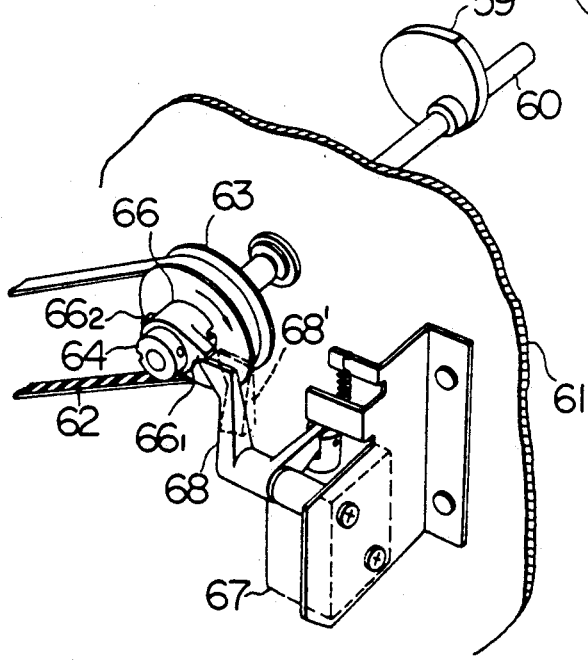
FIG. 11 is a perspective view of a clutch mechanism for controlling a paper feed device.

Deactivation of solenoid 67 disengages the projection $66_2$ from the lever to connect again the clutch, which is again disconnected upon returning to the original full-lined position in FIG. 11 after a rotation of ca. 180°. The clutch spring 65 is engaged at one end thereof with the stop ring 66 and at the other end thereof with the clutch drum 64 to maintain relative positional relationship between the projections $66_1$, $66_2$ of the stop ring 66 and the cam 59 even after repeated clutch functions.

Such intermediate stop function of the cam is useful in increasing the design freedom, as the stopping can be freely selected by the period of solenoid activation.

Figure 13:
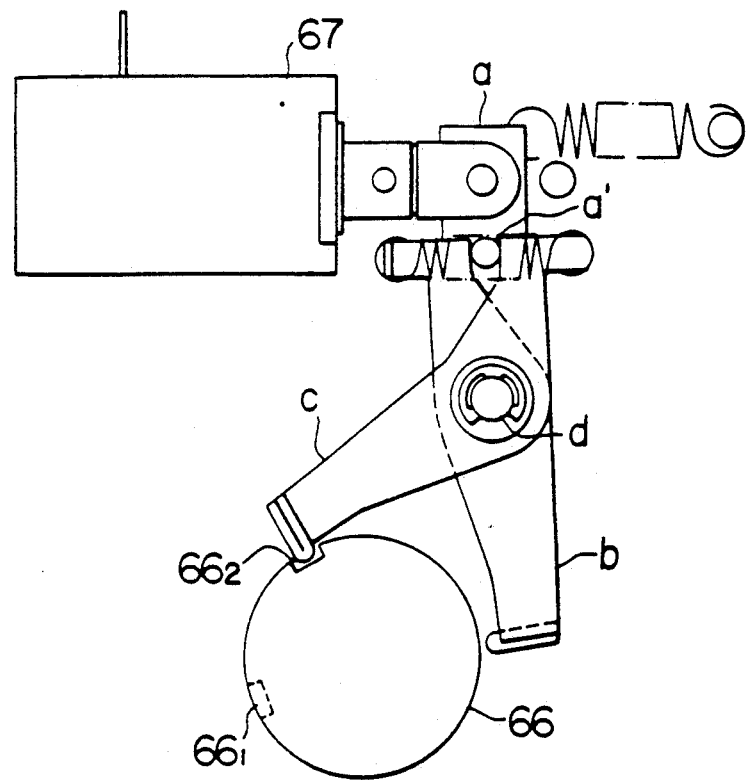
FIG. 13 is a cross sectional view of a conventional paper feed control clutch.

FIG. 13 shows a conventional example of cam control mechanism for achieving such intermediate stop, wherein (66) is a stop ring, ($66_1$) and ($66_2$) are recesses for stopping said stop ring, and (b) and (c) are levers provided rotatable around a shaft (d) to engage with said recesses. A lever (a) with a pin (a') is rotated by a solenoid (67) around said shaft (d) to control said levers (b) and (c). Though a detailed explanation of the functions of such conventional system is omitted herein, the mechanism of the present invention is apparently simpler than such conventional system, and is therefore cheaper and more reliable. In contrast, the conventional system is inevitably of a lower reliability and of a higher cost due to the accumulated precisions (allowances) of component parts and to complex mutual movements of the component parts.

Figure 9:
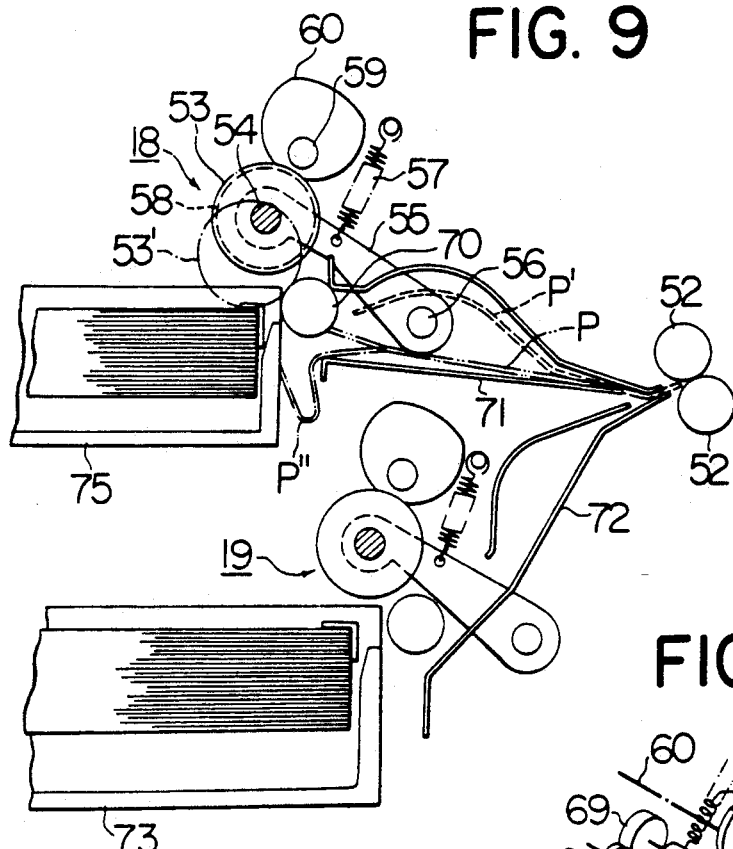
FIG. 9 is a cross sectional view of the paper feed section.
Figure 10:
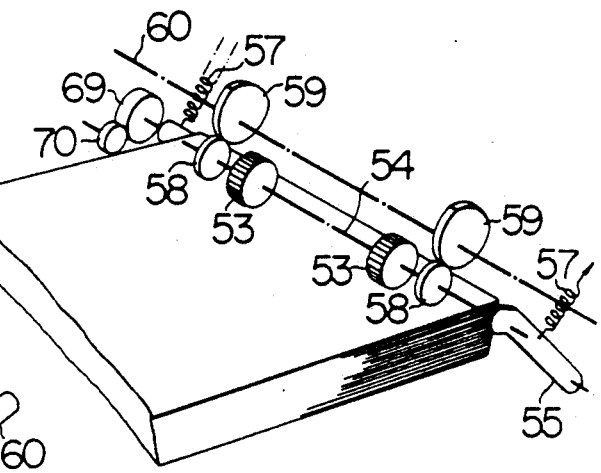
FIG. 10 is a perspective view thereof.

Now referring to FIG. 9, a paper sheet ejected from a cassette 73, 74 or 75 is advanced as indicated by doubledotted chain line P by the direction of ejection, rigidity and weight of paper, thus coming into contact with register rollers 52 which are in stopped state to form a loop P', and is further advanced upon start of rotation of said rollers 52. Such conventional paper feed mechanism often fails to form a desired loop P' but results in paper jamming between the cassette 75 and a guide plate 71 resulting from formation of an inverted loop P''. This is found out due to insufficient air supply between the paper and the guide plate 71 when the paper sheet is to be displaced from the state P to P' whereby the paper remains being pressed in the position P.

Figure 14:
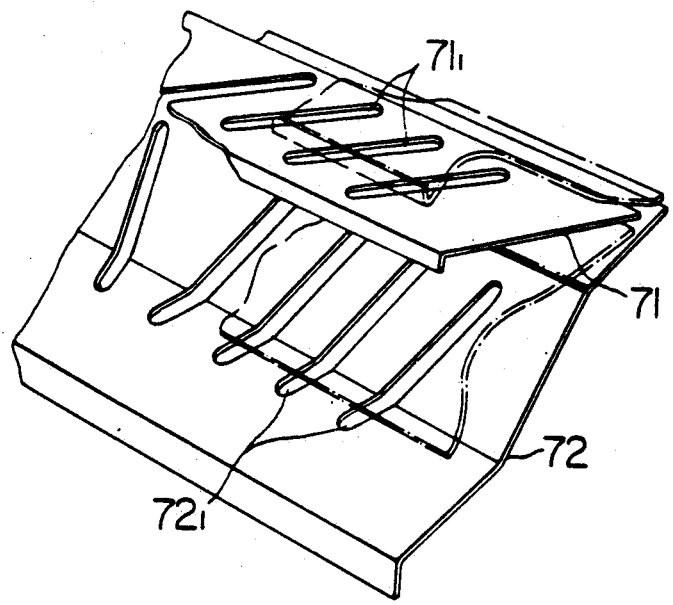
FIG. 14 is a perspective view of a loop forming guide plate.

In order to prevent such trouble, therefore, the guide plate 71 and the lower guide plate 72 are respectively provided with plural openings $71_1$, $72_1$ for air supply as shown in FIG. 14. Said openings may be provided on either one of said guide plate. Though in the embodiment illustrated in FIG. 14 there are provided oblong openings in spreading arrangements toward the downstream in order to avoid engagement with paper sheet, a similar effect can also be obtained by providing plural circular openings.

Control

Now there will be given an explanation on the process control according to the present invention. The present invention is featured in that a high-speed continuous copying is rendered possible by controlling the functions of original feeding and otherprocess means by the position of a transfer sheet after the start of feeding thereof, regardless of the size of said transfer sheet; further in that the process timing can be maintained unchanged through a process control achieved by reading a memory storing programmed process timing for book mode and sheet mode even when a mode is instructed after the process is started with another mode; further in that a limited number of output lines is effectively utilized in program control by counting the signals from load control signal lines and controlling the functions of plural loads; and further in that a limited number of input signal lines is effectively used to reduce the power consumption by combining the input means of instructing copy number and detecting copy state with the output signal lines of program control.

Operation input section

Figure 15:
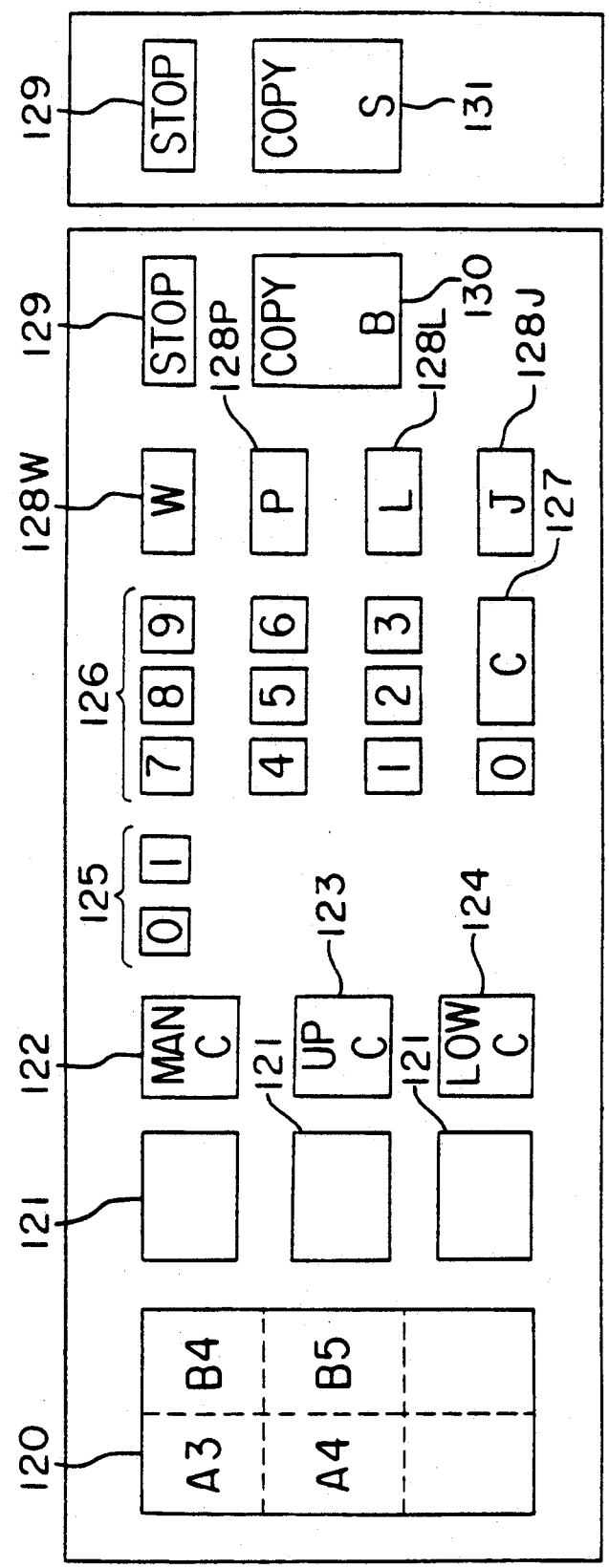
FIG. 15 is an elevation view of a copy control section.

FIG. 15 shows a control for controlling the copier of the present invention.

120 is a display section for indicating the paper size in the cassette, 121 are display elements for indicating a selected cassette, 122 is a switch for selecting a manually inserted cassette, 123 is a switch for selecting the upper cassette, 124 is a switch for selecting the lower cassette, wherein said switches being retaining switches, each of which, upon actuation, turns off other switches. 125 are display elements for indicating the preset copy number and the number of copies made, 126 are ten keys for presetting the copy number, 127 is a clear key for correcting the preset copy number, 128W, 128P, 128L and 128J are display elements for respectively indicating Waiting, Paper lacking, Liquid lacking and Jammed paper, 129 is a stop button for temporarily interrupting the copying, 130 is a start button for book copy, and 131 is a start button for automatic feeding of sheet originals.

Computer control

In the following there will be given an explanation of an embodiment for performing the sequence and other controls of the above-mentioned copier by means of a microcomputer.

Figure 25:
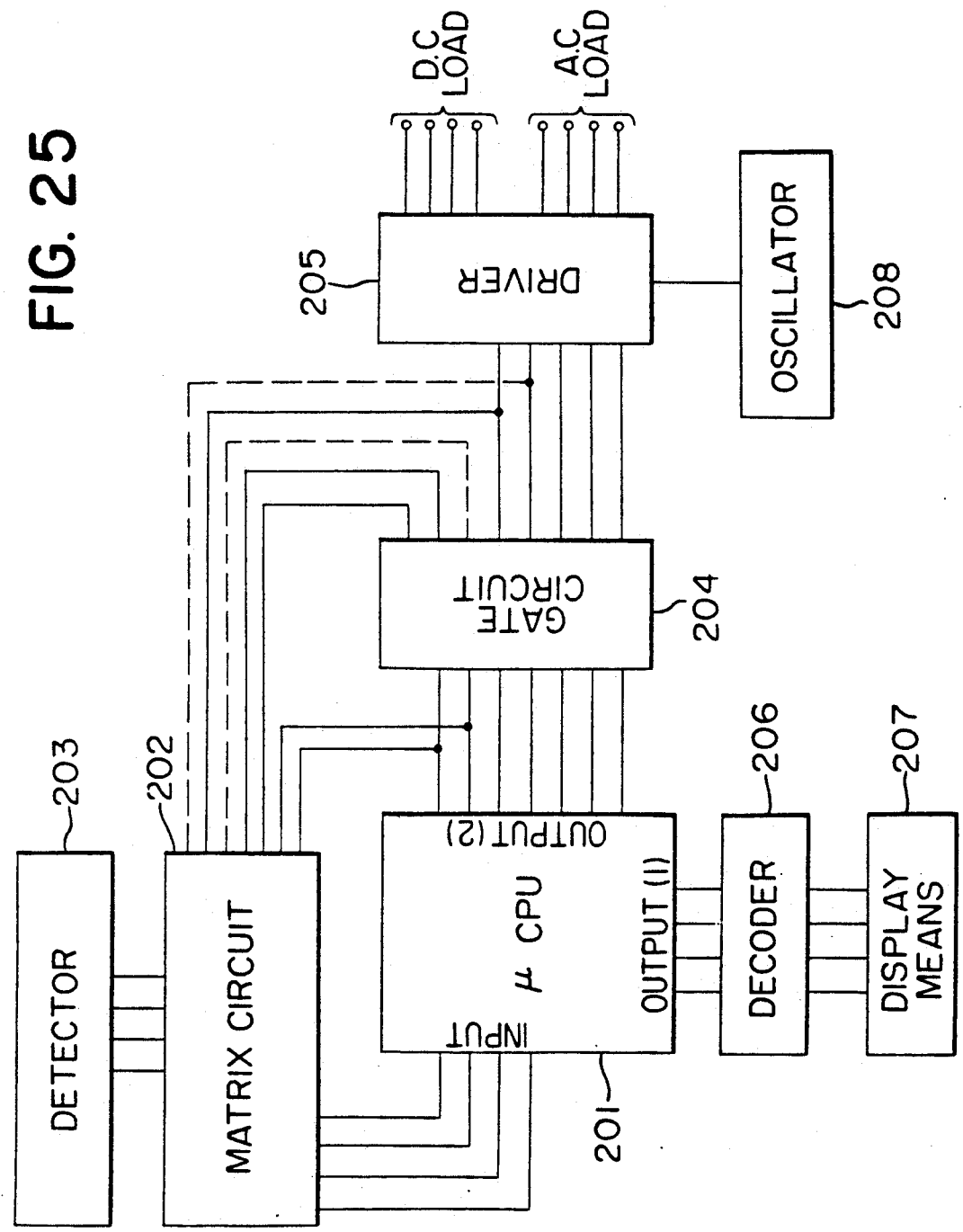
FIG. 25 is a control block diagram of the present invention wherein a computer is employed.

Now referring to FIG. 25 illustrating a block diagram of a circuitry therefor, 201 is a computer chip element, 202 is a matrix circuit for supplying input signals to said element 201, 203 is a means for detecting the state of the copier, 204 is a gate circuit for output signals from the computer, 205 is a driver circuit for driving the function elements, 208 is an oscillator assisting said drive, 206 is a decoder for performing displays by the signals from the computer, and 207 is a display means.

Figure 26C:
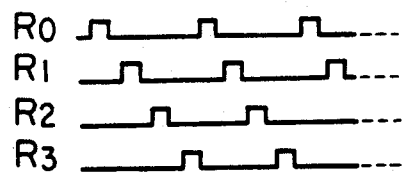
FIGS. 26(A) (which comprises FIGS. 26A' and 26A"), (B), (C), (D) and (E), are a circuit diagram, 26(A), (B), (C) and (D) and (E) are circuit diagram, name list, a pulse wave chart, a drawing of a cassette change cam, and a logic circuit respectively, corresponding to FIG. 25.
Figure 26D:
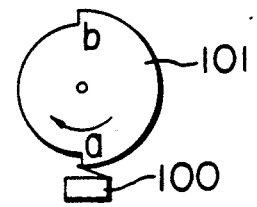
Figure 26E:
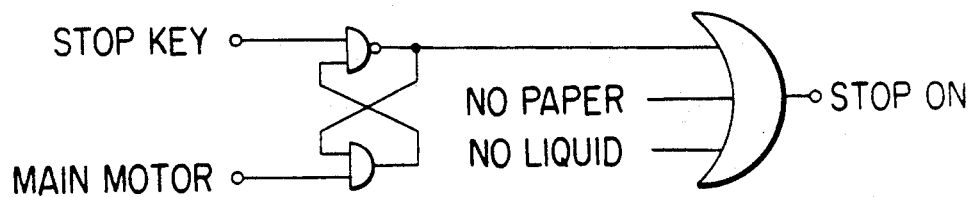

Now referring to FIG. 26 showing the details of the circuits in FIG. 25, the microcomputer chip 201, composed of an element TMS1000 manufactured by Texas Instruments, is provided with four data input terminals K1, K2, K4 and K8, output terminals θ1–θ4 as the output 1 and output terminals R0–R12 as the output 2. The output 1 terminals are used for indicating the copy number on the display elements D1 and D2, and connected thereto through a segment decoder. The output 2 terminals are utilized for function control of load elements and scanning of input matrix circuit.

Peripheral circuits

The aforementioned gate circuit is provided with so-called decoder function, by combining the signals from said output 2 terminals to obtain further diversified output signals.

Three display lamps for Feed Missing Display and for two Jam Displays are controlled by a single output terminal R10, but there is provided a counter for counting the clock signals for display from said terminal R10 to drive different lamps.

The gate circuit supplies the output signals from the CPU to the input matrix circuit and the output interface circuit.

Said interface circuit amplifies the signals from said gate circuit to drive solenoids and lamps. The AD loads are driven through triacs of which trigger signals are obtained as AND outputs with the output from the oscillator.

Figure 27:
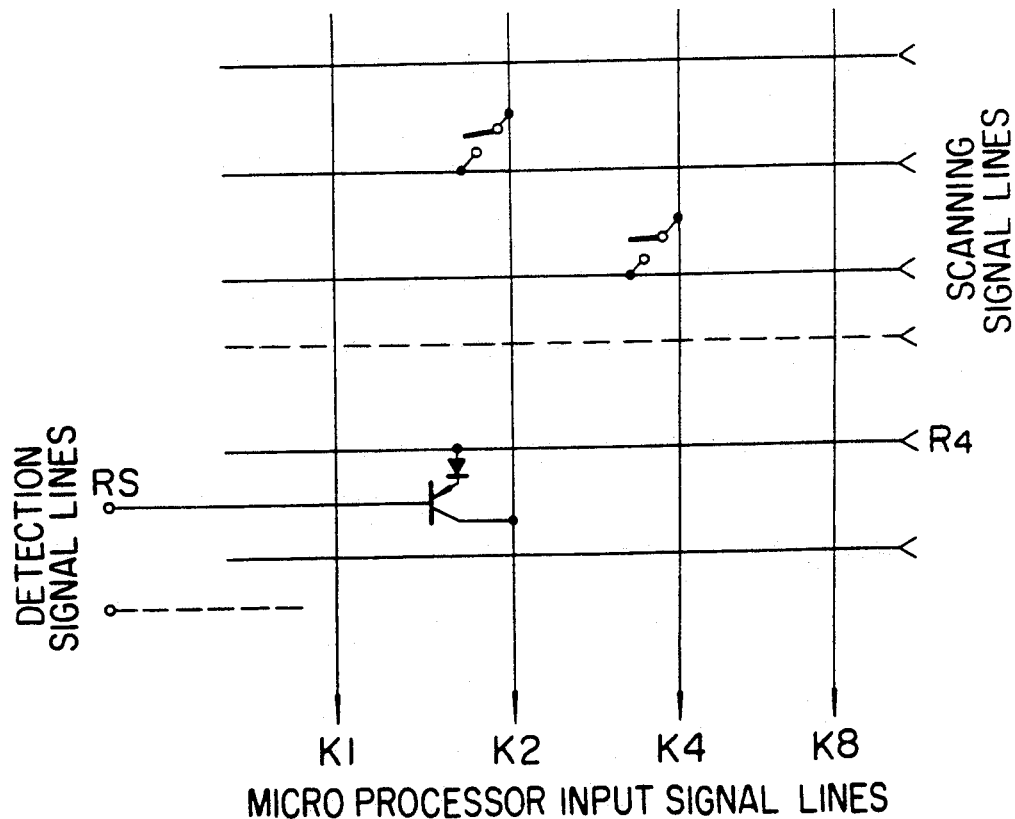
FIG. 27 is a diagram of an embodiment of the matrix circuit in FIG. 26.

In the matrix circuit, the output signals from the output 2 terminals and from the gate circuit are utilized for scanning input for the matrix circuit. These scanning lines cross with the input lines to the microprocessor to constitute a matrix, and there are provided switches at the crossing points thereof corresponding to the input points (FIG. 27).

Thus, supposing that the numbers of scanning lines and microprocessor input lines are x and y respectively, the maximum possible number of switches is xy.

Said switches are composed of keyboard switches in the control section, microswitches for control signals, and other signal generating switches in various detection circuits (for example for detecting paper, for detecting master clocks etc.). Thus the input to the microprocessor (CPU) is performed upon release of an output signal of level 1 to the scanning lines.

Now the functions of the above-described circuit will be briefly explained in the following. The key input signals from the control section (signals from numeral ten keys, clear key, start keys) and from the jam reset switch are taken into the CPU upon receipt of the output terminal R0–R2 and R9 thereof and of a signal (signal indicating before start) from terminal R4 inverted by a gate 265. Said scanning signals are clock signal shown in FIG. 26(C). The 2-digit number thus taken into the CPU is stored in a RAM, and is displayed on the display elements D1, D2 by driving said elements alternately through the switching elements 266, 267 by alternate outputs from the terminals R11 and R12 and by selecting the necessary segments of said elements by the simultaneous 4-bit output from the terminals θ1–θ4. Upon completion of prepatory step such as key entry, the signal from the terminal R4 starts the main motor and performs the pre-exposure. Also said signal from R4 designates the input switches in the matrix (for register signal RS generation, clock pulse CP generation and transfer paper discharge signal CPOS generation), thus enabling input of sequence timing signals when the drum is rotated by the main motor. Also the copy paper input signal CPIS and the stop signal STOP are supplied to the CPU utilizing the exposure lamp drive signal R6 and blank lamp drive signal R7. Under the condition that the drum is rotated, the primary charger, AC discharger, whole surface (flush) exposure lamp, paper feed plunger and register clutch are driven by the output signals from R0–R2. However said input instructions are blocked by the inverted signal of the R4 output signal. An output signal OS1 of a sheet original first detector 106 is supplied to the CPU upon receipt of an inverted output by a gate 268 of the paper feed plunger drive signal from R1 and of the sheet clutch drive signal from R1. Also the input into the CPU of a detection OS2 from a second detector 107 is achieved upon receipt of an AND output from a gate 270 receiving the register clutch drive signal from R2 and the transfer paper input signal. In this manner the input and output terminals of a limited number of a CPU can be effectively utilized. Also overlapped inputs can be prevented even if set signals from different output terminals are simultaneously supplied to the input matrix.

The optical system displacing motor is actuated by an AND output from a gate 271 receiving the output signals from the terminals R9 and R5. This will be later explained in detail in connection with the optical system position check in sheet mode.

The input signals relating to cassettes are supplied to the CPU by the set signal from the output terminal R3. The cassette selection signal and the cassette position detection signal are inputted by a short pulse from R3, and in case the manual cassette is selected (auxiliary cassette selection button AUX is ON), if the auxiliary cassette position detecting switch ACS is not ON, the set signal from R3 is continued until the switch ACS becomes ON whereby the cassette motor is switched on. Said motor does not start upon receipt of the initial set pulse.

The optical system home position detection signal OHP2 in sheet mode is inputted by the set signal from the output terminal R9. Upon identification of ON state thereof, the output terminals R5 and R9 are not set, and the optical system displacing motor is therefore not started. On the other hand, upon identification of OFF state thereof, the terminals R5 and R9 release set signals to activate the optical system displacing motor and the forward clutch to displace the optical system in a determined direction, and upon reaching ON state of aforementioned detection signal the output signal from R5 is reset to terminate the functions of the motor and clutch.

While the terminals R0-R2 and R9 release successive clock signals in case of key entry, namely prior to the start of copying, the output signals for controlling the various loads after the start of copying cycle are of a length required to switch off said loads.

If the transfer paper input signal CPIS is not detected upon release of set signal from R6, the terminal R10 releases a single pulse signal to give a Feed Missing Display. Also if the transfer paper is jammed and cannot be ejected (CPOS signal not detected upon R4 set signal), the terminal R10 releases two pulse signals to perform a Transfer Paper Jam Display. Furthermore if the sheet original is jammed so that the second detector OS2 is not actuated, the terminal R10 releases three pulses to perform a Sheet Original Jam Display. For this purpose there is provided a counter 272 of which output terminals 1, 2 and 3 release display drive signals, which are reset by a drum rotation stop signal $\overline{R4}$ and a delayed signal after the power switch-on, namely by the start of drum rotation or by the power switch-on.

A condenser of 47 $\mu$F connected to the CPU constitutes a CPU reset circuit when the power is switched on.

Figure 28:
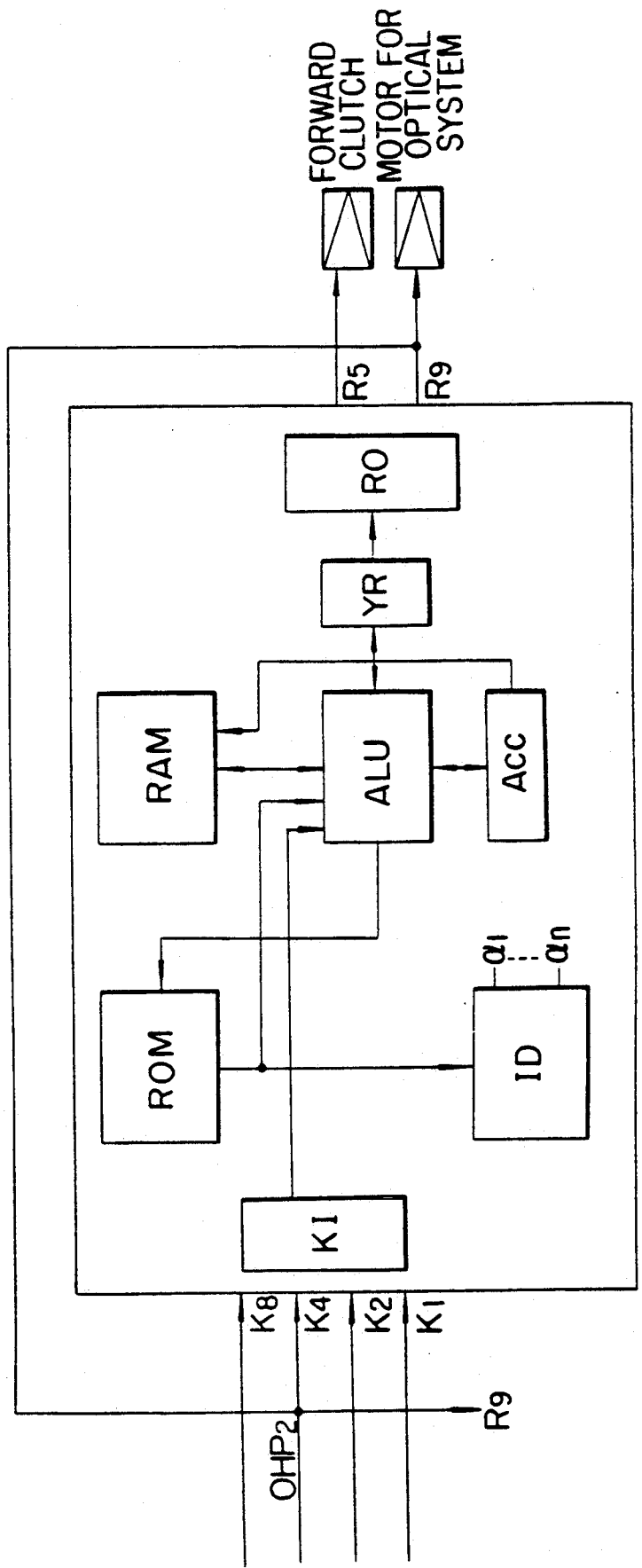
FIG. 28 is an internal circuit diagram of CPU in FIG. 26.

Now the interior of the computer chip element will be explained in the following, while making reference to FIG. 28. ROM is a read-only memory storing the master program for performing the sequence of the copier in predetermined order in the addresses thereof, and allowing the contents thereof by designating the addresses thereof. In said ROM the programs (key entry program, equipment function program, machine ending program etc.) in binary codes are stored from an address O to a neccessary final address.

RAM is a random access memory for storing the copy number and the control signal temporarily during the copying process.

KI is an input section for receiving external signals. ID is an instruction decoder for decoding the code signals from the ROM and dividing said code signals into finer control signals a for conducting each step.

ALU is an arithmetic logic unit for data processing, and Acc is an accumulator for storing the input and output data and the result of logic processing. R0 is register with a latch function, of which content is utilized as control output signals.

The CPU and the peripheral circuits explained above perform the key entry flow, process sequence flows in book and sheet modes, finishing mode flow etc. shown in FIGS. 16–20, according to the detailed flow chart by instruction codes shown in FIG. 31 and program code lists shown in Tabs. 1 and 2.

The ROM in CPU stores the above-mentioned lists in binary codes and in the order of steps, said codes being read at an extremely high speed (for example 10 $\mu$sec for each step in the flow shown in FIG. 31) to perform the above-mentioned flows.

For simplicity the power supplies to the CPU and the peripheral circuits and the clock pulse source for driving the CPU are omitted from the foregoing explanation.

Key entry cycle

Figure 20A:
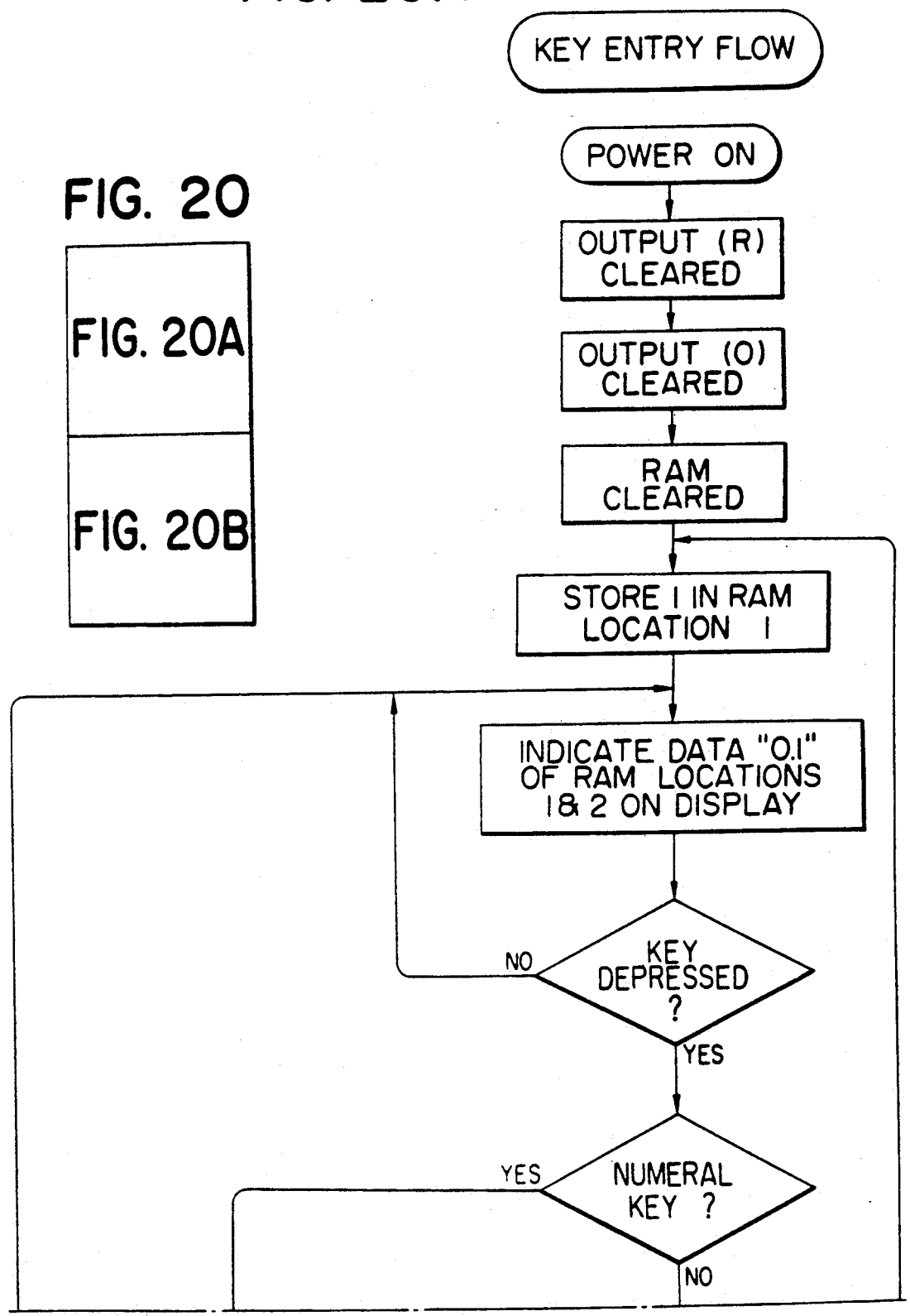
FIG. 20 (which comprises FIGS. 20A and 20B) is a flow chart of key entry.

FIG. 20 shows the interaction between the RAM and keys in the key entry flow.

Upon power on, all the outputs of microprocessor are cleared, and the content of RAM is cleared. Then a data "1" is stored in the location (0, 1) of the RAM (hereinafter called location 1) and the flow proceeds to the key entry cycle.

The key entry is performed by means of numeral keys 126, a clear key 127 for copy number correction, a book mode copy start key 130, a sheet mode copy start key 131 and stop keys 129 for stop instructions.

The copy number can be selected with two digits 46 to 99, of which first order and second order are stored respectively in the RAM location 1 and location 2. If no key is depressed a number "01" is displayed due to the content RAM location 1 previously set as explained above, thus always allowing single copying without actuating the numeral keys. If two or more copies are needed, the numeral keys are depressed accordingly. Upon actuation of any key, an identification step is conducted to identify if said key is a numeral key or another key, and, if identified as a numeral key, the flow stores the input numeral into the RAM location 1 with corresponding display and awaits the next key actuation.

If it is identified as the clear key, the data in RAM locations 1 and 2 are cleared, and the flow stores again "1" in the RAM location 1 and awaits the next key actuation. The flow proceeds to the succeeding cassette change step upon depression of a copy start key. Then an identification is performed to identify if a stop signal is released, and, if yes, the program again awaits the next key actuation. If no, the program proceeds to the copy sequence.

The stop signal is released if the transfer sheet or the developer is lacking or when the fixing heater has not reached a predetermined temperature.

Figure 29:
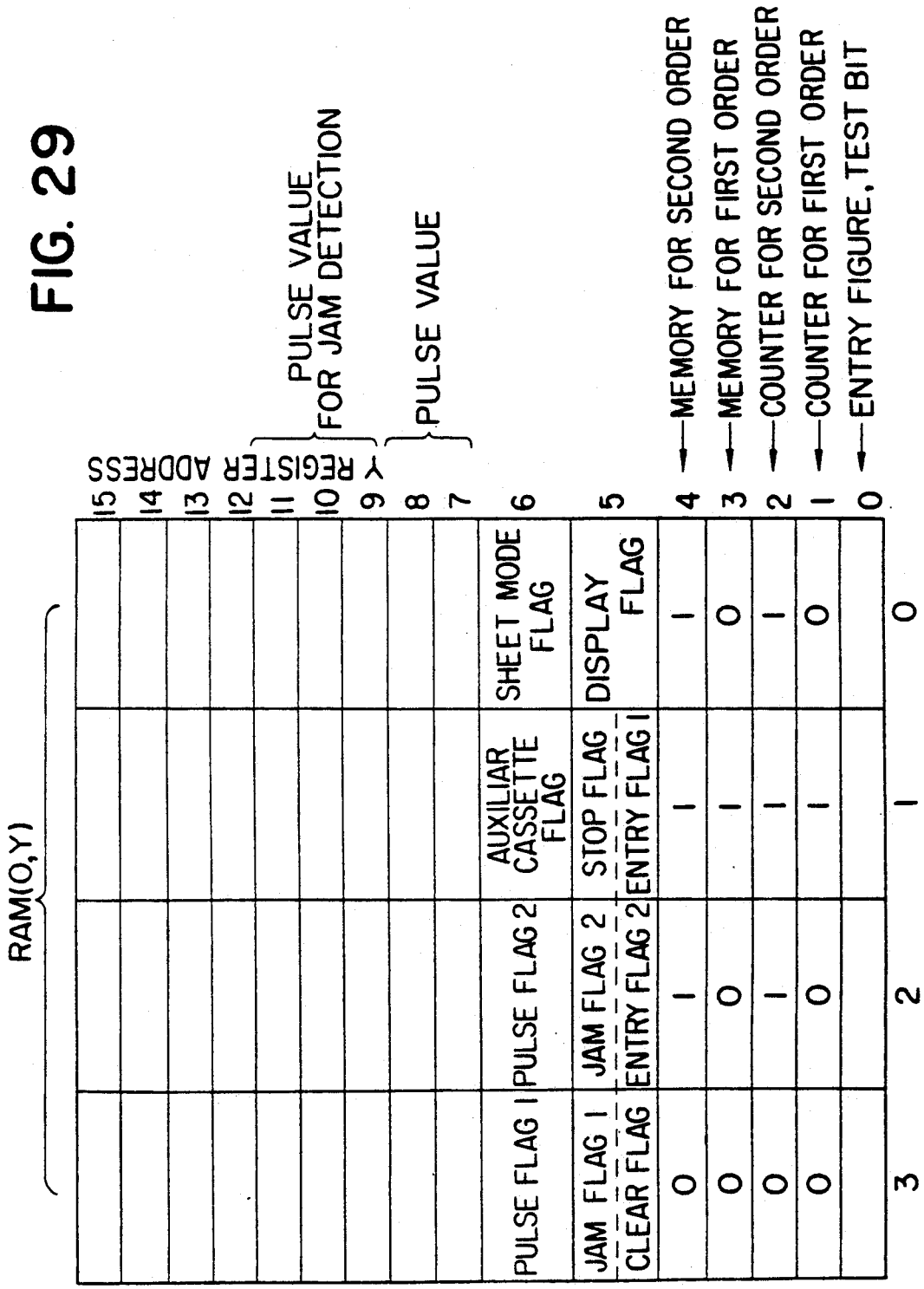
FIG. 29 is an illustration of register addresses of the RAM in FIG. 28.

If numeral keys are actuated twice in succession, the data in the RAM location 1 is transferred to the location 2, and the second data is stored in the RAM location 1. For example in case of 72 copies, the data storage is conducted as shown in FIG. 29.

Upon succeeding actuation of any keys other than numeral keys the program performs the functions in same manners as explained before.

When the program has passed the key entry program and entered the copy sequence, the keys no longer provide input data even if depressed, thereby preventing erraneous functions.

Process sequence

Figure 16A:
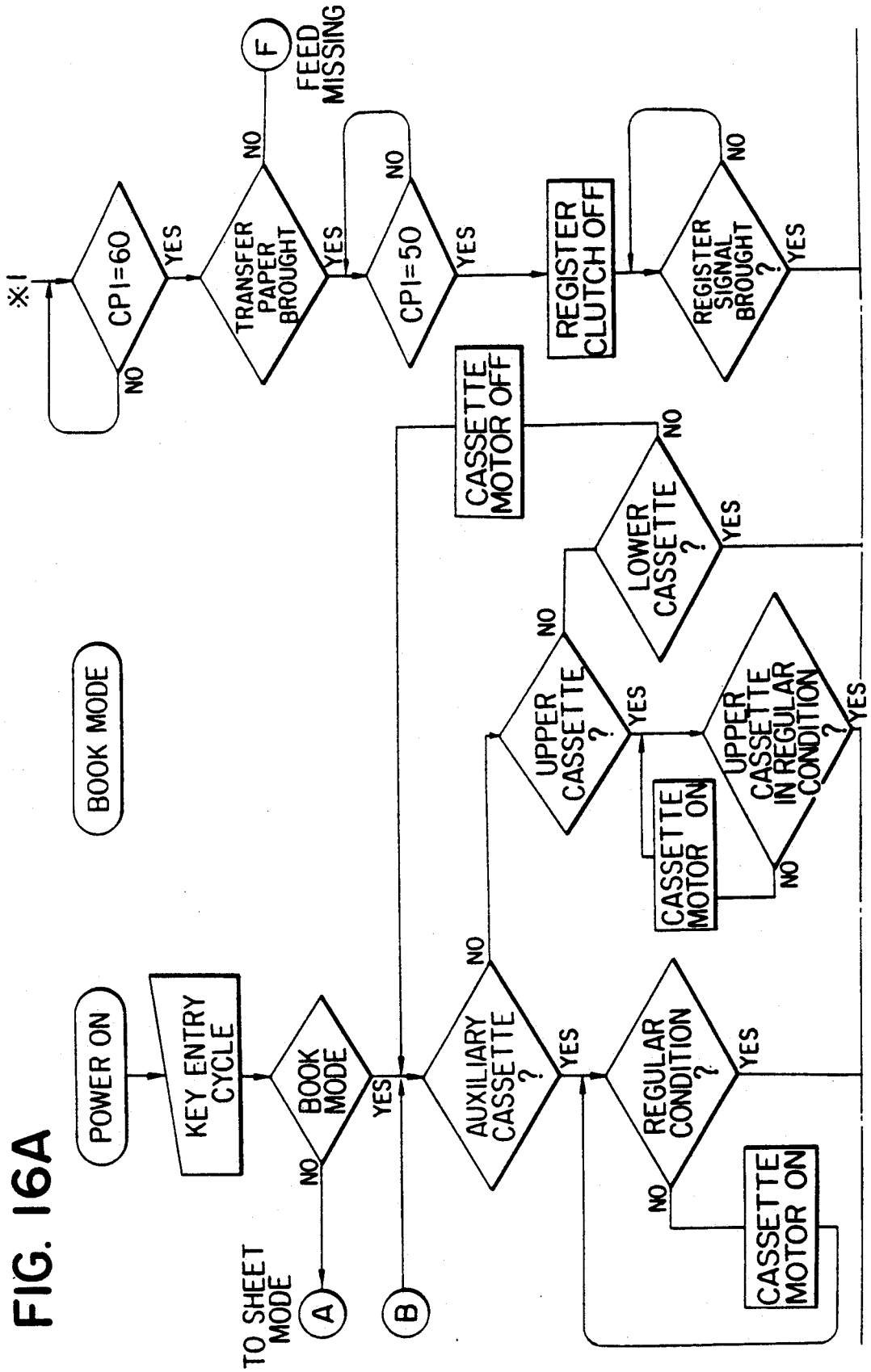
FIGS. 16 (which comprises FIGS. 16A, 16B and 16C), 17 (which comprises FIGS. 17A, 17B and 17C), 18 (which comprises FIGS. 18A, and 18B and 19 (which comprises FIGS. 19A and 19B) are flow charts of sequence control.
Figure 16B:
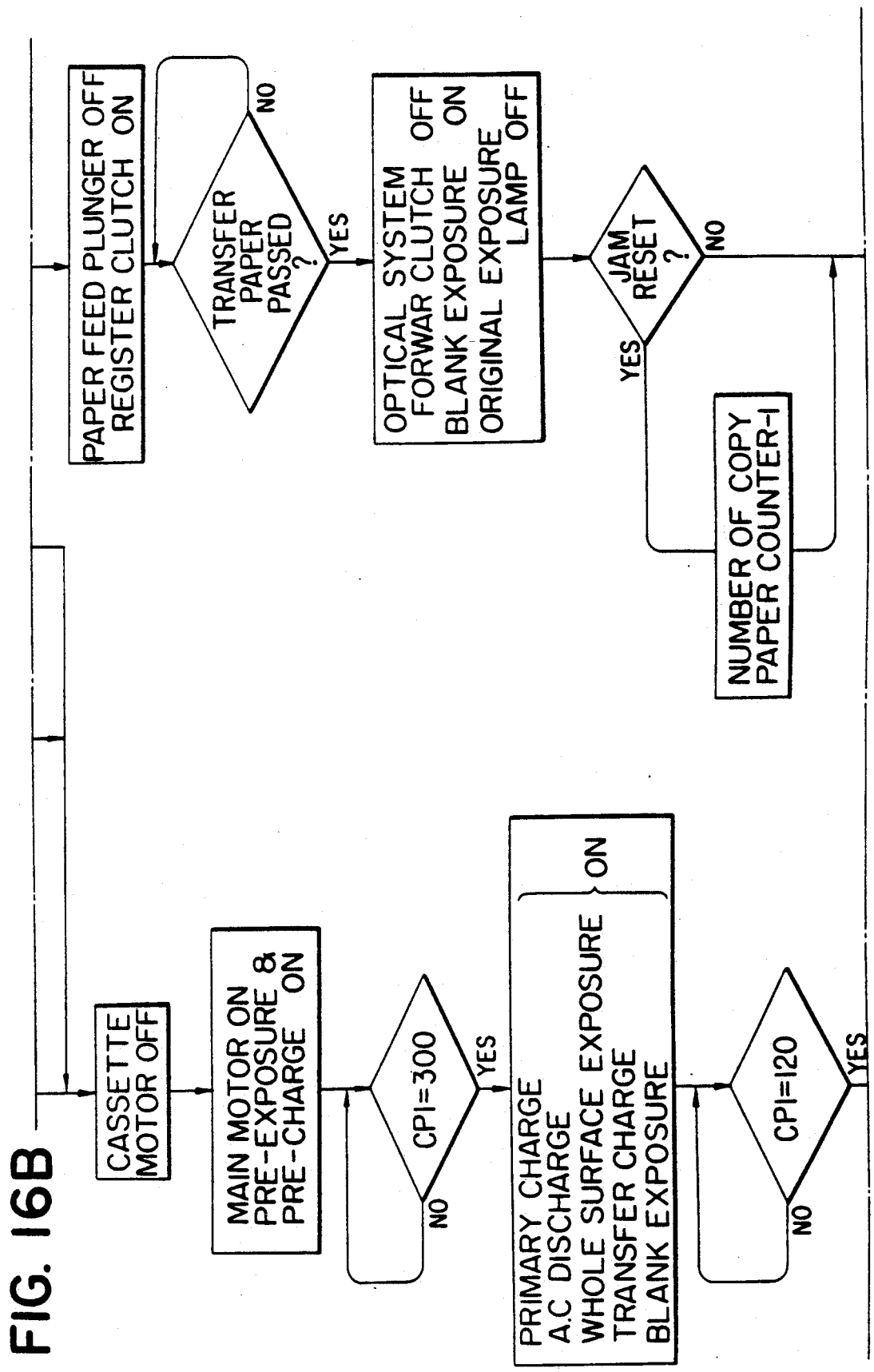
Figure 17A:
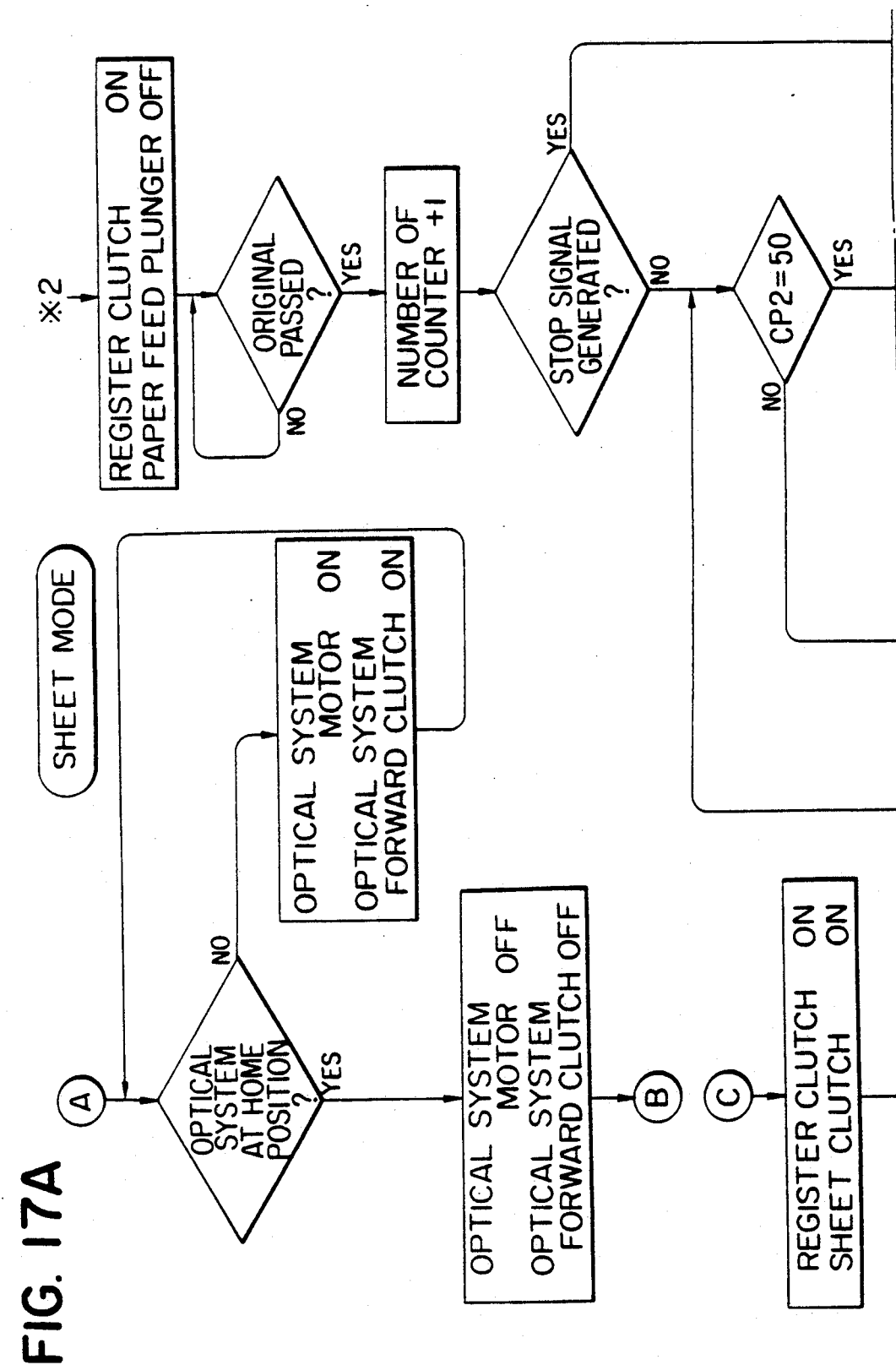
Figure 17B:
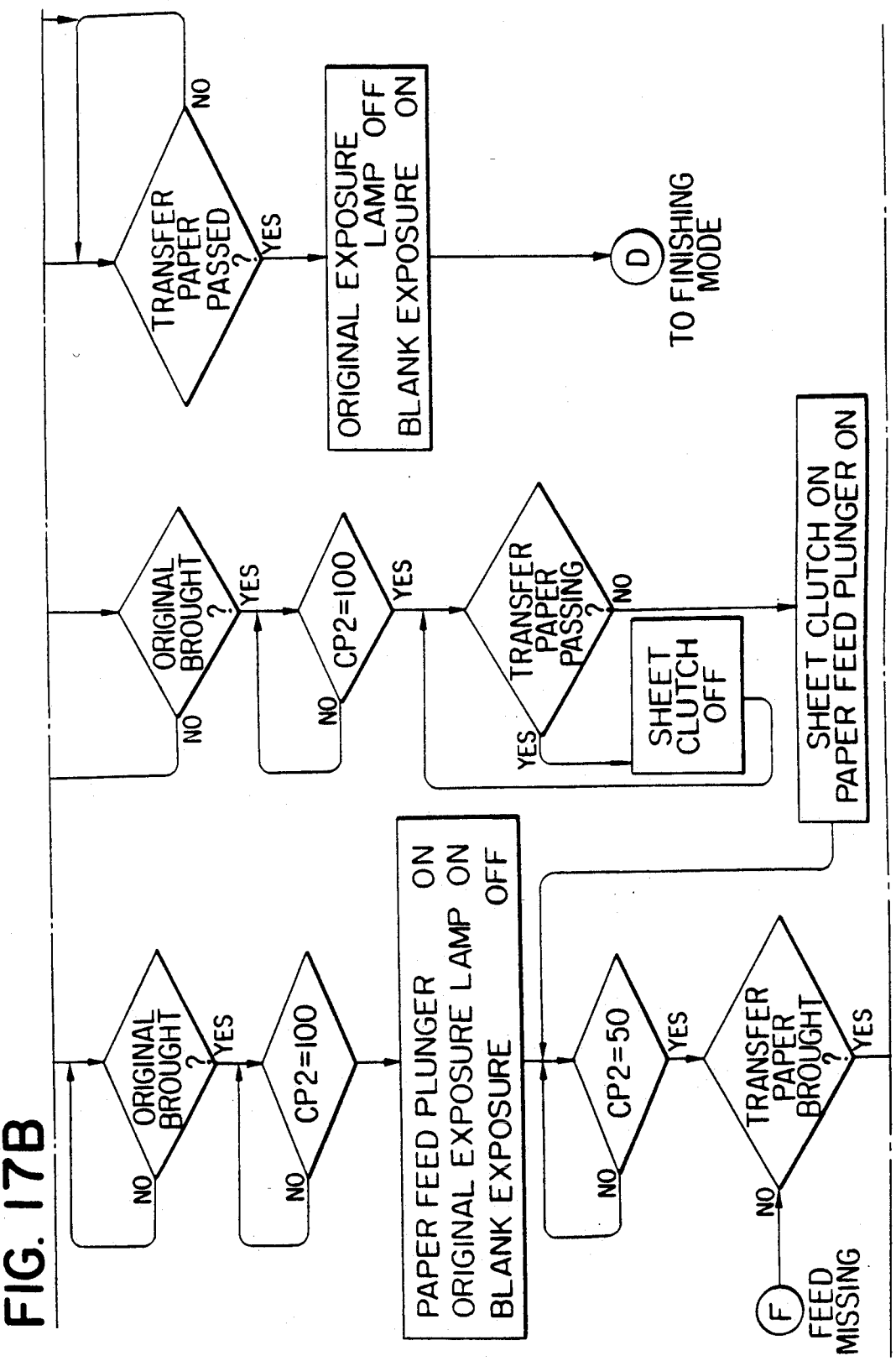
Figure 18A:
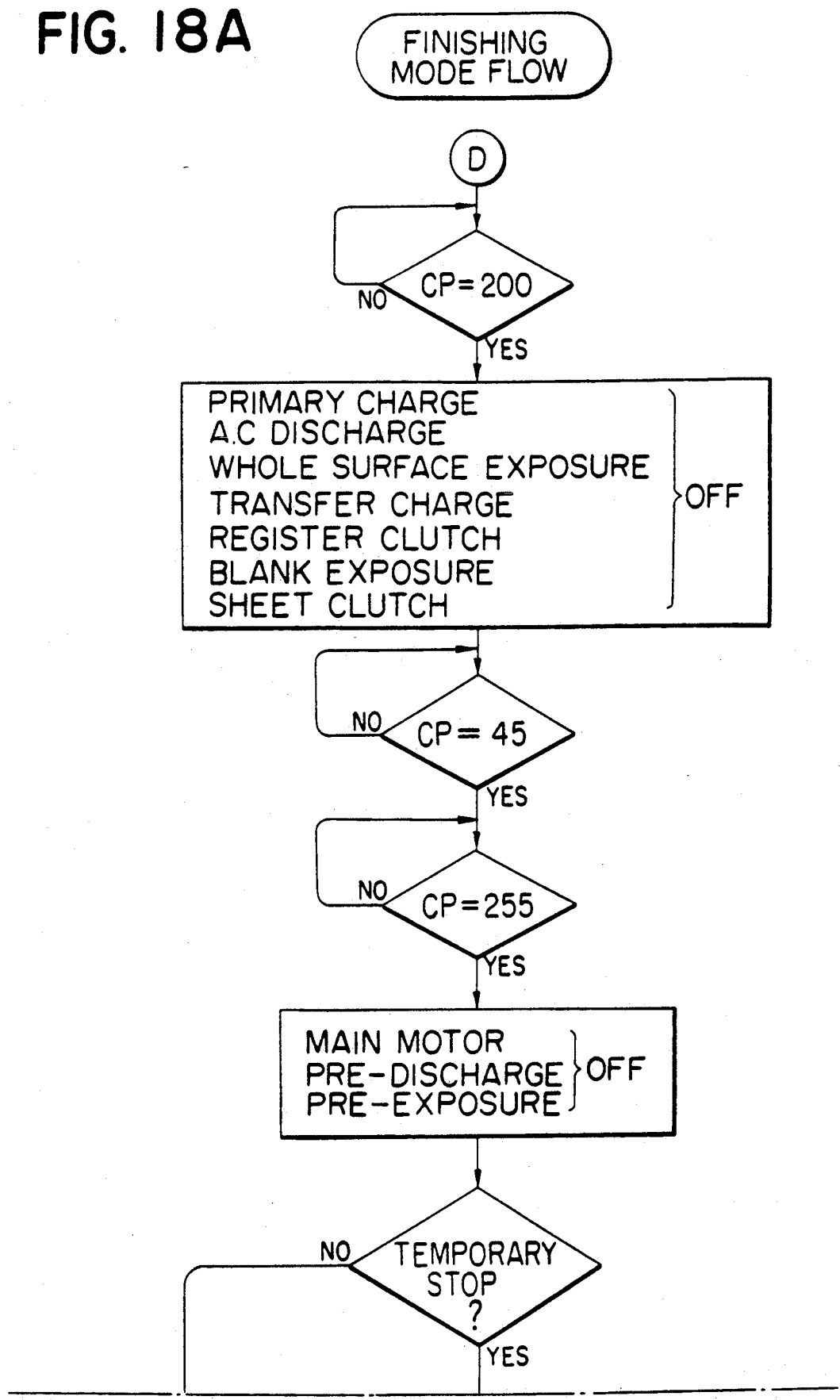
Figure 19B:
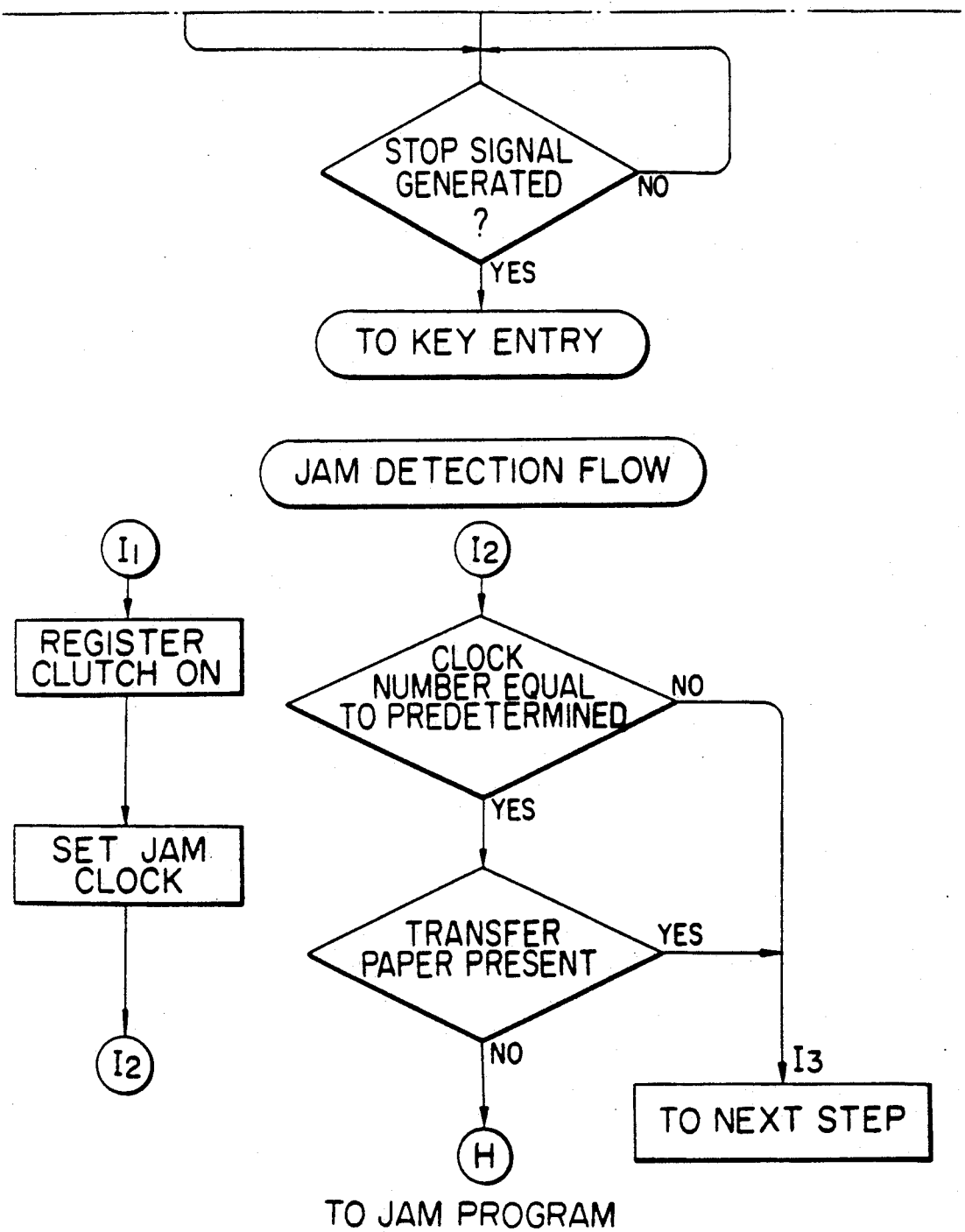

FIGS. 16–18 show sequence control flow charts from power put-on to the end of copying in the copier according to the present invention, and FIGS. 19 and 20 are time charts indicating the function timings of process means.

The timing signals for performing the process after the power on and the copy instruction by the foregoing key entry cycle are formed based on the clock signals CP of 1 pulse per 1 mm of process speed (drum rotation speed 100 mm/sec).

After the main switch is turned on, the copy sequence is not initiated for a waiting time during which the fixing heater is energized and reaches a predetermined temperature.

After the lapse of said waiting time, the copy sequence is rendered possible if the transfer sheet and the toner are properly provided.

Cassette change

There are provided three cassettes, of which the upper and lower cassettes accommodate the standard sizes of higher frequency of use to enable copying of two sizes without manual cassette exchange. Also there is provided a manually inserted (auxiliary) cassette for enabling use of a transfer paper of a non-standard size.

These three cassettes can be selected by the button switches 122, 123 and 124.

As both the upper cassette and the auxiliary cassette utilize the same paper feed device, either cassette not in use is to be placed so as not to interfere with the paper feed from the other cassette. This state is detected by a microswitch 100 functioning in connection with the cassette displacing mechanism. Said mechanism is driven by a motor 108 which is controlled by said microswitch.

Namely upon selection of the auxiliary cassette, the presence thereof in the determined position is detected by the ON state of the switch 100 (ACS), but in case of OFF state thereof the cassette motor connected with a cam 101 is rotated to expel the upper cassette toward the outside and set the auxiliary cassette to the determined paper feed position until said switch becomes ON. On the other hand when the upper cassette is selected, the motor is rotated until the point b reaches the switch 100 to retract the auxiliary cassette and set the upper cassette instead.

In FIG. 2, 150 and 151 respectively indicate a lamp and a light-receiving element for detecting transfer paper in each cassette.

Book mode

Figure 21A:
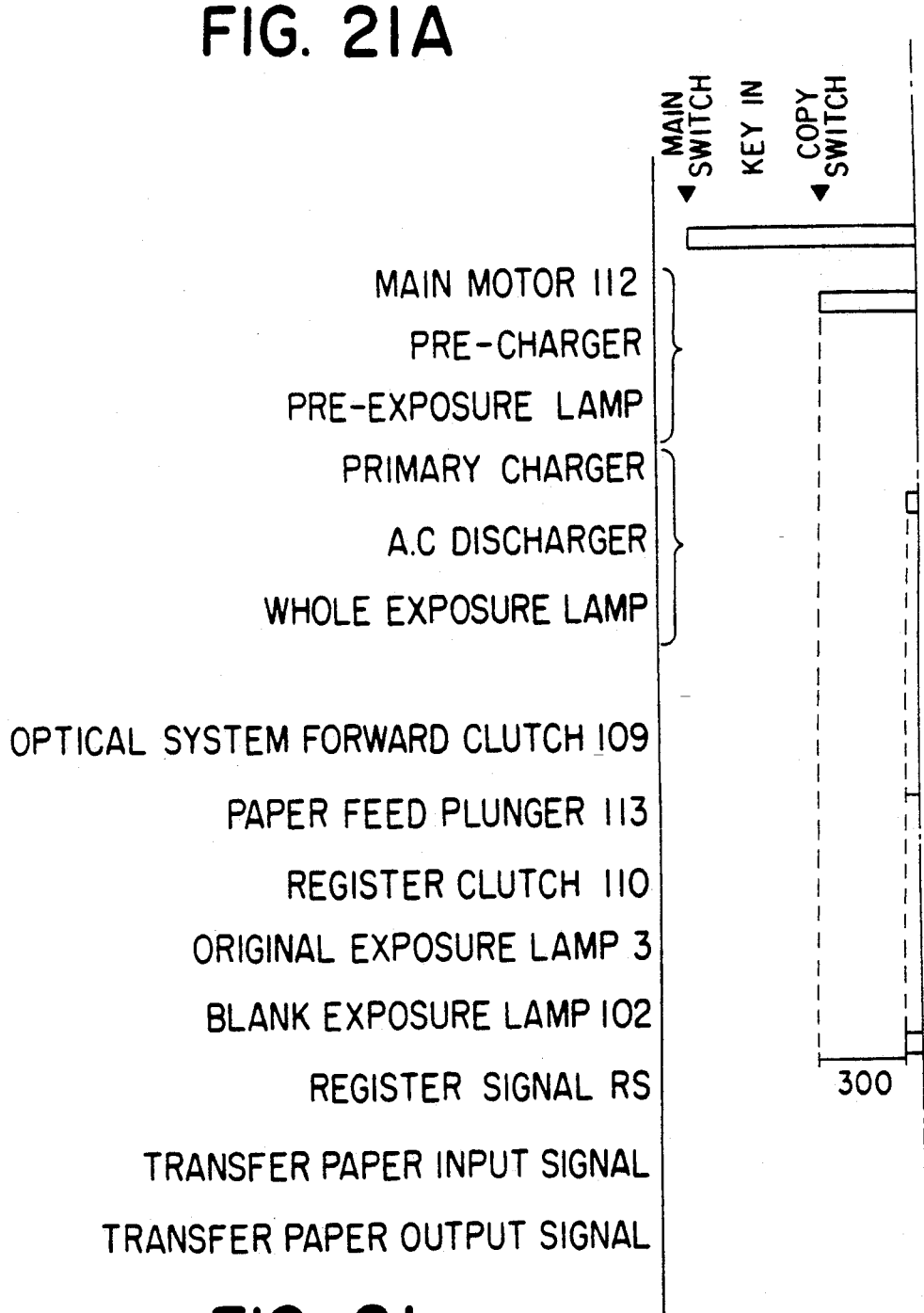
FIG. 21 (which comprises FIGS. 21A and 21B) is a time chart in book mode.
Figure 21:
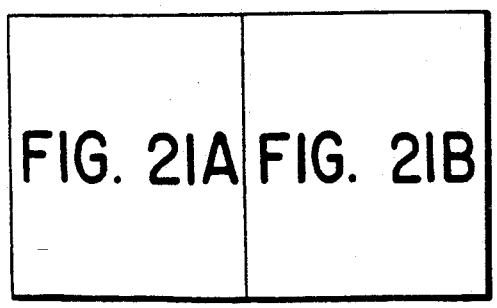
Figure 21B:
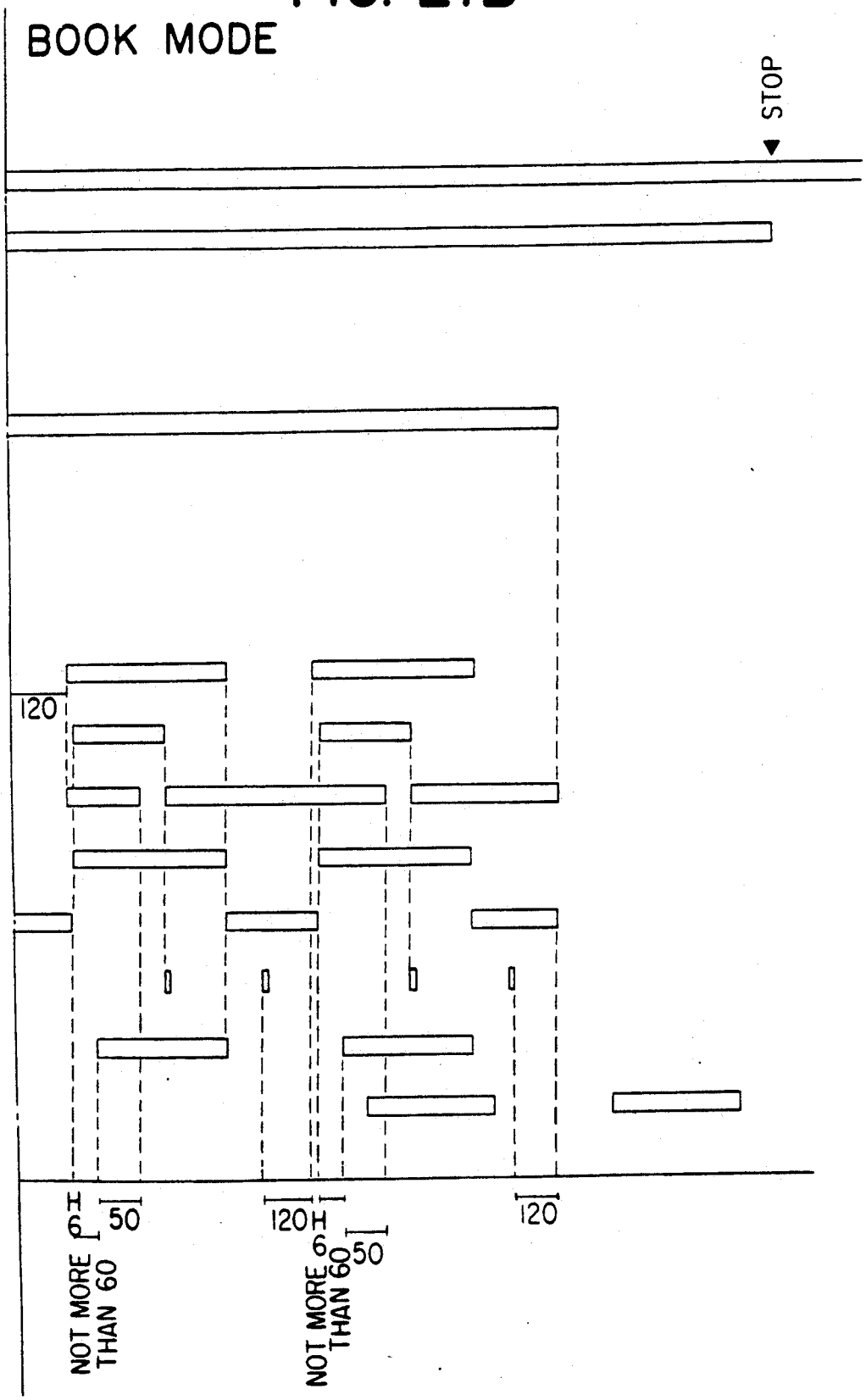

Now the process sequence in the book mode copying will be explained with reference to the flow chart in FIG. 16 and the time chart in FIG. 21.

The copy sequence is initiated by depressing the copy button 130. At first a drum drive motor 112 is switched on to initiate the rotation of photosensitive drum, and simultaneously initiated is the counting of clock pulses CL as well as the preliminary charging and exposure to reduce the potential unevenness on the photosensitive drum, by means of the output signals from R4 and R9. Upon counting 300 pulses, the output signals from R0 and R7 turn on the primary charger 10, AC discharger 12, flush exposure lamp 13, liquid squeeze charger 16, transfer charger 17 and blank exposure lamp 102. Upon further counting of 120 clock pulses, the optical system displacing clutch 109 is turned on by the ouput signal from R5 to advance the optical system from the home position. Further a register clutch 110 is turned on by the output signal of R2 to cause the rotation of register roller 52. Upon further counting of 6 clock pulses a paper feed plunger 113 is energized by the output signal of R1 to lower the constantly driven paper feed roller 53 to advance the transfer paper from the cassette 73, 74 or 75. Also the original illuminating lamp 3 is lighted by the output signal of R6 and starts displacement with the optical system 4, 5 while illuminating the surface of an original. Also the blank exposure lamp 102 is turned off.

Upon counting of 60 pulses after the paper feed, the detector 103 performs the detection of paper 20, and, if not detected, the program proceeds to the routine F whereby the terminal R10 releases a single pulse to give a feed missing display.

In such case all the drive systems are turned off except the heater control and the feed drive motor 111 which are maintained in function. In case the upper 74 or the lower cassette 73 is utilized, the program proceeds to the routine G, and the copying sequence is restarted by depressing the start button after removing the transfer paper incorrectly fed. In case of the auxiliary cassette 75, the feed missing display indicates the absence of paper therein as this cassette is not provided with means for detecting the remaining amount of paper therein. In this case the cassette motor 108 is started to expel the auxiliary cassette to the outside to a determined position at which the microswitch 100 is turned off to terminate the function of the cassette motor 108. By again depressing the start button after inserting the transfer sheets into the cassette, the cassette motor is activated to guide the cassette into the machine, and upon reaching a determined position the microswitch 100 is actuated as shown in FIG. 26(D) to release a signal, which terminates the function of the cassette motor and starts the copy sequence.

If the transfer sheet arrives within afore-mentioned counting of 50 clock pulses, and upon further counting of 50 clock pulses from said arrival, the rregister clutch 110 is disconnected to stop the rotation of the register rollers 52 whereby the leading end of the transfer paper collides with said rollers to temporarily stop the advancement thereof. Thereafter a register signal RS released by a switch 116 upon passing of the optical system through a determined position connects the register clutch to start the rotation of said register rollers, thereby causing the advancement of transfer paper through said rollers toward the drum. Said register signal is released at a timing in such a manner that the leading end of the image formed on the drum coincides with the leading end of said transfer paper.

Upon receipt of the register signal, the paper feed plunger 103 is deactivated to terminate the paper feed function of the paper feed roller.

Upon passing of the transfer paper through the detector 113, the exposure lamp 3 and the optical system displacing clutch 109 are both turned off, whereby the optical system is made free and returned to the home position by means of the spring. During said reversing displacement of the optical system, there is lighted the blank exposure lamp 102. Also the preset copy number is reduced by one. If after a jam reset operation which is to be explained later, this subtraction does not take place in order to compensate the loss of jammed copy.

The program checks the remaining copy number, and, if O, proceeds to the finishing mode (routine D). If it is not O, the copying sequence further proceeds. Also the program proceeds to the finishing mode if there is released, at this point, a copy stop signal (by depression of the stop button or by the lack of transfer paper or toner).

In the absence of said stop signal, upon receipt of the register signal RS released at the reversing of the optical system, there is conducted a counting of 124 clock pulses, of which period is selected slightly longer than the time from the signal release of register signal generator to the return of optical system to the home position. Upon completion of counting of 124 pulses, the optical system is ready to start from the home position for starting the succeeding copying cycle.

As the developing device is functioned in synchronization with the main motor, the photosensitive drum is rotated upon counting 300 clock pulses after the end of copying whereby the surface thereof is cleaned with the developer and the blade 25.

Sheet mode

In the following there will be explained the sequence control in sheet mode while making reference to the time charts in FIGS. 22 and 23 and to the flow chart in FIG. 17.

The optical system to be used is same as that used in the book mode. Thus the optical system, if placed in a position for the book mode, is displaced to the position determined for the sheet mode by depressing the sheet start button 131. The optical system advanced by the displacing motor therefor and the forward clutch is stopped upon actuating a microswitch 104 (OHP2), and simultaneously the exposure lamp 3 is deflected to a direction shown in FIG. 1 adapted for the sheet copying.

Successively, in a similar manner as in the book mode, there is conducted the selection of a cassette followed by the turning on of the drum motor, preliminary exposure lamp, preliminary charger, primary charger, AC discharger, transfer charger, whole surface (flush) exposure lamp and blank exposure lamp, and thereafter the sheet mode sequence (routine C) is started upon counting of 120 clock pulses.

Upon completion of counting of said 120 pulses, the sheet cluch is energized to start the rotation of feed roller 29, by which the stacked sheet originals are conveyed, sheet by sheet, from the tray 27. At the same time the register clutch is also connected. Upon counting of 100 clock pulses after the leading end of an original by the first original detector 106 (OS1 on), the paper feed plunger 113 is energized to supply the transfer paper from the cassette and to light the original exposure lamp 3, while extinguishing the blank exposure lamp 102. In this manner the image exposure is conducted while the original is transferred, thereby performing the latent image forming process. Also upon counting of 50 clock pulses after the start of paper feeding there is identified if the transfer paper has reached the detector 103, thus to judge the presence of error in paper feeding in a same manner as explained before. Upon identification of correct arrival of the transfer paper there is further identified if the leading end of an original reaches the second detector 107 within further 60 clock pulse counting. In case of absence of the arrival of the original (OS2 off), the program, judging that the original is jammed on the way, interrupts the copying sequence and releases three pulses from the terminal R10 to perform the original jam display.

The copy cycle of sheet mode can be restarted by depressing the sheet start button again after the jammed original is eliminated.

If the second detector 107 detects the original within said 60 clock pulses, there is further conducted a counting of 50 clock pulses from said detection, upon completion of which the register clutch is disconnected to stop the rotation of register rollers 52, whereby the advancement of the transfer paper is interrupted. Upon further counting of 50 clock pulses the register clutch is connected to start the advancement of the transfer paper thereby keeping the leading ends of said paper and of developed image on the drum in register. The paper feed plunger is deactivated as the transfer paper is pinched between the register rollers.

The counter for counting the original number is increased by one when an original has passed through the first detector 106.

This result is stored in the above-mentioned location of the RAM (FIG. 29) and is displayed in succession from 01 on the above-mentioned copy number display device 125. It is to be noted that the copy number setting and the corresponding display by the numeral keys are forbidden in the sheet mode operation.

Thereafter the program checks if the copying cycle is to be continued or to be temporarily interrupted (due to the absence of transfer paper or toner, or by the actuation of stop button). If the stop instruction is given, the program extinguishes the exposure lamp 3 and turns on the blank exposure lamp when the transfer paper has passed the detector 103 and proceeds to the finishing mode (FIG. 18).

Even in case the copying is to be continued, if a next original does not reach the first detector 106 within 50 clock pulses after the passing of the preceding original through the first detector, the program turns off the exposure lamp and turns on the blank exposure lamp upon completion of passing of the transfer paper and proceeds to the finishing mode.

If a next original arrives at the first detector 106 within the above-mentioned 50 clock pulses, there are further counted 50 clock pulses (i.e. 100 pulses in total) whereupon the program waits the passing of the transfer paper. If the transfer paper is still in transfer, the next original cannot be advanced as the next transfer paper cannot be fed. In such case, therefore, the sheet clutch is disconnected to temporarily stop the transfer of original (cf. time chart in FIG. 22). Upon completion of the passing of the transfer paper, the sheet clutch is immediately connected to restart the advancement of original, and simultaneously the paper feed plunger 113 is energized to feed the next transfer paper. Thereafter continued are the sequences of exposure, transfer and finishing in the above-mentioned manner.

On the other hand, in case of a short-sized transfer paper of which passing can be detected within 100 clock pulses after passing the first detector, the program follows the time chart shown in FIG. 23. In this case the sheet clutch is not disconnected but maintained in function to continue the original feeding and exposure, and the transfer paper is fed at the 100th pulse.

The sequence control thereafter is conducted in the above-mentioned manner.

As explained in the foregoing, the control of start of original exposure by detecting the trailing end of the transfer paper renders possible a high-speed continuos copying regardless of the size of the original and of the transfer paper.

The detection signals from the detectors 106, 107 and 103 are respectively called S1, S2 and S3.

Figure 24:
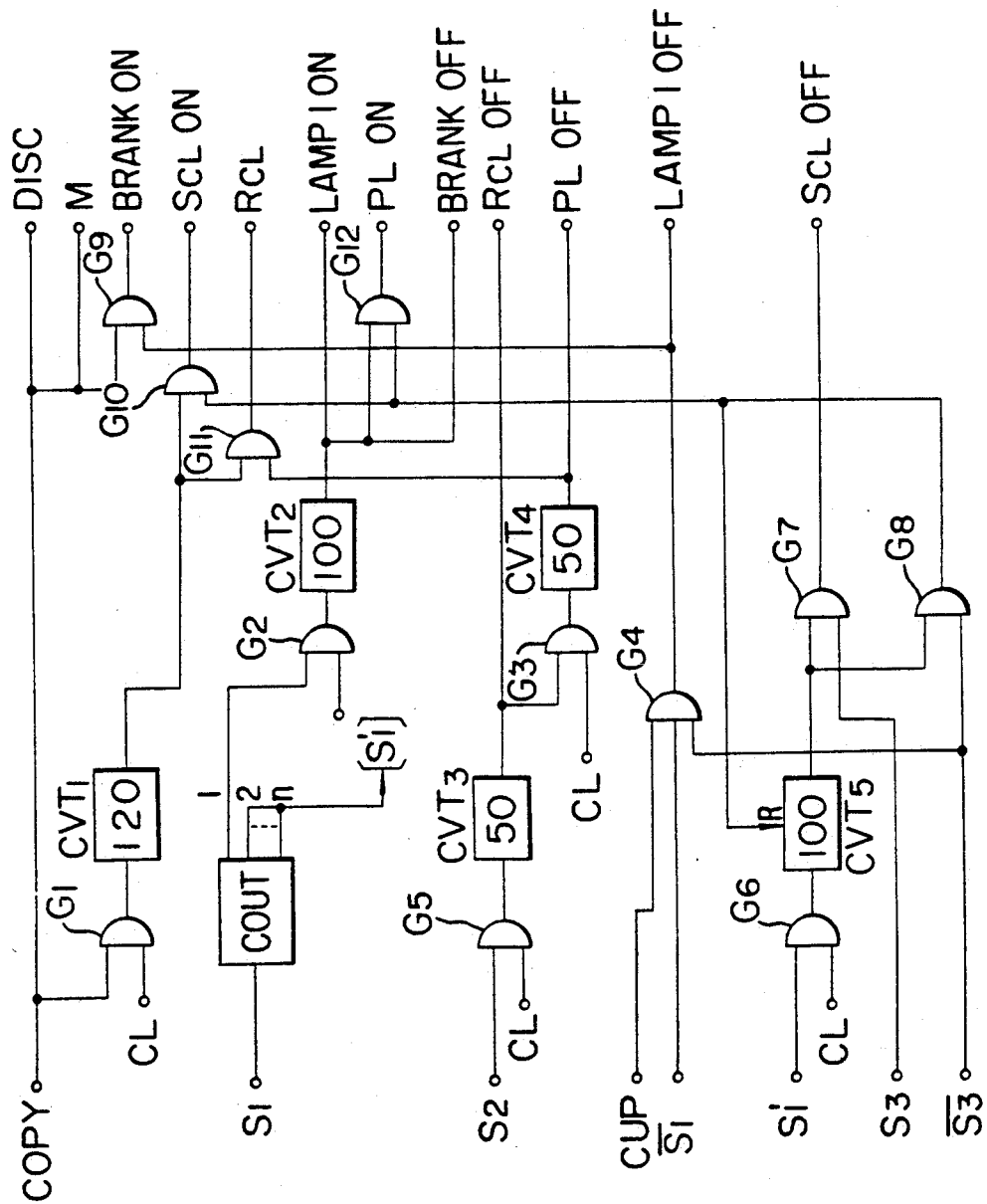
FIG. 24 is a circuit diagram for achieving the time charts shown in FIGS. 22 and 23.

An another example of sheet mode control according to the size as mentioned above can be realized by the circuit shown in FIG. 24, wherein COPY is a copy button, DISC is a high voltage source, M is a drum motor, Blank is a blank exposure lamp, S.CL is a sheet clutch, R.CL is a register clutch, LAMP1 is an exposure lamp, PL is a paper feed plunger, CUP is determined copy number completion signal, S1' is the second or thereafter of the signal S1, COUT is a counter for counting the signal S1, CUT1-5 are counters for counting clock pulses CL and adapted for generating a pulse upon counting clock pulses of a determined number, wherein CUT5 releasing a step signal upon counting clock pulses of a determined number and being reset by the input of said signal to the terminal R; S1 and S3 are inverted signals of the signals S1 and S3, G1–G3 are AND gates and G9–G12 are OR gates; and the operation elements (motor etc.) are on-off controlled by the output signals (M etc.) released in the above-mentioned circuit.

The function of said circuit follows the afore-mentioned timing chart and will not be explained in detail.

Now there will be given an explanation on the function of the CPU in, as an example, the control for optical system displacement as a preparation for scanning directly prior to performing the sheet mode sequence, while making reference to a part of the above-mentioned detailed flow chart.

In the sheet mode operation the optical system, as explained before, has to be located in a position exclusively designed for this mode. If not located in such position, the optical system is displaced by the rotation of the displacing motor therefor and the actuation of the forward clutch, the position detection switch 104 is actuated upon arrival of the optical system at the stop position. Upon detection of actuation of said switch, the displacing motor and the forward clutch are immediately disconnected whereby the optical system stops at a position exclusive for the sheet mode.

The above-mentioned sequence will be further explained with reference to the program steps shown in FIGS. 30(A) and (B).

The ROM releases a control signal (code) for each step by the clock pulses for driving the CPU. The output signals thus obtained are decoded by the instruction decoder ID to perform the program in succession. At first, upon output of a control code from a RAM location corresponding to the step 1, the decoder ID decodes this control code, and a numeral 9 is stored in the register YR through ALU by the control signal 2₁ to ALU and YR. In the step 2 a register R9, designated by said register YR among the registers RO, is set. In the step 3 the input data in the key input section KI is stored through ALU into the accumulator Acc. As the output of register R9 is released at the step 1, the input of the optical system home position detecting switch OHP2 is selected and it is identified if said switch OHP2 is open or closed (cf. matrix circuit in FIG. 26). Thus an input signal "O" or "1" of K4 in the key input section KI is stored in the accumulator Acc as a code of which second bit corresponds to the K4. Then in the step 4 a numeral "0" is set in the register YR through ALU.

In the step 5 the data stored in the accumulator Acc in the step 3 is transferred and stored in the location (0, 0) of the memory RAM designated by the register YR. In the step 6 it is identified if the second bit of the data in said memory location (0, 0) is "1" or not. If the data is "1" (yes) signifying that the optical system is identified to be in the position for sheet mode, the next step 7 is conducted. On the other hand if the data is "0" (no) signifying the failure of identification, the step 7 is skipped and the next step 8 for displacing the optical system is conducted. In the step 8 a numeral "5" is set in the register YR. In the step 9 the register R5 which is designated by said register YR among the registers RO, is set, and the output thereof is supplied to the driver to switch on the forward clutch. Thus, in combination with the above-mentioned output of the register R9, the optical system starts to displace toward the position for sheet mode (cf. FIG. 26). The step 10 is a jump instruction with a label LB1 to return to the step 1, and this loop function is repeated until the detecting switch OHP2 becomes actuated. When the OHP2 is actuated upon arrival of the optical system at the position for sheet mode, the second bit of the input data becomes "1" whereupon conducted is the step 7 which is a jump instruction to a label LB2. Thus successively performed is the step 11 designated by LB2. The step 11 stores a numeral "9" in the register YR, and the next step 12 resets the register R9 which is selected, among the registers RO, by said register YR. Similarly the register R5 is reset in the steps 14 and 15. In this manner the outputs of registers R9 and R5 are reset to switch off the displacing motor and the forward clutch, whereby the optical system is stopped at the position for sheet mode.

The register addresses of the RAM are schematically shown in FIG. 29.

The location (0, 0) corresponds to the position of memory in the step 5 in FIG. 30 explained above. This location is utilized as a test bit for identifying the input signals. The addresses 5 and 6 are utilized as registers for storing "1" by the flag instructions and used as routine identifying means in other flow steps in FIG. 31. Also in FIG. 29 there are shown registers for storing the input copy number in the key entry cycle (addresses 3 and 4), for storing the finished copy number in the sequence flow cycle (addresses 1 and 2), for storing clock pulse number to be counted for jam identification (addresses 9–11) and for storing clock pulse numbers to be counted for load control timing (addresses 7 and 8).

In the present invention the preset copy number on the counter is subtracted by one at each copy completion but the copying of same number can be repeated by simply depressing the start button since the preset copy number is still memorized in the memory addresses 3 and 4.

The stop flag, entry flag etc. are stored in a same bit area because they have different timings, thus economizing the registers.

The flags employed in FIGS. 29 and 31 are as follows:

| | |
|---|---|
| display flag: | set for driving display unit D1 |
| stop flag: | set when temporary stop, no paper etc. |
| entry flag 1: | set after key entry |
| entry flag 2: | set after entry "1" |
| jam flag 1: | set when paper is jammed |

-continued

| | |
|---|---|
| jam flag 2: | set when pulse count for jam indentification reaches a preset number |
| clear flag: | set when clear key is actuated |
| sheet mode flag: | set when sheet mode is selected |
| auxiliary cassette flag: | set when auxiliary cassette is selected |
| pulse flag 1: | set when the pulse count does not reach a preset number |
| pulse flag 2: | set when the pulse number for jam identification is preset |

The functions of CPU in the key entry, sequence control and finishing flow are detailedly shown also in the flow charts of FIG. 31.

Jam detection

If the transfer paper reaches the outlet within a determined period after the feeding thereof from the register rollers 52 is checked by identification of paper arrival at the outlet after counting a determined number of clock pulses CP released in response to the drum rotation. The paper arrival is detected by the microswitch 117 which thereupon releases the transfer paper discharge signal CPOS. The counting of clock pulses is started from the timing of release of transfer paper from the register rollers 52. The CPU, performing very fast functions, is capable of achieving various controls between two clock pulses. Thus the clock pulse counting for jam detection can be performed without affecting the controls on various elements by incorporating a clock counting program for jam detection into the main flow while waiting various input signals or counting clock pulses for control timing. Stated otherwise different pulse countings can be conducted at the same time.

More specifically there is provided a flow (FIG. 19 $I_1$-$I_2$) for setting "300" in the RAM locations 9-11 after the second turning on of the register clutch shown in FIG. 16, and also there is provided a jam detection flow $I_2$-$I_3$ for identifying the 300 pulses within the timing identification loop for load function for example the CP1 count step or register signal identification loop step.

If the paper does not reach the detector 117 upon jam detection check, all the drives (particularly those of higher danger such as high-voltage source, heater etc.) are cut off to interrupt the copying operation, and the transfer paper jam display lamp is lighted. The paper conveyor belt is maintained in function to allow paper ejection. The optical system may be an obstacle in removing the paper jammed in the machine. For this reason upon detection of paper jamming the output terminals R9 and R5 are set to drive the optical system displacing motor 114 thereby displacing the optical system to the position for sheet mode. Upon reaching the determined position the optical system actuates the microswitch 104 to release the signal OHP2 thereby turning off the signal R5 to cut off said displacing motor. In this case the optical system is mechanically locked and is therefore not reversed. The output signal from R9 is still maintained.

Opening and reclosing of the upper cover for jammed paper removal actuates a microswitch 105 (FIG. 3), to release a signal for resetting the jam detection, the input of said signal being performed by the output R9 shown in FIG. 26(A).

Upon repressing thereafter of the start button the output R9 is terminated to actuate a plunger 115 for releasing the optical system which thus is released from the locking and is reversed to the home position for book mode by means of a spring.

It is also possible to displace the charger 17 and roller 21 upon jam detection in order to facilitate jammed paper elimination.

The above-mentioned clock pulses are generated, by means of an internal generator, at a rate of 1 pulse/mm of process speed.

Said clock pulses can be generated, for example, by optically detecting the holes provided on a rotor plate rotating with the rotation speed of the drum.

Although the conventional discrete control circuit has to be provided with a key entry prohibition circuit to prohibit key entries during the copying operation, the control system of the present invention is free from erroneous operation even when, for example, the start button for sheet mode is depressed during the copying operation in book mode since the sequential control by microprogramming does not accept the key entries once the copy cycle is started after the proper key entries. Such technology utilizing stored program is also applicable to the copiers of various copying modes such as A4/A3 sizes, one-side and two-side copying, reduced size and same size copying.

As to the terms used in FIG. 31 and Tab. 1, reference should be made to the TMS 1000 Series, "Programmer's Reference Manual" published by Texas Instruments.

TABLE 1

Program Step
GENERAL ASSEMBLER
ASSEMBLE OF TMS 1000
NEW INSTRUCTION FOR B.B

| STMT | SOURCE | STATEMENT |
|---|---|---|
| 1 | OPT | LIST, XREF, PROM, STAT |
| 2 | TNI06 | SEQUENCE PROGRAMME |
| 3 | PAGE | 0 |
| 4 LB9 | ALEC | 1 |
| 5 | BR | LB314 |
| 6 | ALEC | 2 |
| 7 | BR | LB14 |
| 8 | ALEC | 4 |
| 9 | BR | LB15 |
| 10 | TCMIY | 3 |
| 11 | BR | LB16 |
| 12 LB314 | BL | LB315 |
| 13 LB13 | TCMIY | 0 |
| 14 | BR | LB16 |
| 15 LB14 | TCMIY | 1 |
| 16 | BR | LB16 |
| 17 LB15 | TCMIY | 2 |
| 18 | BR | LB16 |
| 19 LB10 | TCY | 0 |
| 20 | ALEC | 1 |
| 21 | BR | LB17 |
| 22 | ALEC | 2 |
| 23 | BR | LB18 |
| 24 | ALEC | 4 |
| 25 | BR | LB19 |
| 26 | TCMIY | 7 |
| 27 | BR | LB16 |
| 28 LB17 | TCMIY | 4 |
| 29 | BR | LB16 |
| 30 LB18 | TCMIY | 5 |
| 31 | BR | LB16 |
| 32 LB19 | TCMIY | 6 |
| 33 | BR | LB16 |
| 34 LB11 | TCY | 0 |
| 35 | ALEC | 1 |
| 36 | BR | LB20 |
| 37 | TCMIY | 9 |
| 38 | BR | LB16 |
| 39 LB20 | TCMIY | 8 |
| 40 | BR | LB16 |
| 41 LB12 | ALEC | 1 |
| 42 | BR | LB21 |
| 43 | ALEC | 2 |

TABLE 1-continued

Program Step
GENERAL ASSEMBLER
ASSEMBLE OF TMS 1000
NEW INSTRUCTION FOR B.B

| STMT | SOURCE | STATEMENT |
|---|---|---|
| 44 | BR | LB22 |
| 45 | TCY | 0 |
| 46 | TCMIY | 0 |
| 47 | TCMIY | 0 |
| 48 | TCY | 5 |
| 49 | SBIT | 3 |
| 50 | BR | LB16 |
| 51 LB22 | TCY | 6 |
| 52 | SBIT | 0 |
| 53 LB21 | TCY | 7 |
| 54 | SETR | |
| 55 | KNEZ | |
| 56 | BR | LB23 |
| 57 | RSTR | |
| 58 | BL | LBSQ |
| 59 LB23 | RSTR | |
| 60 | BL | LB24 |
| 61 LB16 | TCY | 5 |
| 62 | LDP | 1 |
| 63 | BR | 0 |
| 64 | PAGE | 1 |
| 65 | TBITI | 1 |
| 66 | BR | LB25 |
| 67 | TBITI | 2 |
| 68 | BR | LB26 |
| 69 LB27 | TCY | 1 |
| 70 | TMA | |
| 71 | IYC | |
| 72 | TAM | |
| 73 | TCY | 4 |
| 74 | TAM | |
| 75 | TCY | 0 |
| 76 | TMA | |
| 77 | IYC | |
| 78 | TAM | |
| 79 | TCY | 3 |
| 80 | TAM | |
| 81 | TCY | 5 |
| 82 | SRIT | 1 |
| 83 LB24 | CALL | SUBA |
| 84 | CALL | SUBB |
| 85 | CALL | SUBA |
| 86 | CALL | SUBB |
| 87 | TCY | 5 |
| 88 | TBITI | 3 |
| 89 | BR | LB28 |
| 90 LB25 | TBITI | 3 |
| 91 | BR | LB309 |
| 92 | BL | LB4 |
| 93 LB309 | BL | LB3 |
| 94 LB28 | BL | LB3 |
| 95 LB26 | RBIT | 2 |
| 96 | TCY | 1 |
| 97 | TCMIY | 0 |
| 98 | BR | LB27 |
| 99 LBSQ | CALL | SUBA |
| 100 | TCY | 6 |
| 101 | TBITI | 0 |
| 102 | BR | LB36 |
| 103 | LDP | 2 |
| 104 | BR | 0 |
| 105 LB36 | BL | LBSMI |
| 106 | PAGE | 2 |
| 107 LB37 | CALL | SUBA |
| 108 | TCY | 3 |
| 109 | CALL | SUBC |
| 110 | TBITI | 3 |
| 111 | BR | LB30 |
| 112 LB31 | TCY | 3 |
| 113 | CALL | SUBE |
| 114 | TBITI | 1 |
| 115 | BR | LB32 |
| 116 | TBITI | 2 |
| 117 | BR | LB33 |
| 118 | TBITI | 0 |
| 119 | BR | LB33 |
| 120 | TCY | 3 |
| 121 | RSTR | |
| 122 | BR | LB37 |
| 123 LB32 | CALL | SUBA |
| 124 | BR | LB31 |
| 125 LB30 | TCY | 6 |
| 126 | SBIT | 1 |
| 127 LB34 | TCY | 3 |
| 128 | CALL | SUBE |
| 129 | TBITI | 1 |
| 130 | BR | LB33 |
| 131 | CALL | SUBA |
| 132 | BR | LB34 |
| 133 LB33 | TCY | 3 |
| 134 | RSTR | |
| 135 | TCY | 4 |
| 136 | SETR | |
| 137 | TCY | 7 |
| 138 | TCMIY | 6F |
| 139 | TCMIY | 6F |
| 140 LB38 | CALL | SUBD |
| 141 | TCY | 6 |
| 142 | TBITI | 3 |
| 143 | BR | LB39 |
| 144 | TCY | 7 |
| 145 | TCMIY | 6D |
| 146 | TCMIY | 64 |
| 147 LB40 | CALL | SUBD |
| 148 | TCY | 6 |
| 149 | TBITI | 3 |
| 150 | BR | LB41 |
| 151 | TCY | 0 |
| 152 | SETR | |
| 153 | TCY | 7 |
| 154 | SETR | |
| 155 | LDP | 3 |
| 156 | BR | 0 |
| 157 LB39 | CALL | SUBA |
| 158 | BR | LB38 |
| 159 LB41 | CALL | SUBA |
| 160 | BR | LB40 |
| 161 | PAGE | 3 |
| 162 | TCMIY | 6E |
| 163 | TCMIY | 6E |
| 164 LB42 | CALL | SUBD |
| 165 | TCY | 6 |
| 166 | TBITI | 3 |
| 167 | BR | LB43 |
| 168 | TBITI | 0 |
| 169 | BR | LB44 |
| 170 LB311 | TCY | 5 |
| 171 | SETR | |
| 172 | TCY | 2 |
| 173 | SETR | |
| 174 | TCY | 7 |
| 175 | SETR | |
| 176 | TCMIY | 5 |
| 177 | TCMIY | 0 |
| 178 LB45 | CALL | SUBD |
| 179 | TBITI | 2 |
| 180 | BR | LB326 |
| 181 LB325 | TCY | 6 |
| 182 | BR | LB327 |
| 183 LB326 | TCY | 0 |
| 184 | TBITI | 2 |
| 185 | BR | LB325 |
| 186 | BL | LBJAMN 82 |
| 187 LB327 | TBITI | 3 |
| 188 | BR | LB46 |
| 189 | SETR | |
| 190 | TCY | 1 |
| 191 | SETR | |
| 192 | TCY | 7 |
| 193 | RSTR | |
| 194 | TCMIY | 6D |
| 195 | TCMIY | 6C |

TABLE 1-continued

Program Step
GENERAL ASSEMBLER
ASSEMBLE OF TMS 1000
NEW INSTRUCTION FOR B.B

| STMT | SOURCE | STATEMENT |
|---|---|---|
| 196 LB47 | CALL | SUBD |
| 197 | TBITI | 2 |
| 198 | BR | LB329 |
| 199 LB328 | TCY | 6 |
| 200 | BR | LB330 |
| 201 LB329 | TCY | 0 |
| 202 | TBITI | 2 |
| 203 | BR | LB328 |
| 204 | BL | LBJAMN82 |
| 205 LB330 | TBITI | 3 |
| 206 | BR | LB48 |
| 207 | TCY | 0 |
| 208 | LDP | 4 |
| 209 | BR | 0 |
| 210 LB43 | CALL | SUBA |
| 211 | BR | LB42 |
| 212 LB46 | CALL | SUBA |
| 213 | BR | LB45 |
| 214 LB48 | CALL | SUBA |
| 215 | BR | LB47 |
| 216 LB44 | BL | LBSM2 |
| 217 | PAGE | 4 |
| 218 | TBITI | 3B |
| 219 | BR | LBB0 |
| 220 | | |
| 221 LB107 | TCY | 9 |
| 222 LB50 | RSTR | |
| 223 | DYN | |
| 224 | BR | LB50 |
| 225 | TCY | 10 |
| 225 | SETR | |
| 226 | RSTR | |
| 227 | TCY | 6 |
| 228 | TBITI | 1 |
| 229 | BR | LB53 |
| 230 | BR | LB54 |
| 231 LB53 | TCY | 3 |
| 232 | CALL | SUBE |
| 233 | TBITI | 1 |
| 234 | BR | LB55 |
| 235 | TCY | 3 |
| 236 | RSTR | |
| 237 LB54 | BL | LB87 |
| 238 LB55 | CALL | SUBA |
| 239 | BR | LB53 |
| 240 LB49 | TCY | 7 |
| 241 | TCMIY | |
| 242 | TCMIY | 6C |
| 243 LB57 | CALL | SUBD |
| 244 | TBITI | 2 |
| 245 | BR | LB332 |
| 246 LB331 | TCY | 6 |
| 247 | BR | LB333 |
| 248 LB332 | TCY | 0 |
| 249 | TBITI | 2 |
| 250 | BR | LB331 |
| 251 | BL | LBJAMN82 |
| 252 LB333 | TBITI | 3 |
| 253 | BR | LB58 |
| 254 | TCY | 2 |
| 255 | RSTR | |
| 256 LB60 | CALL | SUBF |
| 257 | TBITI | 1 |
| 258 | BR | LB61 |
| 259 | CALL | SUBA |
| 260 | BR | LB60 |
| 261 LB61 | TCY | 1 |
| 262 | RSTR | |
| 263 | TCY | 2 |
| 264 | SETR | |
| 265 | TCY | 6 |
| 266 | SBIT | 2 |
| 267 | TCY | 9 |
| 268 | TCMIY | 6D |
| 269 | TCMIY | 64 |
| 270 | LDP | 5 |
| 271 | BR | 0 |
| 272 LB58 | CALL | SUBA |
| 273 | BR | LB57 |
| 274 | PAGE | 5 |
| 275 | TCMIY | 68 |
| 276 LB65 | CALL | SUBD |
| 277 | TCY | 0 |
| 278 | TBITI | 3 |
| 279 | BR | LB310 |
| 280 | BR | LB334 |
| 281 LB310 | TCY | 5 |
| 282 | TBITI | 2 |
| 283 | BR | LB335 |
| 284 LB67 | CALL | SUBA |
| 285 | BR | LB65 |
| 286 LB335 | TCY | 0 |
| 287 | TBITI | 2 |
| 288 | BR | LB67 |
| 289 | BL | LBJAM |
| 290 LB334 | TCY | 5 |
| 291 | RSTR | |
| 292 | TCY | 6 |
| 293 | RSTR | |
| 294 | TCY | 7 |
| 295 | SETR | |
| 296 | TCY | 5 |
| 297 | TBITI | 3 |
| 298 | BR | LB300 |
| 299 | TCY | 1 |
| 300 | DMAN | |
| 301 | BR | LB71 |
| 302 | A10AAC | |
| 303 | TAM | |
| 304 | TCY | 2 |
| 305 | DMAN | |
| 306 LB71 | TAM | |
| 307 | BR | LB70 |
| 308 LB300 | RBIT | 3 |
| 309 LB70 | TCY | 1 |
| 310 | MNEZ | |
| 311 | BR | LB301 |
| 312 | TCY | 2 |
| 313 | MNEZ | |
| 314 | BR | LB301 |
| 315 LB69 | TCY | 7 |
| 316 | TCMIY | 6B |
| 317 | TCMIY | 63 |
| 318 LB73 | CALL | SUBD |
| 319 | TBITI | 2 |
| 320 | BR | LB339 |
| 321 LB340 | TCY | 6 |
| 322 | BR | LB341 |
| 323 LB339 | TCY | 0 |
| 324 | TBITI | 2 |
| 325 | BR | LB340 |
| 326 | BL | LBJAMN |
| 327 LB341 | BL | LB343 |
| 328 LB301 | BL | LB336 |
| 329 | PAGE | 6 |
| 330 LB343 | TBITI | 3 |
| 331 | BR | LB74 |
| 332 | TCY | 0 |
| 333 | RSTR | |
| 334 | TCY | 2 |
| 335 | RSTR | |
| 336 | TCY | 7 |
| 337 | RSTR | |
| 338 | TCY | 8 |
| 339 | RETR | |
| 340 | TCY | 7 |
| 341 | TCMIY | 63 |
| 342 | TCMIY | 64 |
| 343 LB76 | CALL | SUBD |
| 344 | TBITI | 2 |
| 345 | BR | LB345 |
| 346 LB344 | TCY | 6 |

TABLE 1-continued

Program Step
GENERAL ASSEMBLER
ASSEMBLE OF TMS 1000
NEW INSTRUCTION FOR B.B

| STMT | SOURCE | STATEMENT |
|---|---|---|
| 347 | BR | LB346 |
| 348 LB345 | TCY | 0 |
| 349 | TBITI | 2 |
| 350 | BR | LB344 |
| 351 | BR | LBJAMN |
| 352 LB346 | TBITI | 3 |
| 353 | BR | LB77 |
| 354 | BL | LB81 |
| 355 LBJAMN | TCY | 5 |
| 356 | SBIT | 3 |
| 357 LBJAM | CALL | SUBA |
| 358 | TCY | 9 |
| 359 LB78 | RSTR | |
| 360 | DYN | |
| 361 | BR | LB78 |
| 362 | TCY | 10 |
| 363 | SETR | |
| 364 | RSTR | |
| 365 | SETR | |
| 366 | RSTR | |
| 367 | SETR | |
| 368 | TCY | 5 |
| 369 | SETR | |
| 370 LB79 | TCY | 9 |
| 371 | CALL | SUBE |
| 372 | TBITI | 2 |
| 373 | BR | LB80 |
| 374 | CALL | SUBA |
| 375 | BR | LB79 |
| 376 LB74 | CALL | SUBA |
| 377 | BL | LB73 |
| 378 LB77 | CALL | SUBA |
| 379 | BR | LB76 |
| 380 LB80 | TCY | 5 |
| 381 | RSTR | |
| 382 | LDP | 7 |
| 383 | BR | 0 |
| 384 | PAGE | 7 |
| 385 | TCY | 9 |
| 386 | RSTR | |
| 387 LB82 | CALL | SUBF |
| 388 | TBITI | 2 |
| 389 | BR | LB83 |
| 390 | CALL | SUBA |
| 391 | BR | LB82 |
| 392 LB83 | CALL | SUBB |
| 393 LB84 | CALL | SUBF |
| 394 | TBITI | 2 |
| 395 | BR | LB85 |
| 396 | CALL | SUBB |
| 402 LB85 | CALL | SUBA |
| 403 | BR | LB84 |
| 404 LB87 | TCY | 9 |
| 405 | CALL | SUBC |
| 406 | TBITI | 0 |
| 407 | BR | LB88 |
| 408 | TBITI | 1 |
| 409 | BR | LB89 |
| 410 LB90 | CALL | SUBA |
| 411 | BR | LB87 |
| 412 LB89 | TCY | 6 |
| 413 | TBITI | 0 |
| 414 | BR | LB93 |
| 415 | BR | LB90 |
| 416 LB88 | TCY | 6 |
| 417 | TBITI | 0 |
| 418 | BR | LB92 |
| 419 LB93 | TCY | 7 |
| 420 | CALL | SUBC |
| 421 | TBITI | 3 |
| 422 | BR | LB94 |
| 423 | TCY | 10 |
| 424 | RSTR | |
| 425 | TCY | 5 |
| 426 | RBIT | 1 |
| 427 | TCY | 6 |
| 428 | RBIT | 2 |
| 429 | BL | LB37 |
| 430 LB92 | CALL | SUBA |
| 431 | BR | LB87 |
| 432 LB94 | CALL | SUBA |
| 433 | BR | LB93 |
| 434 | PAGE | 8 |
| 435 LB81 | TCY | 7 |
| 436 | TCMIY | 6F |
| 437 | TCMIY | 6F |
| 438 LB95 | CALL | SUBD |
| 439 | TCY | 6 |
| 440 | TBITI | 3 |
| 441 | BR | LB96 |
| 442 | TCY | 4 |
| 443 | RSTR | |
| 444 | TCY | 5 |
| 445 | TBITI | 1 |
| 446 | BR | LB56 |
| 447 | TCY | 4 |
| 448 | TMA | |
| 449 | TCY | 2 |
| 450 | TAM | |
| 451 | TCY | 3 |
| 452 | TMA | |
| 453 | TCY | 1 |
| 454 | TAM | |
| 455 LB56 | CALL | SUBA |
| 456 | TCY | 5 |
| 457 | TCMIY | 0 |
| 458 | TCMIY | 0 |
| 459 | BL | LB4 |
| 460 LB96 | CALL | SUBA |
| 461 | BR | LB95 |
| 462 LBSM1 | TCY | 1 |
| 463 | TCMIY | 0 |
| 464 | TCMIY | 0 |
| 465 LB97 | TCY | 9 |
| 466 | CALL | SUBE |
| 467 | TBITI | 2 |
| 468 | BR | LB98 |
| 469 | TCY | 5 |
| 470 | SETR | |
| 471 | CALL | SUBA |
| 472 | BR | LB97 |
| 473 LB98 | TCY | 9 |
| 474 | RSTR | |
| 475 | TCY | 5 |
| 476 | RSTR | |
| 477 | TCY | 5 |
| 478 | RSTR | |
| 479 | BL | LB37 |
| 480 LBSM2 | TCY | 2 |
| 481 | SETR | |
| 482 | BL | LB99 |
| 483 | PAGE | 9 |
| 484 LB99 | TCY | 8 |
| 485 | CALL | SUBE |
| 486 | TBITI | 1 |
| 487 | BR | LB100 |
| 488 | CALL | SUBA |
| 489 | BR | LB99' |
| 490 LB100 | TCY | 7 |
| 491 | TCMIY | 3 |
| 492 | TCMIY | 6 |
| 493 LB101 | CALL | SUBD |
| 494 | TCY | 6 |
| 495 | TBITI | 3 |
| 496 | BR | LB102 |
| 497 | TCY | 1 |
| 498 | SETR | |
| 499 | TCY | 6 |
| 500 | SETR | |
| 501 | TCY | 7 |
| 502 | RSTR | |
| 503 LB103 | TCY | 7 |

TABLE 1-continued

Program Step
GENERAL ASSEMBLER
ASSEMBLE OF TMS 1000
NEW INSTRUCTION FOR B.B

| STMT | SOURCE | STATEMENT |
|---|---|---|
| 504 | TCMIY | 1 |
| 505 | TCMIY | 3 |
| 506 LB104 | CALL | SUBD |
| 507 | TCY | 6 |
| 508 | TBITI | 3 |
| 509 | BR | LB105 |
| 510 | TCY | 0 |
| 511 | TBITI | 3 |
| 512 | BR | LB106 |
| 513 | BL | LB107 |
| 514 LB102 | CALL | SUBA |
| 515 | BR | LB101 |
| 516 LB105 | CALL | SUBA |
| 517 | BR | LB104 |
| 518 LB106 | TCY | 7 |
| 519 | TCMIY | 11 |
| 520 | TCMIY | 3 |
| 521 LB108 | CALL | SUBD |
| 522 | TCY | 6 |
| 523 | TBITI | 3 |
| 524 | BR | LB312 |
| 525 | BL | LB0JAM |
| 526 LB312 | TCY | 0 |
| 527 | TBITI | 1 |
| 528 | BR | LB109 |
| 529 | CALL | SUBA |
| 530 | BR | LB108 |
| 531 LB109 | TCY | 7 |
| 532 | TCMIY | 3 |
| 533 | TCMIY | 3 |
| 534 | LDP | 10 |
| 535 | BR | 0 |
| 536 | PAGE | 10 |
| 537 LB1144 | CALL | SUBD |
| 538 | TCY | 6 |
| 539 | TBITI | 3 |
| 540 | BR | LB115 |
| 541 | TCY | 2 |
| 542 | RSTR | |
| 543 | TCY | 7 |
| 544 | TCMIY | 3 |
| 545 | TCMIY | 3 |
| 546 LB116 | CALL | SUBD |
| 547 | TCY | 6 |
| 548 | TBITI | 3 |
| 549 | BR | LB117 |
| 550 | TCY | 1 |
| 551 | RSTR | |
| 552 | TCY | 2 |
| 553 | SETR | |
| 554 LB118 | CALL | SUBF |
| 555 | TBITI5 | 1 |
| 556 | BR5 | LB119 |
| 557 | TCY | 1 |
| 558 | IMAC | |
| 559 | TAM | |
| 560 | A6AAC | |
| 561 | BR | LB120 |
| 562 LB122 | TCY | 6 |
| 563 | RSTR | |
| 564 | TCY | 7 |
| 565 | CALL | SUBC |
| 566 | LDP | 11 |
| 567 | BR | 0 |
| 568 LB115 | CALL | SUBA |
| 569 | BR | LB114 |
| 570 LB117 | CALL | SUBA |
| 571 | BR | LB116 |
| 572 LB119 | CALL | SUBA |
| 573 | BR | LB118 |
| 574 LB120 | TAM | |
| 575 | TCY | 2 |
| 576 | IMAC | |
| 577 | TAM | |
| 578 | A6AAC | |
| 579 | BR | LB121 |
| 580 | BR | LB120 |
| 581 LB121 | TAM | |
| 582 | BR | LB122 |
| 583 | PAGE | 11 |
| 584 | TBITI | 3 |
| 585 | BR | LB123 |
| 586 | TCY | 6 |
| 587 | SETR | |
| 588 | TCY | 7 |
| 589 | TCMIY | 3 |
| 590 | TCMIY | 3 |
| 591 LB124 | CALL | SUBD |
| 592 | TCY | 6 |
| 593 | TBITI | 3 |
| 594 | BR | LB125 |
| 595 LB129 | CALL | SUBF |
| 596 | TBITI | 3 |
| 597 | BR | LB313 |
| 598 | BR | LB130 |
| 599 LB313 | CALL | SUBA |
| 600 | BR | LB129 |
| 601 LB130 | TCY | 6 |
| 602 | RSTR | |
| 603 | TCY | 7 |
| 604 | SETR | |
| 605 | BL | LB69 |
| 606 LB123 | TCY | 6 |
| 607 | SETR | |
| 608 | TCY | 5 |
| 609 | SBIT | 1 |
| 610 | BR | LB129 |
| 611 LB125 | TCY | 0 |
| 612 | TBITI | 1 |
| 613 | BR5 | LB131 |
| 614 | CALL | SUBA |
| 615 | BR | LB124 |
| 616 LB131 | TCY | 7 |
| 617 | TCMIY | 3 |
| 618 | TCMIY | 3 |
| 619 LB132 | CALL | SUBD |
| 620 | TCY | 6 |
| 621 | TBITI | 3 |
| 622 | BR | LB133 |
| 623 LB135 | CALL | SUBF |
| 624 | TBITI | 3 |
| 625 | BR | LB136 |
| 626 | TCY | 8 |
| 627 | SETR | |
| 628 | TCY | 1 |
| 629 | SETR | |
| 630 | LDP | 12 |
| 631 | BR | 0 |
| 632 LB133 | CALL | SUBA |
| 633 | BR | LB132 |
| 634 LB136 | TCY | 8 |
| 635 | RSTR | |
| 636 | CALL | SUBA |
| 637 | BR | LB135 |
| 638 | PAGE | 12 |
| 639 | TCY | 6 |
| 640 | SBIT | 2 |
| 641 | BL | LB103 |
| 642 LB336 | CALL | SUBF |
| 643 | TBITI | 3 |
| 644 | BR | LB302 |
| 645 LB303 | CALL | SUBD |
| 646 | TBITI | 2 |
| 647 | BR | LB337 |
| 648 | TCY | 0 |
| 649 | BR | LB338 |
| 650 LB302 | TCY | 5 |
| 651 | SBIT | 1 |
| 652 | BL | LB69 |
| 653 LB337 | TCY | 0 |
| 654 | TBITI | 2 |
| 655 | BR | LB338 |

TABLE 1-continued

Program Step
GENERAL ASSEMBLER
ASSEMBLE OF TMS 1000
NEW INSTRUCTION FOR B.B

| STMT | SOURCE | STATEMENT |
|---|---|---|
| 656 LB350 | BL | LBJAMN |
| 657 LB338 | TBITI | 1 |
| 658 | BR | LB304 |
| 659 | CALL | SUBA |
| 660 | BR | LB303 |
| 661 LB304 | TCY | 7 |
| 662 | TCMIY | 3 |
| 663 | TCMIY | 6E |
| 664 LB318 | CALL | SUBD |
| 665 | TBITI | 2 |
| 666 | BR | LB347 |
| 667 LB348 | TCY | 6 |
| 668 | TBITI | 3 |
| 669 | BR | LB349 |
| 670 | BR | LB351 |
| 671 LB349 | CALL | SUBA |
| 672 | BR | LB318 |
| 673 LB347 | TCY | 0 |
| 674 | TBITI | 2 |
| 675 | BR | LB348 |
| 676 | BR | LB350 |
| 690 | PAGE | 13 |
| 691 SUBB | TCY | 15 |
| 692 | TCMIY | 8 |
| 693 LB202 | DYN | |
| 694 | BR | LB202 |
| 695 | DMAN | |
| 696 | TAM | |
| 697 | MNEZ | |
| 698 | BR | LB202 |
| 699 | RETN | |
| 700 SUBD | SETR | |
| 701 | TKA | |
| 702 | RSTR | |
| 703 | TCY | 0 |
| 704 | TAM | |
| 705 | RETN | |
| 706 SUBD | TKA | |
| 707 | TCY | 0 |
| 708 | TAM | |
| 709 | TBITI | 0 |
| 710 | BR | SUBD |
| 711 LB203 | TKA | |
| 712 | TCY | 0 |
| 713 | TAM | |
| 714 | TBITI | 0 |
| 715 | BR | LB204 |
| 716 | BR | LB203 |
| 717 LB204 | TCY | 7 |
| 718 | DMAN | |
| 719 | BR | LB205 |
| 720 | TAM | |
| 721 | TCY | 8 |
| 722 | DMAN | |
| 723 | BR | LB205 |
| 724 | TCY | 6 |
| 725 | RBIT | 3 |
| 726 | BR5 | LB206 |
| 727 LB205 | TAM | |
| 728 | TCY | 6 |
| 729 | SBIT | 3 |
| 730 LB206 | TBITI | 2 |
| 731 | BR | LB322 |
| 732 | TCY | 5 |
| 733 | RBIT | 2 |
| 734 | BR | LB323 |
| 735 LB322 | TCY | 9 |
| 736 | DMAN | |
| 737 | BR | LB324 |
| 738 | TAM | |
| 739 | TCY | 10 |
| 740 | DMAN | |
| 741 | BR | LB324 |
| 742 | TAM | |
| 743 | TCY | 11 |
| 744 | DMAN | |
| 745 | BR | LB324 |
| 746 | TCY | 6 |
| 747 | RBIT | 2 |
| 748 | TCY | 5 |
| 749 | SBIT | 2 |
| 750 | BR | LB323 |
| 751 LB324 | TAM | |
| 752 | TCY | 5 |
| 753 LB323 | RETN | |
| 754 | PAGE | 14 |
| 755 SUBA | TCY | 5 |
| 756 | TBITI | 0 |
| 757 | BR | LB200 |
| 758 | SBIT | 0 |
| 759 | TCY | 12 |
| 760 | RSTR | |
| 761 | TCY | 1 |
| 762 | TAM | |
| 763 | TD0 | |
| 764 | TCY | 11 |
| 765 | SETR | |
| 766 | BR | LB201 |
| 767 LB200 | RBIT | 0 |
| 768 | TCY | 11 |
| 769 | RSTR | |
| 770 | TCY | 2 |
| 771 | TMA | |
| 772 | TD0 | |
| 773 | TCY | 12 |
| 774 | SETR | |
| 775 LB201 | RETN | |
| 776 SUBE | SETR | |
| 777 | TKA | |
| 778 | TCY | 0 |
| 779 | TAM | |
| 780 | RETN | |
| 781 SUBF | TKA | |
| 782 | TCY | 0 |
| 783 | TAM | |
| 784 | RETN | |
| 785 LB0JAM | TCY | 10 |
| 786 LB110 | RSTR | |
| 787 | DYN | |
| 788 | BR | LB110 |
| 789 | TCY | 10 |
| 790 | SETR | |
| 791 | RSTR | |
| 792 | SETR | |
| 793 | RSTR | |
| 794 | SETR | |
| 795 | RSTR | |
| 796 LB111 | TCY | 9 |
| 797 | CALL | SUBC |
| 798 | TBITI | 1 |
| 799 | BR | LB112 |
| 800 | CALL | SUBA |
| 801 | BR | LB111 |
| 802 LB112 | TCY | 2 |
| 803 | SETR | |
| 804 | BL | LB37 |
| 805 LB315 | TCY | 5 |
| 806 | TBITI | 2 |
| 807 | BR | LB316 |
| 808 | TCY | 0 |
| 809 | BL | LB13 |
| 810 LB316 | BL | LB4 |
| 811 | PAGF | 15 |
| 812 | LDP | 15 |
| 813 | TCY | 12 |
| 814 LB1 | RSTR | |
| 815 | DYN | |
| 816 | BR | LB1 |
| 817 | CL0 | |
| 818 | LDX | 0 |
| 819 | CLA | |
| 820 LB2 | TAM | |

TABLE 1-continued

Program Step
GENERAL ASSEMBLER
ASSEMBLE OF TMS 1000
NEW INSTRUCTION FOR B.B

| STMT | SOURCE | STATEMENT |
|---|---|---|
| 821 | DYN | |
| 822 | BR | LB2 |
| 823 LB3 | TCY | 1 |
| 824 | TCMIY | 1 |
| 825 | TCY | 3 |
| 826 | TCMIY | 1 |
| 827 | TCY | 5 |
| 828 | SBIT | 2 |
| 829 LB4 | CALL | SUBA |
| 830 | TCY | 0 |
| 831 | SETR | |
| 832 | TKA | |
| 833 | RSTR | |
| 834 | ALEC | 0 |
| 835 | BR | LB305 |
| 836 | BL | LB9 |
| 837 LB305 | IYC | |
| 838 | SETR | |
| 839 | TKA | |
| 840 | RSTR | |
| 841 | ALEC | 0 |
| 842 | BR | LB306 |
| 843 | BL | LB10 |
| 844 LB306 | IYC | |
| 845 | SETR | |
| 846 | TKA | |
| 847 | RSTR | |
| 848 | ALEC | 0 |
| 849 | BR | LB307 |
| 850 | BL | LB11 |
| 851 LB307 | TCY | 9 |
| 852 | SETR | |
| 853 | TKA | |
| 854 | RSTR | |
| 855 | ALEC | 0 |
| 856 | BR | LB308 |
| 857 | BL | LB12 |
| 858 LB308 | TCY | 5 |
| 859 | RBIT | 1 |
| 860 | RBIT | 3 |
| 861 | CALL | SUBB |
| 862 | CALL | SUBA |
| 863 | CALL | SUBB |
| 864 | BR | LB4 |
| 865 | END | |

What we claim is:

1. An image recording or reproducing apparatus comprising:
   plural operation devices for recording or reproducing an image on a recording member;
   means for generating information signals for image recordal or reproduction;
   input means for inputting the information signals;
   control means for controlling said operation devices in accordance with the information signals from said input means;
   output means for outputting operation control signals from said control means for operating said operation devices; and
   selecting means for selecting an information signal to be input to said input means in accordance with said operation control signals from said output means;
   said control means controlling said operation devices in accordance with the selected information signal.

2. An image recording or reproducing apparatus according to claim 1, wherein said control means is a micro-computer provided on a 1-chip semi-conductor element.

3. An image recording or reproducing apparatus according to claim 1, wherein said input function control means enables the input of the information by said input means according to whether or not a predetermined control signal of said control signals is output.

4. An image recording or reproducing apparatus comprising:
   a plurality of key input means relating to the image recording or reproducing;
   a plurality of operation condition signal generating means for generating operation condition signals relating to the image recording or reproducing, said operation condition signals being generated during image recording or reproducing;
   input means having a plurality of input lines to input key input signals from said key input means and operation condition signals from said operation condition signal generating means, said plurality of key input means being connected to each of said plurality of input lines in a matrix structure;
   control means having a control program for judging the signals input from said input means and, on the basis of said judgment, for controlling the sequence of the image recording or reproducing based on said control program;
   wherein said control means outputs repetitive pulses for scanning said plurality of key input means connected to each of said plurality of input lines as a matrix structure; and
   wherein said operation condition signal generating means is connected to at least one of the input lines to which said key input means is connected as the matrix structure; and the scanning judment of said key input means is ceased during the time period of input judgment of the operation condition signals so that the signals from said key input means and the signals from said operation condition signal generating means are separately input through the same input line.

5. An image recording or reproducing apparatus according to claim 4, wherein said control means is a micro-computer provided on a 1-chip semiconductor element.

6. An image recording or reproducing apparatus comprising:
   a plurality of operation devices including process means for recording or reproducing images;
   at least a first and a second display means to make a predetermined display;
   input means for inputting operation instructions in association with image recording or reproducing operations;
   a semiconductor element comprising an in unit read-out exclusive memory memorized program for the sequence of image recording or reproducing; a plurality of output terminals for reading-out and writing-in data necessary for image recording or reproducing and for outputting control signals to said operation devices necessary for operation at required operation timing; a plurality of input terminals for inputting signals from said input means; and a processing part for forming control signals by decoding said program and said input signals;
   display drive circuit means disposed between one output terminal of said semiconductor element and the plurality of display means to independently control each of said plurality of display means by said one output terminal of said semiconductor element;

wherein said processing part outputs to said display drive circuit means from one output terminal of a plurality of output terminals a first pulse control signal for controlling the display of said first display means and a second pulse control signal, which is different in pulse state from said first pulse control signal, for controlling the display of said second display means, said display drive circuit means inputting said first and second pulse control signals and outputting independent display control signals to each display means separately connected on the basis of each signal.

7. An image recording or reproducing apparatus according to claim 6, wherein said display drive circuit means is a register.

8. An image recording or reproducing apparatus according to claim 6, wherein said display drive circuit means counts the number of pulses of each signal of said first and second pulse control signals.

9. An image recording and reproducing apparatus comprising:

a plurality of operation loads for image recording or reproducing;

a plurality of signal producing means for producing various signals including operation condition signals related to image recording or reproducing operations;

a plurality of input means for inputting a plurality of signals from said producing means; and control means having a control program for judging signals input from said input means and, on the basis of said judgment, for controlling the sequence of the image recording or reproducing by outputting operation signals to said operation loads in accordance with said control program, wherein a plurality of said signals are respectively connected to one input means of said plurality of input means, and a specific signal is input on the condition that an operation signal is output to said operation loads associated with said specific signal.

10. An image recording or reproducing apparatus according to claim 9, wherein said control means is a micro-computer provided on a 1-chip semiconductor element.

* * * * *

UNITED STATES PATENT AND TRADEMARK OFFICE
CERTIFICATE OF CORRECTION

PATENT NO. : 5,117,260
DATED : May 26, 1992
INVENTOR(S) : Masao Ariga, et al.

PAGE 1 OF 3

It is certified that error appears in the above-identified patent and that said Letters Patent is hereby corrected as shown below:

COVER PAGE

Under [60], Related U.S. Application Data, "Division of Ser. No. 8,119, Jan.23, 1987" should read --Continuation of Ser. No. 8,119, Jan. 23, 1987--.

DRAWINGS

Sheet 9, Figure 16B, "FORWAR" should read --FORWARD--.

Sheet 12, Figure 17C, "BEPRESSED" should read --DEPRESSED--.

Figures 6A, 31:
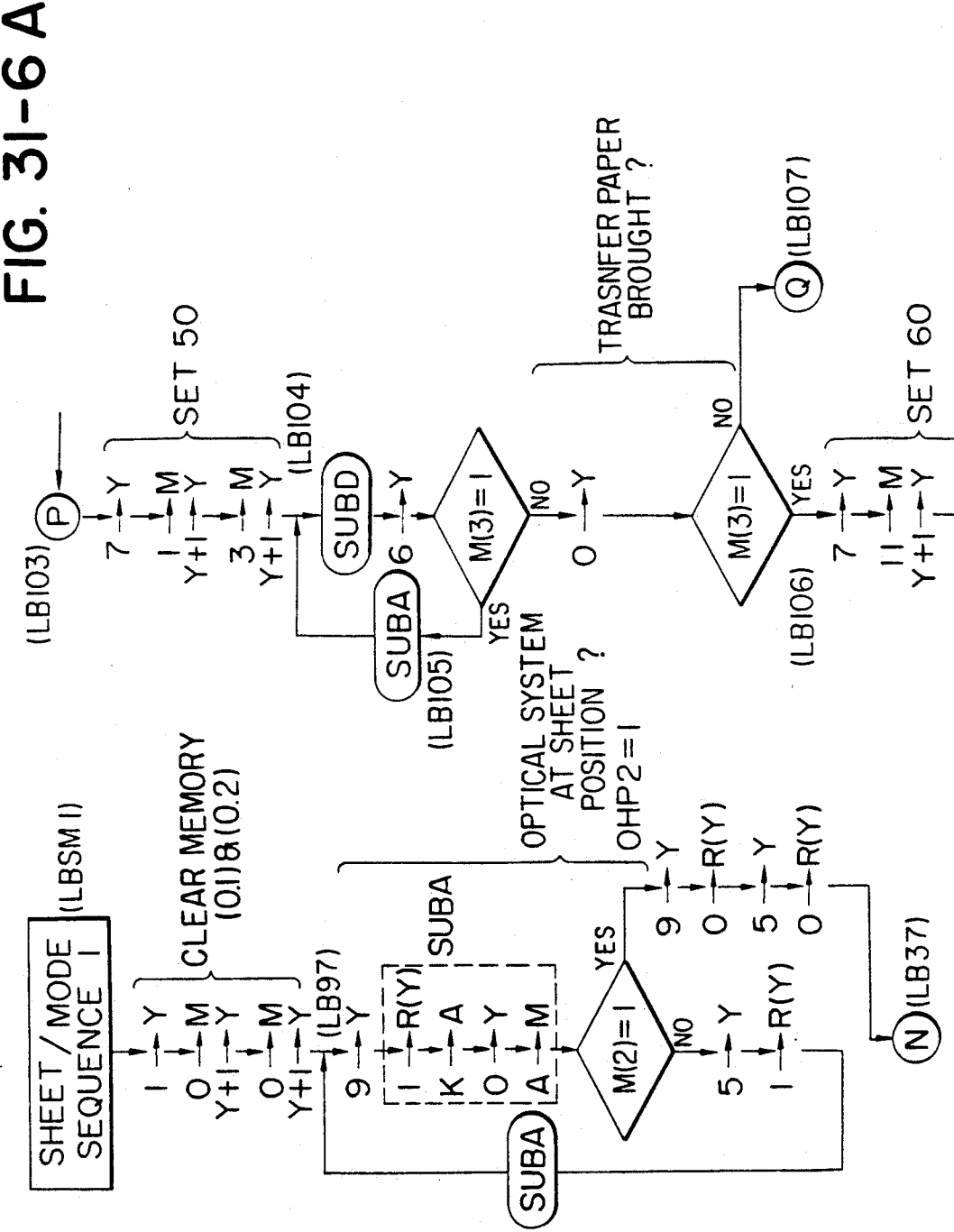

Sheet 50, Figure 31-6A, "TRASNFER" should read --TRANSFER--.

Figures 6B, 31:
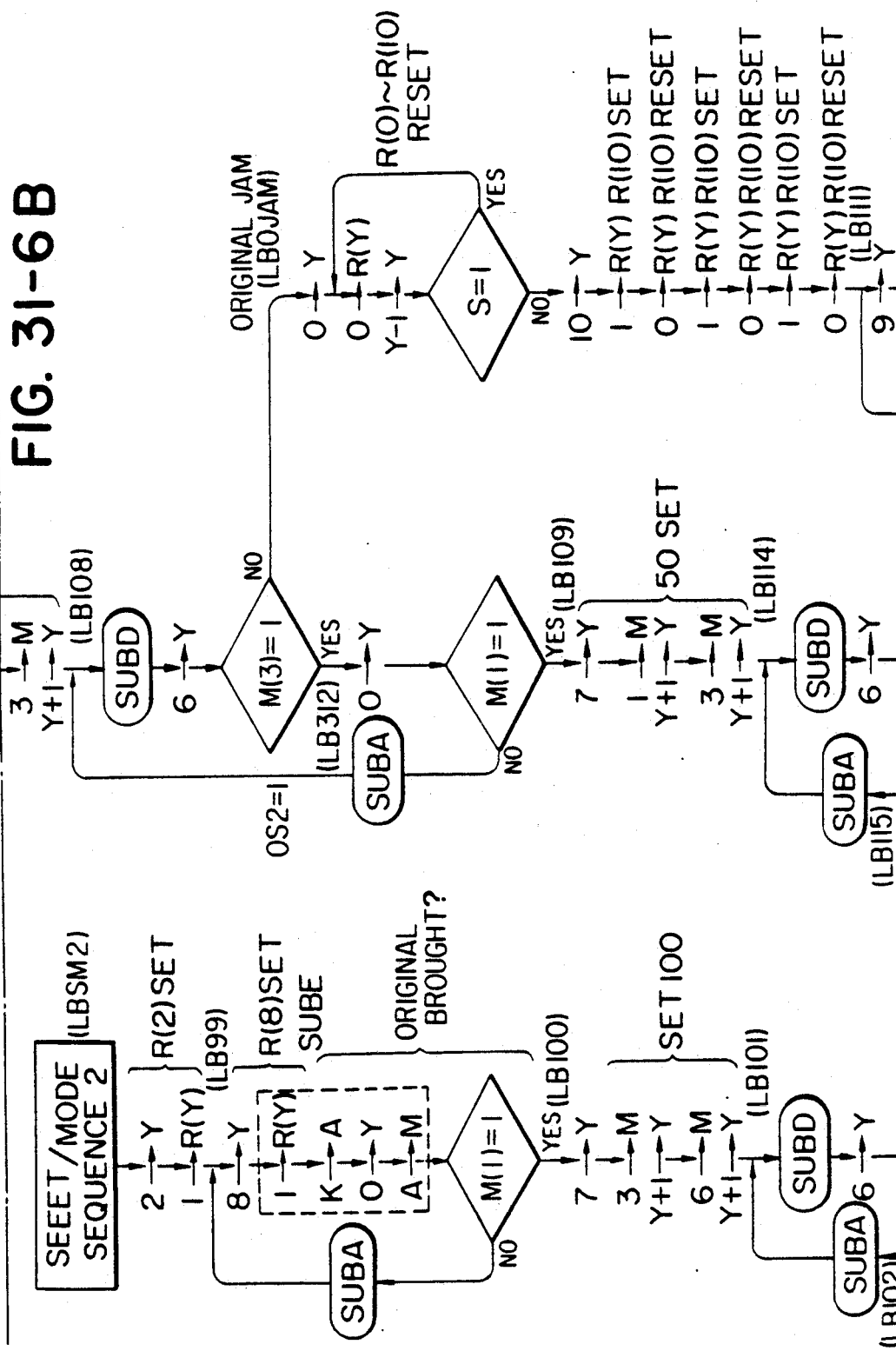
Figure 31:
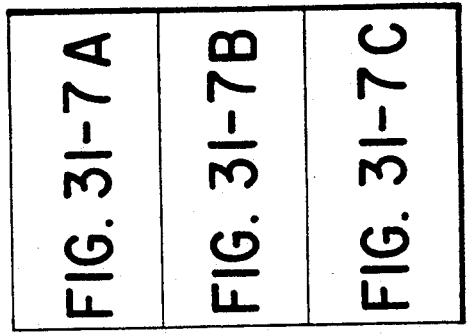

Sheet 51, Figure 31-6B, "SEEET" should read --SHEET--.

COLUMN 2

Line 18, "view an" should read --view of an--;
Line 43, "18B" should read --18B)--; and
Line 57, "26(A), (B), (C) and (D) and (E) are circuit diagram" should be deleted.

UNITED STATES PATENT AND TRADEMARK OFFICE
CERTIFICATE OF CORRECTION

PATENT NO. : 5,117,260
DATED : May 26, 1992
INVENTOR(S) : Masao Ariga, et al.

It is certified that error appears in the above-identified patent and that said Letters Patent is hereby corrected as shown below:

COLUMN 3

Line 1, "FIGS. 31-1 to 31-7 which includes" should read --FIGS. 31-1 to 31-7 include--.

COLUMN 10

Line 4, "finer control signals a" should read --finer control signals $\alpha$--.

COLUMN 11

Line 7, "erraneous" should read --erroneous--.

COLUMN 15

Line 10, "An another" should read --Another--.

UNITED STATES PATENT AND TRADEMARK OFFICE
CERTIFICATE OF CORRECTION

PATENT NO. : 5,117,260
DATED : May 26, 1992
INVENTOR(S) : Masao Ariga, et al.

It is certified that error appears in the above-identified patent and that said Letters Patent is hereby corrected as shown below:

COLUMN 18

In Table 1, "LIST. XREF. PROM. STAT" should read --LIST, XREF, PROM, STAT--.

Signed and Sealed this

First Day of February, 1994

Attest:

BRUCE LEHMAN

Attesting Officer  Commissioner of Patents and Trademarks